(12) United States Patent
Middleton et al.

(10) Patent No.: US 11,107,127 B2
(45) Date of Patent: *Aug. 31, 2021

(54) SYSTEM FOR THE SECURE DISTRIBUTED FIRMWARE AND CONFIGURATION UPDATE OF UN-NETWORKED PHYSICAL DEVICES

(71) Applicant: BBY SOLUTIONS, INC., Richfield, MN (US)

(72) Inventors: Thomas Middleton, Boston, MA (US); Orin Morris, Boston, MA (US)

(73) Assignee: BBY SOLUTIONS, INC., Richfield, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/719,854

(22) Filed: Dec. 18, 2019

(65) Prior Publication Data

US 2020/0242662 A1    Jul. 30, 2020

Related U.S. Application Data

(63) Continuation of application No. 15/352,404, filed on Nov. 15, 2016, now Pat. No. 10,559,007, which is a (Continued)

(51) Int. Cl.
*G06F 9/44* (2018.01)
*G06Q 30/02* (2012.01)
(Continued)

(52) U.S. Cl.
CPC .......... *G06Q 30/0261* (2013.01); *G06F 8/65* (2013.01); *G06Q 20/206* (2013.01);
(Continued)

(58) Field of Classification Search
CPC .................................................. G06F 8/60–71
(Continued)

(56) References Cited

U.S. PATENT DOCUMENTS 6,259,405 B1 * 7/2001 Stewart ............ H04M 15/8033
342/457
6,587,835 B1   7/2003 Treyz et al.
(Continued)

OTHER PUBLICATIONS

Lin, Y.-W.; Lin, C.-Y. "An Interactive Real-Time Locating System Based on Bluetooth Low-Energy Beacon Network". Sensors 2018, 18, 1637. https://doi.org/10.3390/s18051637.*
(Continued)

*Primary Examiner* — Francisco J Aponte
(74) *Attorney, Agent, or Firm* — Schwegman Lundberg & Woessner, P.A.

(57) ABSTRACT

Systems and methods are disclosed for the secure distribution of firmware and configuration updates to un-networked physical devices. A client component is provided for installation on a client device, which is configured to receive, via the client component, a status data packet including a status indication from a beacon, when the client is proximate to the beacon. A server receives the status data packet via the client component, determines whether an update is available for the beacon based at least in part on the status indication, and transmits, to the client device, an encrypted update data message relating to the update for installation at the beacon to complete the update of the beacon.

20 Claims, 22 Drawing Sheets

Related U.S. Application Data continuation-in-part of application No. 14/169,964, filed on Jan. 31, 2014, now abandoned.

(60) Provisional application No. 61/822,568, filed on May 13, 2013, provisional application No. 61/759,641, filed on Feb. 1, 2013.

(51) Int. Cl.

| | |
|---|---|
| *H04W 4/02* | (2018.01) |
| *H04W 24/00* | (2009.01) |
| *G06Q 30/06* | (2012.01) |
| *H04L 9/08* | (2006.01) |
| *H04W 4/80* | (2018.01) |
| *G06F 8/65* | (2018.01) |
| *G06Q 20/20* | (2012.01) |
| *H04L 12/24* | (2006.01) |
| *H04L 29/06* | (2006.01) |
| *H04W 12/04* | (2021.01) |

(52) U.S. Cl.
CPC ....... *G06Q 30/0601* (2013.01); *H04L 9/0819* (2013.01); *H04L 41/082* (2013.01); *H04L 63/0435* (2013.01); *H04W 4/023* (2013.01); *H04W 4/80* (2018.02); *H04W 12/04* (2013.01); *H04W 24/00* (2013.01); *G06Q 2220/00* (2013.01)

(58) Field of Classification Search
USPC .......................................................... 717/172
See application file for complete search history.

(56) References Cited

U.S. PATENT DOCUMENTS

| | | | |
|---|---|---|---|
| 6,842,433 B2 | 1/2005 | West et al. | |
| 7,414,988 B2 | 8/2008 | Jones et al. | |
| 7,474,897 B2* | 1/2009 | Morgan | H04W 12/122 |
| | | | 455/456.5 |
| 7,647,055 B2* | 1/2010 | Gum | G01S 5/0263 |
| | | | 455/456.1 |
| 7,751,829 B2* | 7/2010 | Masuoka | G01S 1/042 |
| | | | 455/456.1 |
| 7,853,721 B2 | 12/2010 | Awadallah et al. | |
| 7,873,959 B2 | 1/2011 | Zhu et al. | |
| 8,040,219 B2 | 10/2011 | Haartsen et al. | |
| 8,385,322 B2 | 2/2013 | Colling et al. | |
| 8,744,750 B2* | 6/2014 | Gupta | H04W 64/00 |
| | | | 701/408 |
| 8,837,363 B2* | 9/2014 | Jones | H04W 64/003 |
| | | | 370/328 |
| 8,847,754 B2* | 9/2014 | Buchheim | G01S 1/725 |
| | | | 340/539.13 |
| 9,258,695 B2* | 2/2016 | Kasslin | H04W 4/80 |
| 9,332,451 B2 | 5/2016 | Kwak | |
| 9,369,959 B2 | 6/2016 | Ruutu et al. | |
| 9,749,865 B2 | 8/2017 | Moon | |
| 9,877,212 B1 | 1/2018 | Deluca et al. | |
| 9,998,853 B2* | 6/2018 | Brennan | H04W 40/244 |
| 10,255,623 B2* | 4/2019 | Chatterton | H04W 4/80 |
| 10,469,997 B2* | 11/2019 | Sanders | H04W 4/02 |
| 10,475,144 B2* | 11/2019 | Van Hoof | G06Q 10/10 |
| 10,559,007 B2 | 2/2020 | Middleton | |
| 10,643,243 B1* | 5/2020 | Krishna | G06Q 30/0222 |
| 2001/0046862 A1 | 11/2001 | Coppinger et al. | |
| 2002/0176388 A1 | 11/2002 | Rankin et al. | |
| 2006/0069749 A1 | 3/2006 | Herz et al. | |
| 2007/0160198 A1 | 7/2007 | Orsini et al. | |
| 2008/0280624 A1* | 11/2008 | Wrappe | G01S 5/0036 |
| | | | 455/456.1 |
| 2009/0005019 A1 | 1/2009 | Patel et al. | |
| 2009/0210702 A1 | 8/2009 | Welingkar et al. | |
| 2010/0008337 A1* | 1/2010 | Bajko | H04W 64/00 |
| | | | 370/338 |
| 2010/0090901 A1* | 4/2010 | Smith | G01S 5/021 |
| | | | 342/451 |
| 2011/0099063 A1 | 4/2011 | Clemmons | |
| 2011/0165892 A1* | 7/2011 | Ristich | H04W 64/00 |
| | | | 455/456.2 |
| 2011/0191024 A1 | 8/2011 | Deluca | |
| 2012/0115512 A1 | 5/2012 | Grainger et al. | |
| 2012/0250106 A1 | 10/2012 | Kiran Kannambadi et al. | |
| 2012/0258669 A1 | 10/2012 | Honkanen et al. | |
| 2013/0017842 A1* | 1/2013 | Gupta | H04W 4/024 |
| | | | 455/456.1 |
| 2013/0143603 A1 | 6/2013 | Diacetis et al. | |
| 2013/0144879 A1 | 6/2013 | Kuehnel et al. | |
| 2013/0176925 A1 | 7/2013 | Sampath et al. | |
| 2013/0278622 A1 | 10/2013 | Sun et al. | |
| 2013/0297416 A1 | 11/2013 | Dipaola et al. | |
| 2013/0297422 A1 | 11/2013 | Hunter et al. | |
| 2014/0006784 A1 | 1/2014 | Walker et al. | |
| 2014/0222573 A1 | 8/2014 | Middleton et al. | |
| 2014/0227976 A1 | 8/2014 | Callaghan et al. | |
| 2014/0378057 A1 | 12/2014 | Ramon et al. | |
| 2015/0073980 A1 | 3/2015 | Griffin et al. | |
| 2015/0079942 A1* | 3/2015 | Kostka | G06Q 30/0267 |
| | | | 455/411 |
| 2016/0044467 A1 | 2/2016 | Clausen | |
| 2016/0119742 A1* | 4/2016 | Connelly | H04W 4/021 |
| | | | 370/254 |
| 2016/0315982 A1 | 10/2016 | Wallace et al. | |
| 2017/0111763 A1* | 4/2017 | Morgan | H04B 7/0617 |
| 2017/0131994 A1 | 5/2017 | Middleton et al. | |
| 2019/0005530 A1* | 1/2019 | Greenberger | G06Q 30/0238 |
| 2019/0172086 A1* | 6/2019 | DeLuca | H04L 67/22 |
| 2019/0392419 A1* | 12/2019 | DeLuca | G06Q 20/4016 |
| 2020/0228927 A1* | 7/2020 | Hurewitz | G06Q 30/0261 |

OTHER PUBLICATIONS

Dr.S.S.Riaz Ahamed; "The Role of Zigbee Technology in Future Data Communication System"—Journal of Theoretical and Applied Information Technology; 2009 JATIT.*

"U.S. Appl. No. 14/100,699, Non-Final Office Action dated Feb. 20, 2014", 6 pgs.

"U.S. Appl. No. 14/107,873, Non-Final Office Action dated Apr. 7, 2014", 11 pgs.

"U.S. Appl. No. 14/169,964, Non-Final Office Action dated Aug. 4, 2016", 17 pgs.

"Barker (occupation)", Wikipedia®. [online]. [retrieved on Aug. 1, 2016]. Retrieved from the Internet: <URL: https://en.wikipedia.org/w/index.php?title=Barker_(occupation)&oldid=436918616>, (Jun. 29, 2011), 1 pg.

"Human billboard", Wikipedia®. [online]. [retrieved on Aug. 1, 2016]. Retrieved from the Internet: <URL: https://en.wikipedia.org/w/index.php?title=Human_billboard&oldid=534297742>, (Jan. 22, 2013), 6 pgs.

"International Application Serial No. PCT/US2014/014059, International Search Report dated May 13, 2014", 3 pgs.

"International Application Serial No. PCT/US2014/014059, Written Opinion dated May 13, 2014", 8 pgs.

"Sandwich board", Wikipedia®. [online]. [retrieved on Aug. 1, 2016]. Retrieved from the internet: <URL: https://en.wikipedia.org/w/index.php?title=Sandwich_board&oldid=512706493>, (Sep. 15, 2012), 2 pgs.

"Town crier", Wikipedia®. [online]. [retrieved on Aug. 1, 2016]. Retrieved from the Internet: <URL: https://en.wikipedia.org/w/index.php?title=Town_crier&oldid=535745215>, (Jan. 30, 2013), 7 pgs.

U.S. Appl. No. 14/169,964, filed Jan. 31, 2014, Systems and Methods for Encrypting Location Broadcasts.

U.S. Appl. No. 15/352,404 U.S. Pat. No. 10,559,007, filed Nov. 15, 2016, System for the Secure Distributed Firmware and Configuration Update of Unnetworked Physical Devices.

"U.S. Appl. No. 15/352,404, Examiner Interview Summary dated Aug. 27, 2019", 3 pgs.

(56) References Cited

OTHER PUBLICATIONS

"U.S. Appl. No. 15/352,404, Final Office Action dated Jun. 26, 2019", 24 pgs.
"U.S. Appl. No. 15/352,404, Non Final Office Action dated Feb. 20, 2019", 21 pgs.
"U.S. Appl. No. 15/352,404, Notice of Allowance dated Sep. 23, 2019", 6 pgs.
"U.S. Appl. No. 15/352,404, Response filed May 17, 2019 to Non Final Office Action dated Feb. 20, 2019", 10 pgs.
"U.S. Appl. No. 15/352,404, Response filed Aug. 26, 2019 to Final Office Action dated Jun. 26, 2019", 12 pgs.

* cited by examiner

SYSTEM FOR THE SECURE DISTRIBUTED FIRMWARE AND CONFIGURATION UPDATE OF UN-NETWORKED PHYSICAL DEVICES

CROSS-REFERENCE TO RELATED PATENT APPLICATIONS

This application is a continuation-in-part of U.S. patent application Ser. No. 14/169,964, filed on Jan. 31, 2014 and titled "SYSTEMS AND METHODS FOR ENCRYPTING LOCATION BROADCASTS," which claims priority to U.S. Provisional Patent Application 61/759,641, filed Feb. 1, 2013, titled "Systems and Methods for Display of Supplemental Content Responsive to Micro-Location," and to U.S. Provisional Patent Application 61/822,568, filed May 13, 2013, titled "Systems and Methods for Display of Supplemental Content Responsive to Micro-Location," each of which are incorporated herein by reference in their entirety.

BACKGROUND OF THE DISCLOSURE

The merchandise offered by local and national retailers is always changing. The retailers may wish to display content to customers when the customers arrive to the store or are near specific merchandise. Presently it is difficult to detect where a customer is within a retail location. Additionally, when the retailer has a diverse number of products for sell and wishes to provide content to customers responsive to a number of different conditions, it is difficult for a retailer to easily and repeatedly associate specific content with specific merchandise.

Retailers may address this problem using beacons broadcasting a signal to support micro location detection. Large organizations may have thousands of locations with each location containing 100s of beacon devices. These devices are often not connected to any network and operate independently. The typical installation and maintenance process requires the direct one-to-one connection between the beacon device and a networked configuration device like a smartphone. This process requires a trust relationship between the phone and the device to safely configure or reconfigure the installed device(s). The process of visiting these 10s or 100s of thousands of devices becomes a major effort in time and money. The systems and methods of the present disclosure simplify and facilitate the process of updating beacons while also allowing a user to eliminate the trust relationship between the beacon and the networked configuration device.

BRIEF SUMMARY OF THE DISCLOSURE

Systems and methods are described herein for secure distributed update of un-networked physical devices. A client component for installation on a client device is provided wherein the client device is configured to receive, via the client component, a status data packet including a status indication from a beacon when the client is proximate to the beacon. The status data packet is received via the client component and at a server. It is determined by the server that an update is available for the beacon based at least in part on the status indication. An encrypted update data message relating to the update is transmitted by the server to the client device for installation at the beacon to complete the update of the beacon.

In one implementation, the encrypted update data message is transmitted by the client device to the beacon.

In one implementation, the encrypted update data packet is decrypted by the beacon to extract the update, validate the encrypted update data packet, and perform the update.

In one implementation, the status data packet is received by the client device from the beacon via a first wireless communication protocol. The status data packet is received by the server from the client device via a second wireless communication protocol without a direct network connection between the beacon and the server.

In one implementation, a nonce is included by the server in the encrypted update data packet.

In one implementation, the encrypted update data packet is validated by the beacon, and the validating comprises extracting the nonce and comparing the nonce to a previously received nonces.

In one implementation, an encrypted status message is transmitted by the beacon back to the server upon completed delivery.

In one implementation, a shared secret key that is known to the beacon and the server is used to perform the encryption.

In one implementation, determining, by the server, that an update is available for the beacon based at least in part on the status indication further comprises (1) retrieving, from a database, a desired status and (2) comparing the status indication to the desired status.

In one implementation, the client device includes any of a computer, a handheld device, and a point of sale (POS) register, and relays to the beacon the encrypted update data message without decrypting the encrypted update data message.

In one implementation, the encrypted update data message is transmitted to the client device without authenticating the client device.

In one implementation, the encrypted update data message is atomically packaged for transmission.

According to another aspect, the disclosure relates to a method for secure distributed updates of un-networked physical devices. A status data packet including a status indication from a beacon is received, via a client component installed at a client device, when the client is proximate to the beacon. The status data packet is transmitted via the client component to a server. An update indication that an update is available is obtained for the beacon based at least in part on the status indication. An encrypted update data message relating to the update for installation at the beacon to complete the update of the beacon is received from the server. The encrypted update data message is transmitted to the beacon.

In one implementation, obtaining the update indication includes searching a local database at the client device for previously downloaded update data.

In one implementation, obtaining the update indication includes receiving the update indication from the server, wherein the server determines that the update is available for the beacon based at least in part on the status indication.

In one implementation, the encrypted update data message is atomically packaged, and transmitted to the beacon from the client device without being decrypted at the client device.

In one implementation, the status data packet is received from the beacon via a first wireless communication protocol, and the status data packet is transmitted to the server from the client device via a second wireless communication protocol without a direct network connection between the beacon and the server.

In one implementation, the encrypted update data message is decrypted and installed at the beacon.

According to another aspect, the disclosure relates to a system for secure distributed update of un-networked physical devices, the system comprises a memory, a communication interface, and a processor. The memory stores a client component for installation on a client device and an encrypted update data message relating to an update for installation at a beacon. The communication interface is coupled to the memory and configured to: (1) provide the client component for installation on the client device, wherein the client device is configured to receive, via the client component, a status data packet including a status indication from a beacon when the client is proximate to the beacon, and (2) receive, from the client component, the status data packet, and (3) transmit the encrypted update data message relating to the update for installation at the beacon to complete the update of the beacon. The processor is coupled to the memory and configured to: (1) determine that the update is available for the beacon based at least in part on the status indication and (2) prepare the encrypted update data message.

According to another aspect, the disclosure relates to a processor-readable non-transitory storage medium storing processor-executable instructions for secure distributed update of un-networked physical devices, the processor-executable instructions being executed by a processor to (1) receive, via a client component installed at a client device, a status data packet including a status indication from a beacon when the client is proximate to the beacon, (2) transmit, via the client component and to a server, the status data packet, (3) obtain an update indication that an update is available for the beacon based at least in part on the status indication, (4) receive, from the server, an encrypted update data message relating to the update for installation at the beacon to complete the update of the beacon, and (5) transmit, to the beacon, the encrypted update data message.

BRIEF DESCRIPTION OF THE DRAWINGS

The foregoing and other objects, aspects, features, and advantages of the disclosure will become more apparent and better understood by referring to the following description taken in conjunction with the accompanying drawings, in which.

DETAILED DESCRIPTION

For purposes of reading the description of the various embodiments below, the following descriptions of the sections of the specification and their respective contents may be helpful.

A. Computing and Network Environment

Figure 1A:
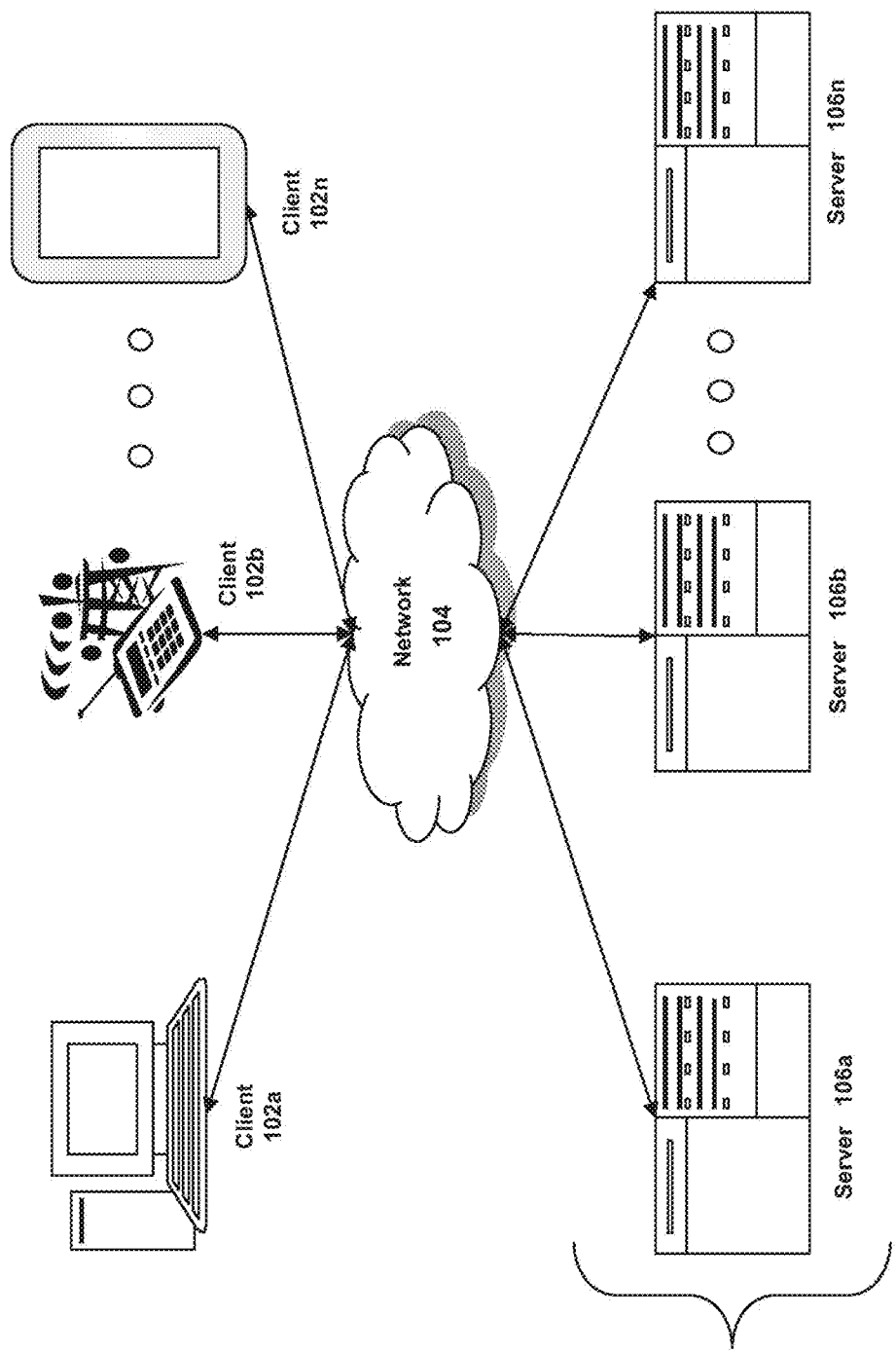
FIG. 1A is a block diagram depicting an embodiment of a network environment comprising client devices in communication with a server device, according to one implementation of the disclosure.

Prior to discussing specific embodiments of the present solution, it may be helpful to describe aspects of the operating environment as well as associated system components (e.g., hardware elements) in connection with the methods and systems described herein. Referring to FIG. 1A, an embodiment of a network environment is depicted. In brief overview, the network environment includes one or more client devices 102a-102n (also generally referred to as local machine(s) 102, client(s) 102, client node(s) 102, client machine(s) 102, client computer(s) 102, client device(s) 102, endpoint(s) 102, or endpoint node(s) 102) in communication with one or more servers 106a-106n (also generally referred to as server(s) 106, node 106, or remote machine(s) 106) via one or more networks 104. In some embodiments, a client device 102 has the capacity to function as both a client node seeking access to resources provided by a server and as a server providing access to hosted resources for other client devices 102a-102n.

Although FIG. 1A shows a network 104 between the client devices 102 and the servers 106, the client devices 102 and the servers 106 may be on the same network 104. In some embodiments, there are multiple networks 104 between the client devices 102 and the servers 106. In one of these embodiments, a network 104' (not shown) may be a private network and a network 104 may be a public network. In another of these embodiments, a network 104 may be a private network and a network 104' a public network. In still another of these embodiments, networks 104 and 104' may both be private networks.

The network 104 may be connected via wired or wireless links. Wired links may include Digital Subscriber Line (DSL), coaxial cable lines, or optical fiber lines. The wireless links may include BLUETOOTH, Wi-Fi, Worldwide Interoperability for Microwave Access (WiMAX), an infrared channel or satellite band. The wireless links may also include any cellular network standards used to communicate among mobile devices, including standards that qualify as 1G, 2G, 3G, or 4G. The network standards may qualify as one or more generation of mobile telecommunication standards by fulfilling a specification or standards such as the specifications maintained by International Telecommunication Union. The 3G standards, for example, may correspond to the International Mobile Telecommunications-2000 (IMT-2000) specification, and the 4G standards may correspond to the International Mobile Telecommunications Advanced (IMT-Advanced) specification. Examples of cellular network standards include AMPS, GSM, GPRS, UMTS, LTE, LTE Advanced, Mobile WiMAX, and WiMAX-Advanced. Cellular network standards may use various channel access methods e.g. FDMA, TDMA, CDMA, or SDMA. In some embodiments, different types of data may be transmitted via different links and standards. In other embodiments, the same types of data may be transmitted via different links and standards.

The network 104 may be any type and/or form of network. The geographical scope of the network 104 may vary widely and the network 104 can be a body area network (BAN), a personal area network (PAN), a local-area network (LAN), e.g. Intranet, a metropolitan area network (MAN), a wide area network (WAN), or the Internet. The topology of the network 104 may be of any form and may include, e.g., any of the following: point-to-point, bus, star, ring, mesh, or tree. The network 104 may be an overlay network which is virtual and sits on top of one or more layers of other networks 104'. The network 104 may be of any such network topology as known to those ordinarily skilled in the art capable of supporting the operations described herein. The network 104 may utilize different techniques and layers or stacks of protocols, including, e.g., the Ethernet protocol, the internet protocol suite (TCP/IP), the ATM (Asynchronous Transfer Mode) technique, the SONET (Synchronous Optical Networking) protocol, or the SDH (Synchronous Digital Hierarchy) protocol. The TCP/IP internet protocol suite may include application layer, transport layer, internet layer (including, e.g., IPv6), or the link layer. The network 104 may be a type of a broadcast network, a telecommunications network, a data communication network, or a computer network.

In some embodiments, the system may include multiple, logically-grouped servers 106. In one of these embodiments, the logical group of servers may be referred to as a server farm 38 or a machine farm 38. In another of these embodiments, the servers 106 may be geographically dispersed. In other embodiments, a machine farm 38 may be administered as a single entity. In still other embodiments, the machine farm 38 includes a plurality of machine farms 38. The servers 106 within each machine farm 38 can be heterogeneous—one or more of the servers 106 or machines 106 can operate according to one type of operating system platform (e.g., WINDOWS NT, manufactured by Microsoft Corp. of Redmond, Wash.), while one or more of the other servers 106 can operate on according to another type of operating system platform (e.g., Unix, Linux, or Mac OS X).

In one embodiment, servers 106 in the machine farm 38 may be stored in high-density rack systems, along with associated storage systems, and located in an enterprise data center. In this embodiment, consolidating the servers 106 in this way may improve system manageability, data security, the physical security of the system, and system performance by locating servers 106 and high performance storage systems on localized high performance networks. Centralizing the servers 106 and storage systems and coupling them with advanced system management tools allows more efficient use of server resources.

The servers 106 of each machine farm 38 do not need to be physically proximate to another server 106 in the same machine farm 38. Thus, the group of servers 106 logically grouped as a machine farm 38 may be interconnected using a wide-area network (WAN) connection or a metropolitan-area network (MAN) connection. For example, a machine farm 38 may include servers 106 physically located in different continents or different regions of a continent, country, state, city, campus, or room. Data transmission speeds between servers 106 in the machine farm 38 can be increased if the servers 106 are connected using a local-area network (LAN) connection or some form of direct connection. Additionally, a heterogeneous machine farm 38 may include one or more servers 106 operating according to a type of operating system, while one or more other servers 106 execute one or more types of hypervisors rather than operating systems. In these embodiments, hypervisors may be used to emulate virtual hardware, partition physical hardware, virtualize physical hardware, and execute virtual machines that provide access to computing environments, allowing multiple operating systems to run concurrently on a host computer. Native hypervisors may run directly on the host computer. Hypervisors may include VMware ESX/ESXi, manufactured by VMWare, Inc., of Palo Alto, Calif.; the Xen hypervisor, an open source product whose development is overseen by Citrix Systems, Inc.; the HYPER-V hypervisors provided by Microsoft or others. Hosted hypervisors may run within an operating system on a second software level. Examples of hosted hypervisors may include VMware Workstation and VIRTUALBOX.

Management of the machine farm 38 may be de-centralized. For example, one or more servers 106 may comprise components, subsystems and modules to support one or more management services for the machine farm 38. In one of these embodiments, one or more servers 106 provide functionality for management of dynamic data, including techniques for handling failover, data replication, and increasing the robustness of the machine farm 38. Each server 106 may communicate with a persistent store and, in some embodiments, with a dynamic store.

Server 106 may be a file server, application server, web server, proxy server, appliance, network appliance, gateway, gateway server, virtualization server, deployment server, SSL VPN server, or firewall. In one embodiment, the server 106 may be referred to as a remote machine or a node. In another embodiment, a plurality of nodes 290 may be in the path between any two communicating servers.

Figure 1B:
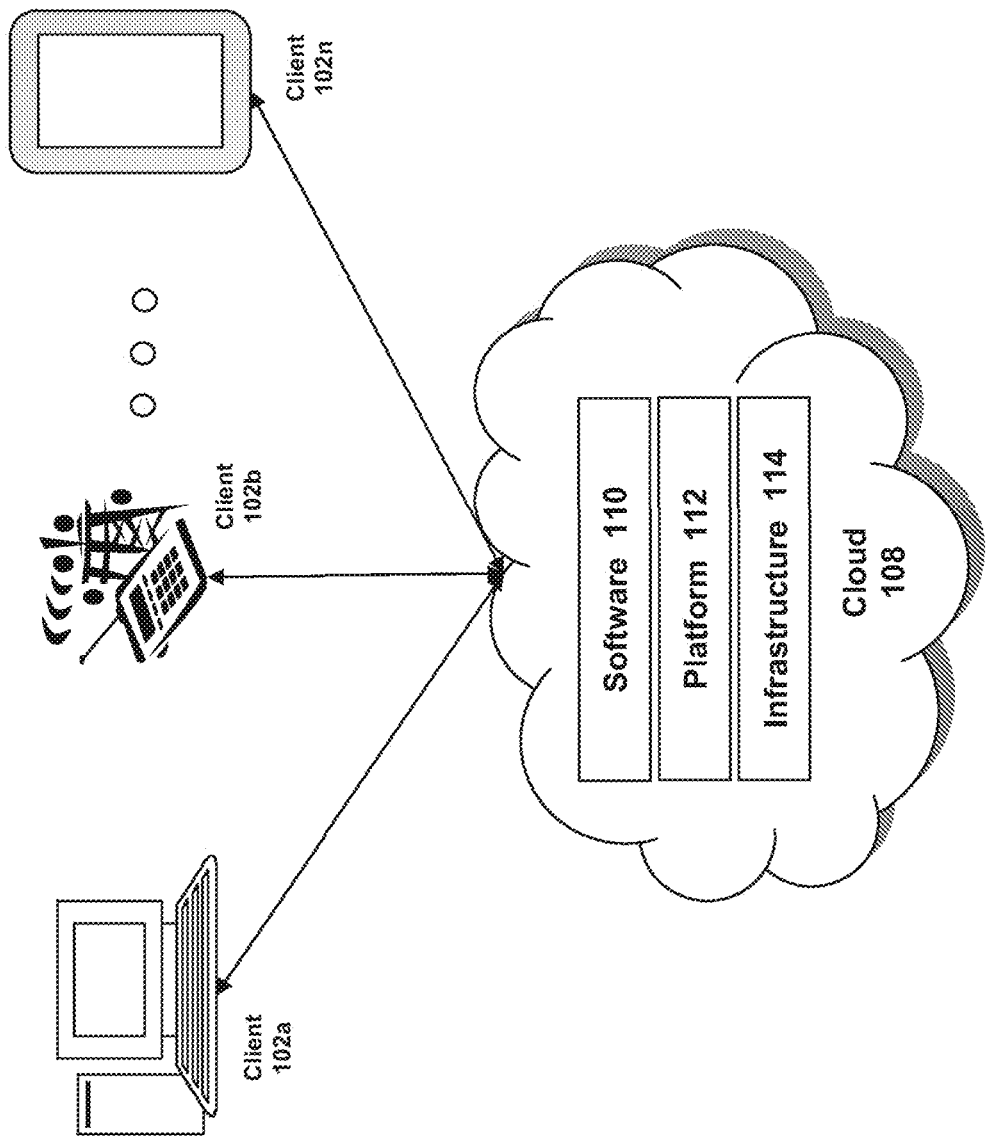
FIG. 1B is a block diagram depicting a cloud computing environment comprising a client device in communication with a cloud service provider, according to one implementation of the disclosure.

Referring to FIG. 1B, a cloud computing environment is depicted. A cloud computing environment may provide client device 102 with one or more resources provided by a network environment. The cloud computing environment may include one or more client devices 102a-102n, in communication with the cloud 108 over one or more networks 104. Client devices 102 may include, e.g., thick clients, thin clients, and zero clients. A thick client may provide at least some functionality even when disconnected from the cloud 108 or servers 106. A thin client or a zero client may depend on the connection to the cloud 108 or server 106 to provide functionality. A zero client may depend on the cloud 108 or other networks 104 or servers 106 to retrieve operating system data for the client device. The cloud 108 may include back end platforms, e.g., servers 106, storage, server farms or data centers.

The cloud 108 may be public, private, or hybrid. Public clouds may include public servers 106 that are maintained by third parties to the client devices 102 or the owners of the clients. The servers 106 may be located off-site in remote geographical locations as disclosed above or otherwise. Public clouds may be connected to the servers 106 over a public network. Private clouds may include private servers 106 that are physically maintained by client devices 102 or owners of clients. Private clouds may be connected to the servers 106 over a private network 104. Hybrid clouds 108 may include both the private and public networks 104 and servers 106.

The cloud 108 may also include a cloud based delivery, e.g. Software as a Service (SaaS) 110, Platform as a Service (PaaS) 112, and Infrastructure as a Service (IaaS) 114. IaaS may refer to a user renting the use of infrastructure resources that are needed during a specified time period. IaaS providers may offer storage, networking, servers or virtualization resources from large pools, allowing the users to quickly scale up by accessing more resources as needed. Examples of IaaS include AMAZON WEB SERVICES provided by Amazon.com, Inc., of Seattle, Wash., RACKSPACE CLOUD provided by Rackspace US, Inc., of San Antonio, Tex., Google Compute Engine provided by Google Inc. of Mountain View, Calif., or RIGHTSCALE provided by RightScale, Inc., of Santa Barbara, Calif. PaaS providers may offer functionality provided by IaaS, including, e.g., storage, networking, servers or virtualization, as well as additional resources such as, e.g., the operating system, middleware, or runtime resources. Examples of PaaS include WINDOWS AZURE provided by Microsoft Corporation of Redmond, Wash., Google App Engine provided by Google Inc., and HEROKU provided by Heroku, Inc. of San Francisco, Calif. SaaS providers may offer the resources that PaaS provides, including storage, networking, servers, virtualization, operating system, middleware, or runtime resources. In some embodiments, SaaS providers may offer additional resources including, e.g., data and application resources. Examples of SaaS include GOOGLE APPS provided by Google Inc., SALESFORCE provided by Salesforce.com Inc. of San Francisco, Calif., or OFFICE 365 provided by Microsoft Corporation. Examples of SaaS may also include data storage providers, e.g. DROPBOX provided by Dropbox, Inc. of San Francisco, Calif., Microsoft SKYDRIVE provided by Microsoft Corporation, Google Drive provided by Google Inc., or Apple ICLOUD provided by Apple Inc. of Cupertino, Calif.

Client devices 102 may access IaaS resources with one or more IaaS standards, including, e.g., Amazon Elastic Compute Cloud (EC2), Open Cloud Computing Interface (OCCI), Cloud Infrastructure Management Interface (CIMI), or OpenStack standards. Some IaaS standards may allow clients access to resources over HTTP, and may use Representational State Transfer (REST) protocol or Simple Object Access Protocol (SOAP). Client devices 102 may access PaaS resources with different PaaS interfaces. Some PaaS interfaces use HTTP packages, standard Java APIs, JavaMail API, Java Data Objects (JDO), Java Persistence API (JPA), Python APIs, web integration APIs for different programming languages including, e.g., Rack for Ruby, WSGI for Python, or PSGI for Perl, or other APIs that may be built on REST, HTTP, XML, or other protocols. Client devices 102 may access SaaS resources through the use of web-based user interfaces, provided by a web browser (e.g. GOOGLE CHROME, Microsoft INTERNET EXPLORER, or Mozilla Firefox provided by Mozilla Foundation of Mountain View, Calif.). Client devices 102 may also access SaaS resources through smartphone or tablet applications, including, e.g., Salesforce Sales Cloud, or Google Drive app. Client devices 102 may also access SaaS resources through the client operating system, including, e.g., Windows file system for DROPBOX.

In some embodiments, access to IaaS, PaaS, or SaaS resources may be authenticated. For example, a server or authentication server may authenticate a user via security certificates. HTTPS, or API keys. API keys may include various encryption standards such as, e.g., Advanced Encryption Standard (AES). Data resources may be sent over Transport Layer Security (TLS) or Secure Sockets Layer (SSL).

Figure 1C:
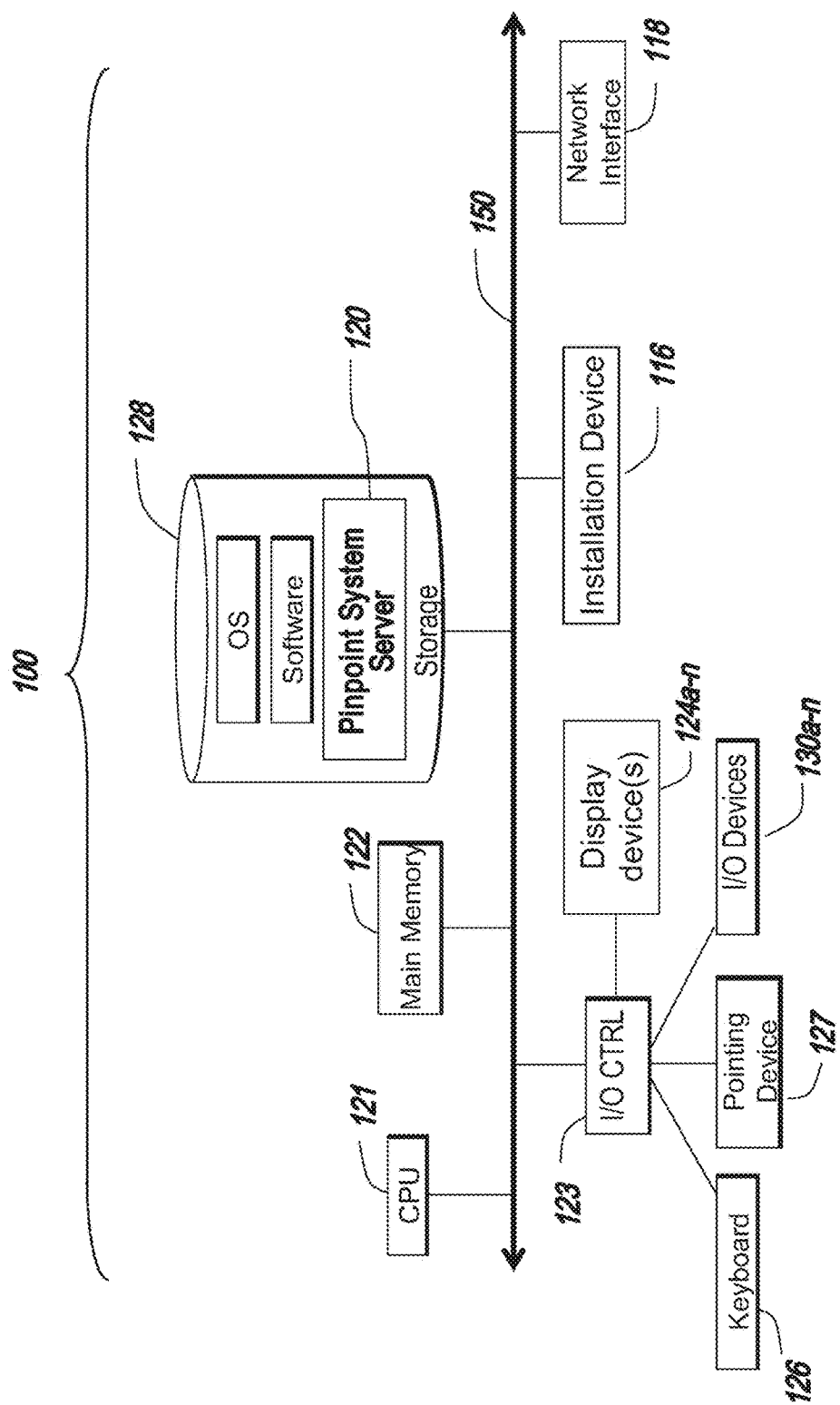
FIGS. 1C and 1D are block diagrams depicting embodiments of computing devices useful in connection with the methods and systems described herein, according to one implementation of the disclosure.
Figure 1D:
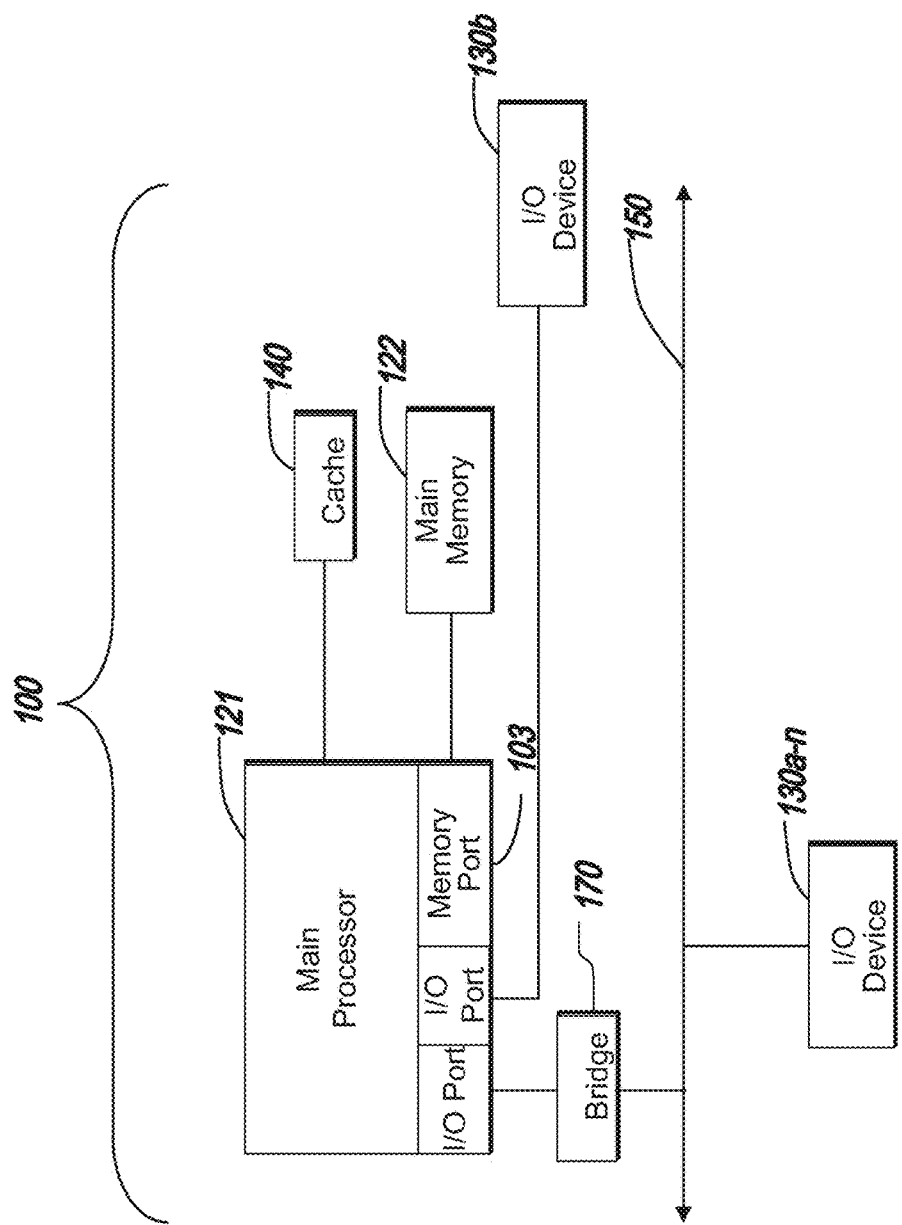

The client device 102 and server 106 may be deployed as and/or executed on any type and form of computing device, e.g. a computer, network device or appliance capable of communicating on any type and form of network and performing the operations described herein. FIGS. 1C and 1D depict block diagrams of a computing device 100 useful for practicing an embodiment of the client device 102 or a server 106. As shown in FIGS. 1C and 1D, each computing device 100 includes a central processing unit 121, and a main memory unit 122. As shown in FIG. 1C, a computing device 100 may include a storage device 128, an installation device 116, a network interface 118, an I/O controller 123, display devices 124a-124n, a keyboard 126 and a pointing device 127, e.g. a mouse. The storage device 128 may include, without limitation, an operating system, software, and a software of a Pinpoint System Server 120. As shown in FIG. 1D, each computing device 100 may also include additional optional elements, e.g. a memory port 103, a bridge 170, one or more input/output devices 130a-130n (generally referred to using reference numeral 130), and a cache memory 140 in communication with the central processing unit 121.

The central processing unit 121 is any logic circuitry that responds to and processes instructions fetched from the main memory unit 122. In many embodiments, the central processing unit 121 is provided by a microprocessor unit, e.g.: those manufactured by Intel Corporation of Mountain View, Calif.; those manufactured by Motorola Corporation of Schaumburg, Ill.; the ARM processor and TEGRA system on a chip (SoC) manufactured by Nvidia of Santa Clara, Calif.; the POWER7 processor, those manufactured by International Business Machines of White Plains, N.Y.; or those manufactured by Advanced Micro Devices of Sunnyvale, Calif. The computing device 100 may be based on any of these processors, or any other processor capable of operating as described herein. The central processing unit 121 may utilize instruction level parallelism, thread level parallelism, different levels of cache, and multi-core processors. A multi-core processor may include two or more processing units on a single computing component. Examples of a multi-core processors include the AMD PHENOM IIX2, INTEL CORE i5 and INTEL CORE i7.

Main memory unit 122 may include one or more memory chips capable of storing data and allowing any storage location to be directly accessed by the microprocessor 121. Main memory unit 122 may be volatile and faster than storage 128 memory. Main memory units 122 may be Dynamic random access memory (DRAM) or any variants, including static random access memory (SRAM), Burst SRAM or SynchBurst SRAM (BSRAM), Fast Page Mode DRAM (FPM DRAM), Enhanced DRAM (EDRAM), Extended Data Output RAM (EDO RAM), Extended Data Output DRAM (EDO DRAM), Burst Extended Data Output DRAM (BEDO DRAM), Single Data Rate Synchronous DRAM (SDR SDRAM), Double Data Rate SDRAM (DDR SDRAM), Direct Rambus DRAM (DRDRAM), or Extreme Data Rate DRAM (XDR DRAM). In some embodiments, the main memory 122 or the storage 128 may be non-volatile; e.g., non-volatile read access memory (NVRAM), flash memory non-volatile static RAM (nvSRAM), Ferroelectric RAM (FeRAM), Magnetoresistive RAM (MRAM), Phase-change memory (PRAM), conductive-bridging RAM (CBRAM), Silicon-Oxide-Nitride-Oxide-Silicon (SONOS), Resistive RAM (RRAM), Racetrack, Nano-RAM (NRAM), or Millipede memory. The main memory 122 may be based on any of the above described memory chips, or any other available memory chips capable of operating as described herein. In the embodiment shown in FIG. 1C, the processor 121 communicates with main memory 122 via a system bus 150 (described in more detail below). FIG. 1D depicts an embodiment of a computing device 100 in which the processor communicates directly with main memory 122 via a memory port 103. For example, in FIG. 1D the main memory 122 may be DRDRAM.

FIG. 1D depicts an embodiment in which the main processor 121 communicates directly with cache memory 140 via a secondary bus, sometimes referred to as a backside bus. In other embodiments, the main processor 121 communicates with cache memory 140 using the system bus 150. Cache memory 140 typically has a faster response time than main memory 122 and is typically provided by SRAM, BSRAM, or EDRAM. In the embodiment shown in FIG. 1D, the processor 121 communicates with various I/O devices 130 via a local system bus 150. Various buses may be used to connect the central processing unit 121 to any of the I/O devices 130, including a PCI bus, a PCI-X bus, or a PCI-Express bus, or a NuBus. For embodiments in which the I/O device is a video display 124, the processor 121 may use an Advanced Graphics Port (AGP) to communicate with the display 124 or the I/O controller 123 for the display 124. FIG. 1D depicts an embodiment of a computer 100 in which the main processor 121 communicates directly with I/O device 130b or other processors 121' via HYPERTRANSPORT, RAPIDIO, or INFINIBAND communications technology. FIG. 1D also depicts an embodiment in which local busses and direct communication are mixed: the processor 121 communicates with I/O device 130a using a local interconnect bus while communicating with I/O device 130b directly.

A wide variety of I/O devices 130a-130n may be present in the computing device 100. Input devices may include keyboards, mice, trackpads, trackballs, touchpads, touch mice, multi-touch touchpads and touch mice, microphones, multi-array microphones, drawing tablets, cameras, single-lens reflex camera (SLR), digital SLR (DSLR), CMOS sensors, accelerometers, infrared optical sensors, pressure sensors, magnetometer sensors, angular rate sensors, depth sensors, proximity sensors, ambient light sensors, gyroscopic sensors, or other sensors. Output devices may include video displays, graphical displays, speakers, headphones, inkjet printers, laser printers, and 3D printers.

Devices 130a-130n may include a combination of multiple input or output devices, including, e.g., Microsoft KINECT, Nintendo Wiimote for the WII, Nintendo WII U GAMEPAD, or Apple IPHONE. Some devices 130a-130n allow gesture recognition inputs through combining some of the inputs and outputs. Some devices 130a-130n provides for facial recognition which may be utilized as an input for different purposes including authentication and other commands. Some devices 130a-130n provides for voice recognition and inputs, including, e.g., Microsoft KINECT, SIRI for IPHONE by Apple, Google Now or Google Voice Search.

Additional devices 130a-130n have both input and output capabilities, including, e.g., haptic feedback devices, touchscreen displays, or multi-touch displays. Touchscreen, multi-touch displays, touchpads, touch mice, or other touch sensing devices may use different technologies to sense touch, including, e.g., capacitive, surface capacitive, projected capacitive touch (PCT), in-cell capacitive, resistive, infrared, waveguide, dispersive signal touch (DST), in-cell optical, surface acoustic wave (SAW), bending wave touch (BWT), or force-based sensing technologies. Some multi-touch devices may allow two or more contact points with the surface, allowing advanced functionality including, e.g., pinch, spread, rotate, scroll, or other gestures. Some touchscreen devices, including, e.g., Microsoft PIXELSENSE or Multi-Touch Collaboration Wall, may have larger surfaces, such as on a table-top or on a wall, and may also interact with other electronic devices. Some I/O devices 130a-130n, display devices 124a-124n or group of devices may be augment reality devices. The I/O devices may be controlled by an I/O controller 123 as shown in FIG. 1C. The I/O controller may control one or more I/O devices, such as, e.g., a keyboard 126 and a pointing device 127, e.g., a mouse or optical pen. Furthermore, an I/O device may also provide storage and/or an installation medium 116 for the computing device 100. In still other embodiments, the computing device 100 may provide USB connections (not shown) to receive handheld USB storage devices. In further embodiments, an I/O device 130 may be a bridge between the system bus 150 and an external communication bus, e.g. a USB bus, a SCSI bus, a FireWire bus, an Ethernet bus, a Gigabit Ethernet bus, a Fibre Channel bus, or a Thunderbolt bus.

In some embodiments, display devices 124a-124n may be connected to I/O controller 123. Display devices may include, e.g., liquid crystal displays (LCD), thin film transistor LCD (TFT-LCD), blue phase LCD, electronic papers (e-ink) displays, flexile displays, light emitting diode displays (LED), digital light processing (DLP) displays, liquid crystal on silicon (LCOS) displays, organic light-emitting diode (OLED) displays, active-matrix organic light-emitting diode (AMOLED) displays, liquid crystal laser displays, time-multiplexed optical shutter (TMOS) displays, or 3D displays. Examples of 3D displays may use, e.g. stereoscopy, polarization filters, active shutters, or autostereoscopy. Display devices 124a-124n may also be a head-mounted display (HMD). In some embodiments, display devices 124*a*-124*n* or the corresponding I/O controllers 123 may be controlled through or have hardware support for OPENGL or DIRECTX API or other graphics libraries.

In some embodiments, the computing device 100 may include or connect to multiple display devices 124*a*-124*n*, which each may be of the same or different type and/or form. As such, any of the I/O devices 130*a*-130*n* and/or the I/O controller 123 may include any type and/or form of suitable hardware, software, or combination of hardware and software to support, enable or provide for the connection and use of multiple display devices 124*a*-124*n* by the computing device 100. For example, the computing device 100 may include any type and/or form of video adapter, video card, driver, and/or library to interface, communicate, connect or otherwise use the display devices 124*a*-124*n*. In one embodiment, a video adapter may include multiple connectors to interface to multiple display devices 124*a*-124*n*. In other embodiments, the computing device 100 may include multiple video adapters, with each video adapter connected to one or more of the display devices 124*a*-124*n*. In some embodiments, any portion of the operating system of the computing device 100 may be configured for using multiple displays 124*a*-124*n*. In other embodiments, one or more of the display devices 124*a*-124*n* may be provided by one or more other computing devices 100*a* or 100*b* connected to the computing device 100, via the network 104. In some embodiments software may be designed and constructed to use another computer's display device as a second display device 124*a* for the computing device 100. For example, in one embodiment, an Apple iPad may connect to a computing device 100 and use the display of the device 100 as an additional display screen that may be used as an extended desktop. One ordinarily skilled in the art will recognize and appreciate the various ways and embodiments that a computing device 100 may be configured to have multiple display devices 124*a*-124*n*.

Referring again to FIG. 1C, the computing device 100 may comprise a storage device 128 (e.g. one or more hard disk drives or redundant arrays of independent disks) for storing an operating system or other related software, and for storing application software programs such as any program related to the Pinpoint System Server 120. Examples of storage device 128 include, e.g., hard disk drive (HDD); optical drive including CD drive, DVD drive, or BLU-RAY drive; solid-state drive (SSD); USB flash drive; or any other device suitable for storing data. Some storage devices may include multiple volatile and non-volatile memories, including, e.g., solid state hybrid drives that combine hard disks with solid state cache. Some storage device 128 may be non-volatile, mutable, or read-only. Some storage device 128 may be internal and connect to the computing device 100 via a bus 150. Some storage device 128 may be external and connect to the computing device 100 via a I/O device 130 that provides an external bus. Some storage device 128 may connect to the computing device 100 via the network interface 118 over a network 104, including, e.g., the Remote Disk for MACBOOK AIR by Apple. Some client devices 100 may not require a non-volatile storage device 128 and may be thin clients or zero client devices 102. Some storage device 128 may also be used as an installation device 116, and may be suitable for installing software and programs. Additionally, the operating system and the software can be run from a bootable medium, for example, a bootable CD, e.g. KNOPPIX, a bootable CD for GNU/Linux that is available as a GNU/Linux distribution from knoppix.net.

Client device 100 may also install software or application from an application distribution platform. Examples of application distribution platforms include the App Store for iOS provided by Apple, Inc., the Mac App Store provided by Apple, Inc., GOOGLE PLAY for Android OS provided by Google Inc., Chrome Webstore for CHROME OS provided by Google Inc., and Amazon Appstore for Android OS and KINDLE FIRE provided by Amazon.com, Inc. An application distribution platform may facilitate installation of software on a client device 102. An application distribution platform may include a repository of applications on a server 106 or a cloud 108, which the client devices 102*a*-102*n* may access over a network 104. An application distribution platform may include application developed and provided by various developers. A user of a client device 102 may select, purchase and/or download an application via the application distribution platform.

Furthermore, the computing device 100 may include a network interface 118 to interface to the network 104 through a variety of connections including, but not limited to, standard telephone lines LAN or WAN links (e.g., 802.11, T1, T3, Gigabit Ethernet, Infiniband), broadband connections (e.g., ISDN, Frame Relay, ATM, Gigabit Ethernet, Ethernet-over-SONET, ADSL, VDSL, BPON, GPON, fiber optical including FiOS), wireless connections, or some combination of any or all of the above. Connections can be established using a variety of communication protocols (e.g., TCP/IP, Ethernet, ARCNET, SONET, SDH, Fiber Distributed Data Interface (FDDI), IEEE 802.11a/b/g/n/ac CDMA, GSM, WiMax and direct asynchronous connections). In one embodiment, the computing device 100 communicates with other computing devices 100' via any type and/or form of gateway or tunneling protocol e.g. Secure Socket Layer (SSL) or Transport Layer Security (TLS), or the Citrix Gateway Protocol manufactured by Citrix Systems, Inc. of Ft. Lauderdale, Fla. The network interface 118 may comprise a built-in network adapter, network interface card, PCMCIA network card, EXPRESSCARD network card, card bus network adapter, wireless network adapter, USB network adapter, modem or any other device suitable for interfacing the computing device 100 to any type of network capable of communication and performing the operations described herein.

A computing device 100 of the sort depicted in FIGS. 1B and 1C may operate under the control of an operating system, which controls scheduling of tasks and access to system resources. The computing device 100 can be running any operating system such as any of the versions of the MICROSOFT WINDOWS operating systems, the different releases of the Unix and Linux operating systems, any version of the MAC OS for Macintosh computers, any embedded operating system, any real-time operating system, any open source operating system, any proprietary operating system, any operating systems for mobile computing devices, or any other operating system capable of running on the computing device and performing the operations described herein. Typical operating systems include, but are not limited to: WINDOWS 2000, WINDOWS Server 2012, WINDOWS CE, WINDOWS Phone, WINDOWS XP, WINDOWS VISTA, and WINDOWS 7, WINDOWS RT, and WINDOWS 8 all of which are manufactured by Microsoft Corporation of Redmond, Wash.; MAC OS and iOS, manufactured by Apple, Inc. of Cupertino, Calif.; and Linux, a freely-available operating system, e.g. Linux Mint distribution ("distro") or Ubuntu, distributed by Canonical Ltd. of London, United Kingdom; or Unix or other Unix-like derivative operating systems; and Android, designed by Google, of Mountain View, Calif., among others. Some operating systems, including, e.g., the CHROME OS by Google, may be used on zero clients or thin clients, including, e.g., CHROMEBOOKS.

The computer system 100 can be any workstation, telephone, desktop computer, laptop or notebook computer, netbook, ULTRABOOK, tablet, server, handheld computer, mobile telephone, smartphone or other portable telecommunications device, media playing device, a gaming system, mobile computing device, or any other type and/or form of computing, telecommunications or media device that is capable of communication. The computer system 100 has sufficient processor power and memory capacity to perform the operations described herein. In some embodiments, the computing device 100 may have different processors, operating systems, and input devices consistent with the device. The Samsung GALAXY smartphones, e.g., operate under the control of Android operating system developed by Google, Inc. GALAXY smartphones receive input via a touch interface.

In some embodiments, the computing device 100 is a gaming system. For example, the computer system 100 may comprise a PLAYSTATION 3, or PERSONAL PLAYSTATION PORTABLE (PSP), or a PLAYSTATION VITA device manufactured by the Sony Corporation of Tokyo, Japan, a NINTENDO DS, NINTENDO 3DS, NINTENDO WII, or a NINTENDO WII U device manufactured by Nintendo Co., Ltd., of Kyoto, Japan, an XBOX 360 device manufactured by the Microsoft Corporation of Redmond, Wash.

In some embodiments, the computing device 100 is a digital audio player such as the Apple IPOD, IPOD Touch, and IPOD NANO lines of devices, manufactured by Apple Computer of Cupertino, Calif. Some digital audio players may have other functionality, including, e.g., a gaming system or any functionality made available by an application from a digital application distribution platform. For example, the IPOD Touch may access the Apple App Store. In some embodiments, the computing device 100 is a portable media player or digital audio player supporting file formats including, but not limited to, MP3, WAV, M4A/AAC, WMA Protected AAC, AIFF, Audible audiobook, Apple Lossless audio file formats and .mov, .m4v, and .mp4 MPEG-4 (H.264/MPEG-4 AVC) video file formats.

In some embodiments, the computing device 100 is a tablet e.g. the IPAD line of devices by Apple; GALAXY TAB family of devices by Samsung, or KINDLE FIRE, by Amazon.com, Inc. of Seattle, Wash. In other embodiments, the computing device 100 is a eBook reader, e.g. the KINDLE family of devices by Amazon.com, or NOOK family of devices by Barnes & Noble, Inc. of New York City, N.Y.

In some embodiments, the communications device 102 includes a combination of devices, e.g. a smartphone combined with a digital audio player or portable media player. For example, one of these embodiments is a smartphone, e.g. the IPHONE family of smartphones manufactured by Apple, Inc.; a Samsung GALAXY family of smartphones manufactured by Samsung, Inc; or a Motorola DROID family of smartphones. In yet another embodiment, the communications device 102 is a laptop or desktop computer equipped with a web browser and a microphone and speaker system, e.g. a telephony headset. In these embodiments, the communications devices 102 are web-enabled and can receive and initiate phone calls. In some embodiments, a laptop or desktop computer is also equipped with a webcam or other video capture device that enables video chat and video call.

In some embodiments, the status of one or more machines 102, 106 in the network 104 is monitored, generally as part of network management. In one of these embodiments, the status of a machine may include an identification of load information (e.g., the number of processes on the machine, CPU and memory utilization), of port information (e.g., the number of available communication ports and the port addresses), or of session status (e.g., the duration and type of processes, and whether a process is active or idle). In another of these embodiments, this information may be identified by a plurality of metrics, and the plurality of metrics can be applied at least in part towards decisions in load distribution, network traffic management, and network failure recovery as well as any aspects of operations of the present solution described herein. Aspects of the operating environments and components described above will become apparent in the context of the systems and methods disclosed herein.

B. System for Determining Location and Delivering Content

The present disclosure is directed towards systems and methods for providing supplemental content to a user based on the user's location and preferences. In some implementations, the system and methods described herein are implemented with the computer and network environment of FIGS. 1A-1D. As described herein, a user's location can include the user's micro-location within the premises of a store, building, or outdoor location. For example, the system may narrow the location of a client device to a specific section within a store.

While the system and methods have been particularly shown and described with reference to specific implementations, it should be understood by those skilled in the art that various changes in form and detail may be made therein without departing from the spirit and scope of the system and methods described in this disclosure.

Figure 2A:
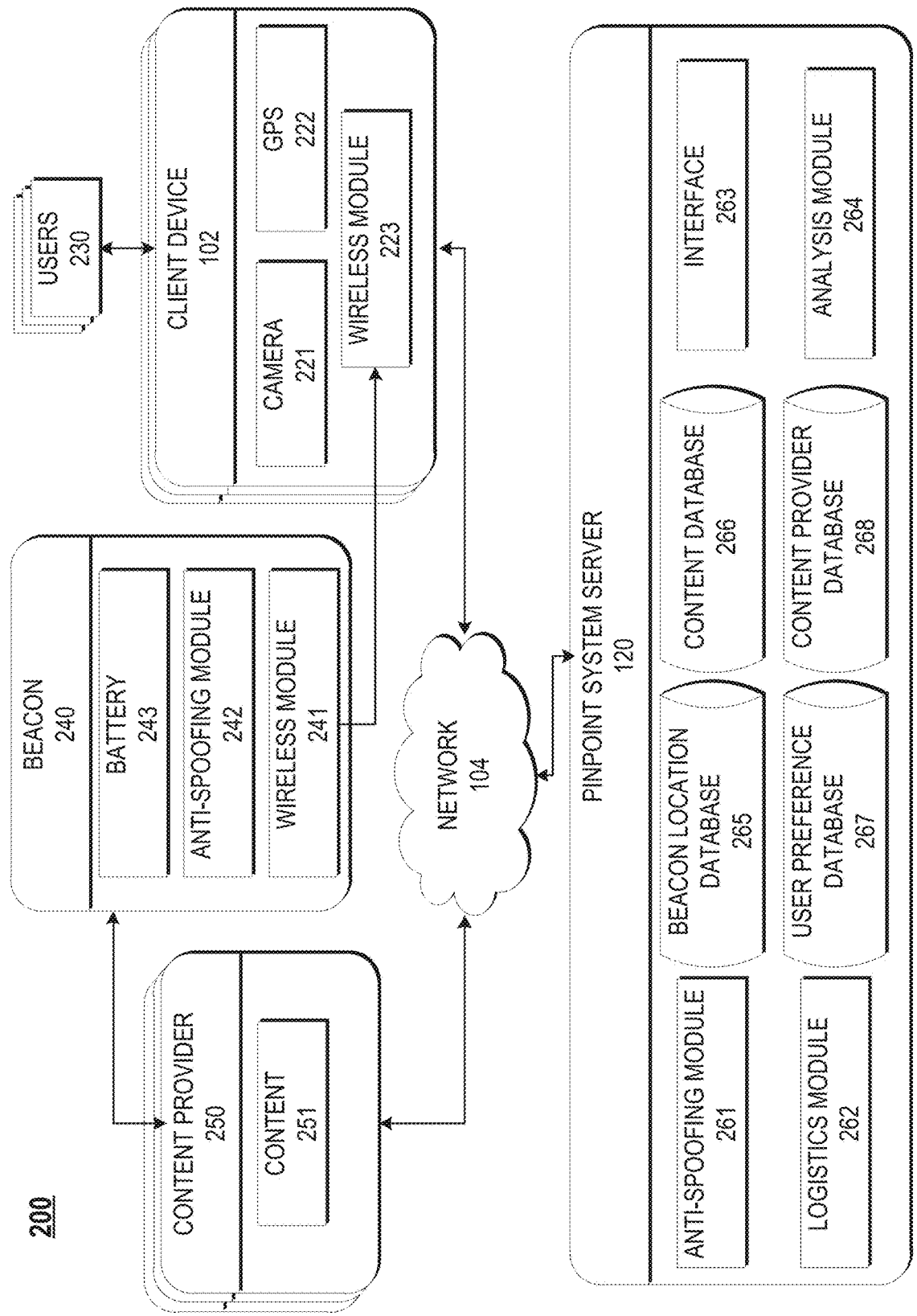
FIG. 2A is a block diagram of a system for delivering content responsive to a client's location, according to one implementation of the disclosure.

FIG. 2A is a schematic representation of a Pinpoint Network (PN) 200 for delivering content responsive to a client's location. As a brief overview, the PN 200 includes a Pinpoint System Server (PSS) 120. The PSS 120 may include a plurality of components and modules. These modules may include an anti-spoofing module 261, a logistics module 262, user interface module 263, and an analysis module 264. Additionally, the PSS 120 includes at least one database. The databases may include a beacon location database 265, a content database 266, a user preference database 267, and a content provider database 268.

The PN 200 can also include a plurality of client devices 102 each in use by a user 230. The client devices 102 may include a camera 221, a GPS module 222, and a wireless module 223. The PN 200 also includes at least one beacon 240. The beacon 240 includes a wireless module 241 for communicating with the client device 102 (or PSS 120), an anti-spoofing module 242, and a battery 243. Additionally, the PN 200 includes at least one content provider 250 that provides supplemental content 251 to the PSS 120. The PSS 120 delivers supplemental content 251 to the plurality of client devices 102. The above described components of the PN 200 are connected by a network 104.

In some implementations, the content provider 250 a merchant that sells merchandise (or more generically referred to as content) to customers or users. In some implementations, the supplemental content 251 is associated with the content for sell by the content provider 250. For example, the content provider 250 may be a clothing store selling content such as women's and men's fashions. In this example, the supplemental content 251 may include information or other digital content related to the fashions for sell by the clothing store. The content provider 250 may place a beacon 240 near specific content in the content provider's store. For example, the content provider 250 may place a first beacon 240 near a display of sweaters and a second beacon 240 near a rack of women's jeans. In other implementations, the beacon 240 may be also placed near a non-content item, such as a door, cash register, or be positioned such that the beacon 240 is near a plurality of content items. The PSS 120 may deliver supplemental content 251 to a client device 102 when the PSS 120 determines the client device 102 is within a predetermined proximity of a beacon 240.

The beacon 240 includes a wireless module 241, an anti-spoofing module 242, and a battery 243. The wireless module 241 may be a WIFI radio, a Bluetooth radio, RFID tag and/or similar wireless transmitter or receiver. In some implementations, the wireless module 241 is only a wireless transmitter. For example, the beacon 240 may broadcast a signal that is detected by the client device 102, but may not receive a signal from the client device 102. The wireless module 241 may be a low power wireless module such as a Bluetooth 4.0 (i.e., low energy) radio. Additionally, or alternatively, the wireless module 241 may cycle on and off to conserve energy. In some implementations, the cycling may occur based on time of day or the detection of a nearby user. The beacon 240 may be configured to only broadcast a wireless signal during business hours. In some implementations, the wireless module 241 emits a wireless signal that covers a predetermined proximity zone. As described in greater detail below, the beacon 240 may broadcast a unique beacon identification number over the wireless signal, which is detected by the client device 102. In some implementations, the size and shape of the proximity zone may be adjusted. For example, the size of the proximity zone may be adjusted by altering the power level of the wireless signal. For example, the power level of the wireless signal may be set to one of 4 dB, 0 dB, −6 dB, or −23 dB.

In some implementations, the beacon identification number is a unique identifier number that may not be detected if one is outside the defined proximity zone. In some implementations, a plurality of beacons 240 may be daisy chained together such that they create a unified proximity zone. For example, a content provider 250 may wish to have a single proximity zone cover an entire store rather than having micro proximity zones distributed throughout the store. In this example, each of the daisy changed Beacons 240 broadcast the same Beacon identification number.

Only able to detect the beacon identification number within the proximity zone allows the PSS 120 to determine a location of the client device 102. For example, and as described in greater detail below, if the client is detecting the beacon identification number 39475423, then the client must be within the proximity zone of the beacon 240 having the identification number of 39475423. Accordingly, the PSS 120 may associate the location of the beacon 240 with the client device 102.

In some implementations, the wireless module 241 allows the beacon 240 to communicate directly with the PSS 120 via the network 104. In other implementations, as in the implementation of FIG. 2A, the beacon 240 does not communicate directly with the PSS 120, but rather passes data to the client device 102, which then forwards the data to the PSS 120. The method of forwarding data from the Beacon 240 to the PSS 120, via a client device 102, is discussed in greater detail in relation to FIGS. 2B-3B.

In some implementations, the data transmitted from a beacon 240 to the client device 102 or PSS 120 is encrypted, for example, with 16 byte AES encryption. The data may include an AES key identifier, a beacon ID, a MAC address, the current battery level, beacon uptime, data, random data, or any combination thereof. The beacon ID may be randomly generated, and in some implementations, updated at specific intervals. For example, the beacon ID may be generated using a function (e.g., a hash function), which generates a new beacon ID at periodic intervals. The PSS 120 may have the same hash function and may update its record of the beacon IDs as the beacons 240 updates their beacon IDs. In some implementations, updating the beacon ID is done to prevent spoofing of the beacon 240 and its data. An example method of encrypting the communication within the PN 200 is described in greater detail in relation to FIG. 3C.

As described above, the beacon 240 can include an anti-spoofing module 242. The anti-spoofing module 242 may ensure the data transmitted from the beacon 240 to the PSS 120 is authentic. As discussed below, in some implementations, the PSS 120 may provide a user 230 with supplemental content when the user's client device 102 is within a predetermined proximity zone of a beacon 240. The supplemental content may be a coupon, loyalty points, or other benefit. Accordingly, a content provider 250 may desire to ensure the client device 102 is actually located in the expected location before providing supplemental content to the client device 102. The anti-spoofing module 242 may use the AES key identifier, location ID, battery level, beacon up time, or a combination thereof to ensure the authenticity of transmitted data. For example, the data packets transmitted to the PSS 120 may be encrypted and include the current battery level and up time of the beacon 240 generating the data packets.

The anti-spoofing module 242 may check that the battery level and up time indicated in the data packets correspond to expected values. For example, if the anti-spoofing module 242 receives a data packet that indicates the up time of a Beacon 240 should be 1 day, 3 hours and 15 minutes, but receives a data packet that indicates the up time is four days, the anti-spoofing module may determine that someone copied the data packets and is attempting to rebroadcast them without revisiting the store. In some implementations, the anti-spoofing module 242 may use a GPS radio or other location service to determine if the data packets are arriving from a location generally associated with the beacon 240. In yet other implementations, the anti-spoofing module 242 may provide the client device 102 with a password or other unique identification number such that the client device 102 may verify to the PSS 120 that the client device 102 is near the beacon 240. The password may be a rolling password. In some implementations, if spoofing is detected the content provider 250 housing the beacon and/or the PSS 120 may be notified. A beacon 240 that is the tampered with or spoofed may be remotely disabled.

In FIG. 2A, the user 230 interacts with a client device 102. As described above in greater detail in relation to FIG. 1, the client may be, but is not limited to, a smart phone, a tablet computer, a laptop and/or a desktop computer. In some implementations, the client device 102 includes a GPS module 222. The GPS module 222 detects the current location of the client device 102 and may transmit the detected location to the PSS 120 via the network 104. The anti-spoofing module in the beacon and/or in the PSS 120, modules 242 and 261 respectively, may receive the detected location and verify the client device 102 is near the reported location of the beacon. For example, the client device 102 may transmit the current location of the client device 102 to the anti-spoofing module 261 of the PSS 120. The PSS 120 may receive a unique beacon identification number. Referencing the beacon location database 265, the unique beacon identification number transmitted to the PSS 120 may indicate the beacon should be located in a particular store of a shopping mall. The current location determined by the GPS module 222 may indicate that the client device 102 is in the corresponding shopping mall, and accordingly the client device 102 may be authenticated as being near the beacon 240.

The client device 102 may include a camera 221. The user 230 may use the camera to capture images of merchandise or other content the user prefers. For example, if a user 230 finds a jacket that the user 230 may want to purchase at a later date, the user 230 may use the camera 221 to capture an image of the jacket. In some implementations, the captured image may remain on the client device 102, and in other implementations they are transmitted to the PSS 120 to be stored in the user preference database 267.

User preferences may include, but are not limited to, preferred content providers, preferred content, preferred colors, preferred price points, locations, preferred looks, preferred fashion styles, preferred users, or any combination thereof. For example, using the user interface discussed below, the user 230 may select a jacket the user likes. The jacket may then be saved to the user's preferences. In some implementations, the user 230 may view or change the stored user preferences via the PSS 120. Responsive to those preferences, the PSS 120 may deliver supplemental content to the user. For example, after a user has stored a number of preferences the PSS 120 may send the user 230 a recommendation for pants that match the jacket the user 230 is viewing. The pants may be in a color and a price point the user 230 indicated that she liked in her saved preferences.

The client device 102 may also include a wireless module 223. In some implementations, the wireless module 223 may detect the broadcast from the Beacon 240. As described above, the broadcast may include the unique beacon identification number and other data. The other data may include a password, location data, system status data, system statistics, or any combination thereof. For example, the beacon 240 may include current battery levels in the data broadcast. In some implementations, the data packet in the broadcast may be only a few bits in size. Using the wireless module 223 the client device 102 may transmit the data packet to the PSS 120 on behalf of the beacon 240. In some implementations, the client device 102 forwards the data to the PSS 120 without reading (or decrypting) the data within the data packets.

Still referring to FIG. 2A, and in more detail, the PSS 120 includes a plurality of modules and databases. In some implementations, the PSS 120 is a computer program running on a central server. In other implementations, the PSS 120 is a distributed system running on a plurality of computer servers. For example, the PSS 120 may be replicated across a plurality of servers or specific functions of the PSS 120 may be executed on specific computer servers.

The PSS 120 may include an anti-spoofing module 261. Discussed in greater detail with the anti-spoofing module 242 of the beacon 240, the anti-spoofing module 261 ensures the authenticity of the data received from the client device 102 and/or Beacons 240. For example, the PSS 120 may receive data from the client device that includes the up time of a beacon 240. The anti-spoofing module 261 may compare the up time with an expected up time to ensure the data is authentic. For example, if the up time is only 470 hours when it should be 1,213 hours, the anti-spoofing module may determine that the data was recorded and a third party is attempting to spoof the data to receive supplemental content such as reward points from the PSS 120.

The logistics module 262 of the PSS 120 may provide the content provider 250 with logistical data. For example, the logistics module 262 may monitor the number of client devices 102 that detect a specific beacon identification number over a given period of time and determine the content (or merchandise) near those beacons is more popular than the content near beacons 240 whose beacon identification numbers are not detected as often over the same given time period. The logistics module 262 may also monitor customer flow patterns through the content providers. The content providers 250 may make decisions on where to place content based on the data returned from the logistics module 262. For example, a content provider 250 may place popular content near the back of the store such that a user will have to pass less popular content to get to the more popular content.

The PSS 120 also includes an interface 263. The interface 263 is discussed in greater detail in relation to the exemplary embodiments described in Section C. Briefly, the interface 263 provides a means for a user 230 and/or content provider 250 to interact with the PSS 120. In some implementations, the interface 263 is a plurality of web pages. In other implementations, the interface 263 is a computer program running on the PSS 120 and/or on a client device 102. There may be multiple versions of the user interface 263. For example, there may be one user interface for content providers 250 and another user interface for users 230. In certain implementations, the user interface 263 that is displayed to the user 230 may be responsive to the type of client device 102 used to view the user interface 263. For example, the user interface may appear different when a user views the interface 263 on a smart phone as compared to if the user views the interface 263 on a personal computer.

The first type of interface 263, a content provider interface, (also referred to as a console) may be the interface presented to a content provider 250 upon logging into the PSS 120. The content provider interface may allow a content provider 250 to upload, to the content database 266, descriptions and details of supplemental content 251, images of content 215, availability of content 215, or any combination thereof. Additionally, the content provider 250 may upload coupons and/or benefits to the content database 266 via the content provider interface. For example, the content provider 250 may upload a benefit to the content database 266 that indicates the content provider will be having a sale on Memorial Day. Accordingly, users viewing the user interface may be presented with the details of the Memorial Day sale. The console for a content provider 250 is described below in relation to Section G.

In other implementations, the PSS 120 may provide, through the user interface 263, a platform for the user 230 to barter or haggle over the price of a piece of supplemental content 251 with the content provider. In these implementations, the content provider 250 may use the content provider interface to define minimum acceptable prices for supplemental content 251 in the content database 266 or to define other rules that may govern the bartering and haggling process.

In another implementation, the content provider interfaces may allow for the control, configuration, and management of beacons 240. Beacon management functions of the content provider interface may include such functions as updating firmware; configuring the hours of operation for the beacon; setting a logical radius; updating the PSS 120 as to the physical location of the beacon; and checking beacon settings, statistics, and current status (e.g., battery life). The console for PSS 120 administration is described further in relation to Section G.

In some implementations, the content provider interface is displayed via a computer program or webpage that interacts directly with the PSS 120, which in turn transmits the above described configurations and settings to the beacon 240. In other implementations, the content provider interface is displayed by a program or webpage executing on a mobile device. The mobile device may then allow for the direct configuration of the beacon 240. For example, the mobile device may connect directly to the beacon 240 by Bluetooth to deliver new configuration files, firmware updates, and/or settings to the beacon 240.

The second type of interface 263, the user interface, may be provided to the user 230 when interacting with the PSS 120. The exemplary embodiments discussed in Section F provide a detailed description of the user interface. Briefly, the user interface, may allow the user to view the supplemental content 251 available by the plurality of content providers 250. For example, the user interface may allow the user 230 to view or search for black high-heels available for sale by one or more stores using the PSS 120. Other searches performed by the use 230 aim include searching for content within a specific location, distance from a specific location, price range, color, size, or any combination thereof.

In some implementations, the user 230 may input preferences to the PSS 120 via the user interface. These preferences may be saved into the user preference database 267. The preferences may be directly input into PSS 120 (e.g., the user may indicate they prefer Nike tennis shoes) or the PSS 120 may infer the user's preferences. In inferring the user's preferences, the user may "like" (or select) a plurality of content items. The PSS 120 may then determine similarities between the selected content to determine the user's preferences. In some implementations, selecting a preferred content item may include selecting the image of the content item as it is displayed to the user 230 via the user interface 263. In yet other implementations, the user 230 may upload images captured with the camera 221 to user preference database 267. In yet other implementations, a first user 230 may use selected content of a second user 230 to augment the preferences of the first user 230.

The PSS 120 also includes an analysis module 264. In some implementations, responsive to the preferences of the user 230 stored in the user preference database 267, the analysis module 264 provides the user 230 with supplemental content 251 the user 230 may like. The supplemental content 251 provided to the user 230 may include coupons, benefits, links to other content or any combination thereof. In some implementations, the selection of the supplemental content 251 is responsive to the location of the client device 102. For example, when a user 230 enters the proximity zone of a beacon 240 and the PSS 120 determines the client device 102 is at a specific location, the analysis module 264 may then analyze the user preferences stored in the user preference database 267 and provide supplemental content 251 for the user 230 responsive to the user's preferences and the current location of the user. For example, the analysis module 264 may determine a user is viewing sweaters within a specific store. Analyzing that a high percentage of the captures images of clothes the user uploaded to the PSS 120 include green articles of clothing, the analysis module 264 may suggest to the user 230 to view the content provider's selection of green sweaters, located at the front of the store. In another example, the supplemental content selected by the analysis module 264 may be responsive to only the user's current location. In some implementations, selected supplemental content 251 is associated with a competitor of content item near the user. For example, when viewing a pair of pants in a first store, the analysis module 264 may send the user a coupon for a pair of similar pants at a second store.

As described herein, the supplemental content 251 selected by the analysis module 264 can include coupons, ads, product information or any combination thereof. In certain implementations, the supplemental content 251 is time sensitive. For example, a coupon may be issued by the analysis module 264 and only be valid for the next 10 minutes. In some implementations, the analysis module 264 issues a time sensitive coupons when it has determined the user 230 may be uncertain if they wish to purchase the content item near the user. For example, the analysis module 264 may determine that the user 230 has lingered in the vicinity of the content item for a set period of time (e.g. five minutes), and determined the user 230 is unsure of the purchase. The analysis module 264 may provide the user 230 with a coupon in order to persuade the user 230 to purchase the content item.

In yet other implementations, the analysis module 264 may incorporate the data of the content database 266 and the content provider database 268 to provide the client device 102 with supplemental content that is information about content provided by a competing content provider 250. For example, the analysis module 264 may determine that a client device 102 is in a store viewing shirts. Incorporating the data of the content provider database 268 and the content database the analysis module 264 may provide the user with supplemental content 251 that provides the user with additional information about the shirt near the user. The information may include availability, sizing information, information about similar content items, or general information about the product.

In some implementations, the analysis module 264 provides the user 230 with information when the client device 102 is not in the proximity zone of a beacon 240. For example, the analysis module 264 may determine that the user 230 has uploaded a number of jackets and determines the user may be actively looking for a new winter coat. The analysis module may search the content database 266 and the content provider database 268 to determine if any content providers 250 in the general area currently have sales on jackets. In yet other implementations, the content providers may place bids on the opportunity to provide the user 230 with a coupon or supplemental content. Ad auctions are described further in relation to Section H.

C. Communication with the Beacon and Determining Microlocation

In some implementations, the beacons 240 can be placed in a location without providing the beacons 240 with a power connector or a connection to the network 104. For example, and as described above, the beacons 240 can include a battery 243 that is configured to power the beacons 240 for a least 1 month, 3 months, 6 months, or a year without needing to be replaced or recharged. In some implementations, the beacons 240 do not have a direct connection to the network 104. As described further below, in these implementations, the beacons 240 can communicate with the PSS 120 through the data connection of a client device 102. This can allow a content provider store owner to place a beacon 240 without first setting up a network 104 within the store or running power to the location where the store owner wishes to place the beacon 240.

Figure 2B:
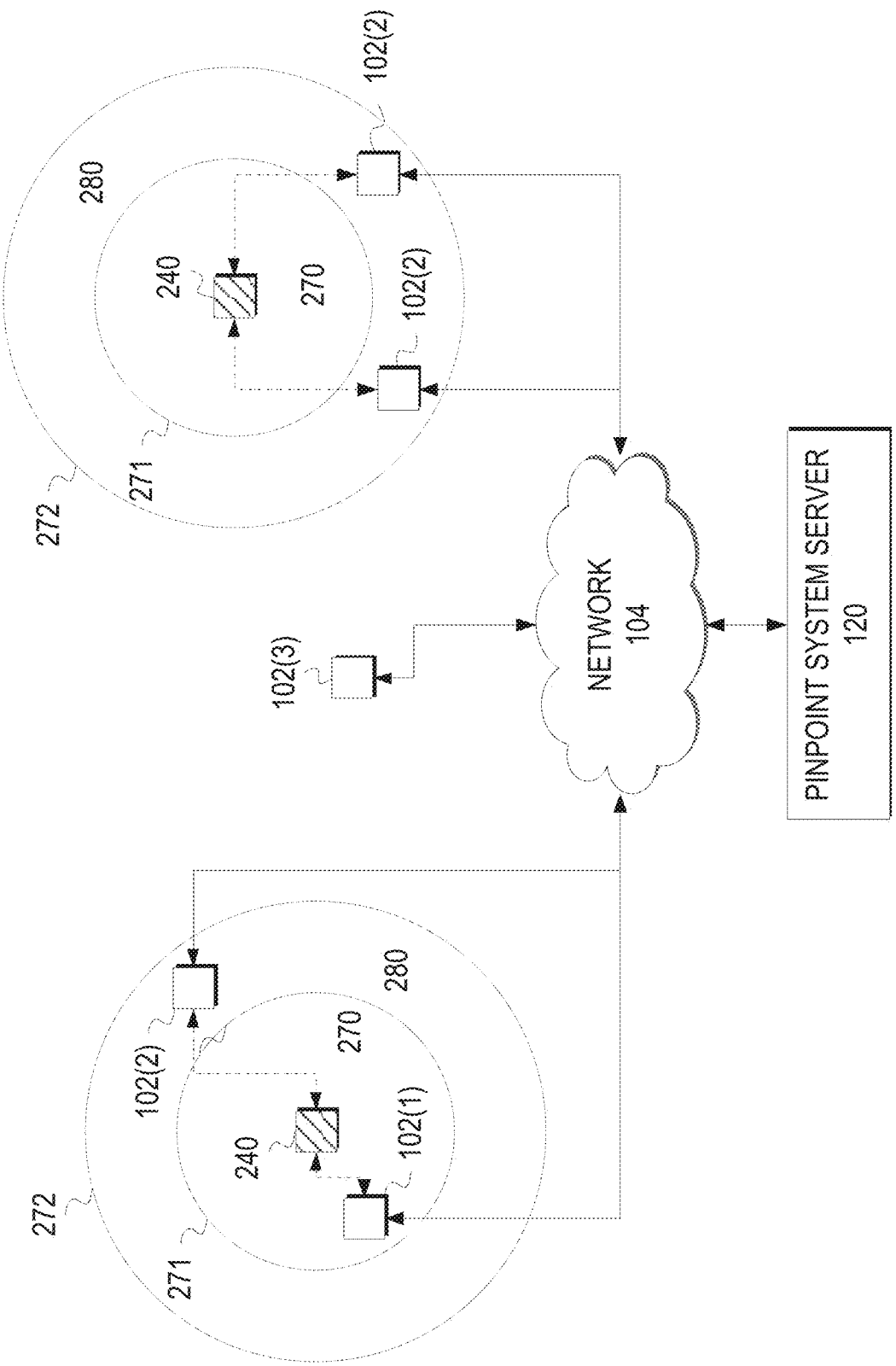
FIG. 2B is a block diagram illustrating the example connections between some of the components of the system of FIG. 2A, according to one implementation of the disclosure.

FIG. 2B is an illustration that provides further detail about the interconnectivity between some of the components of the PN 200. In brief, FIG. 2B illustrates a plurality of client devices 102, each at different distances from a beacons 240. As described above the client devices 102 are connected to the PSS 120 via a network 104. A logical radius 271 extends a first distance from the beacons 240 and a physical radius 272 extends a second distance from the beacons 240.

As described above, the beacons 240 transmits a wireless signal, such as a Bluetooth signal. The greatest distance the wireless signal may be received by a client device 102 is the physical radius 272 of the beacon 240. In some implementations, a logical radius 271 may also be set for the beacon 240. The logical radius 271 may be any radius within the physical radius 272. In some implementations, more than one logical radius 271 may be set for each beacon 240. In some implementations, crossing a logical radius 271 may cause an event, such as the delivery of supplemental content, to occur. Client devices 102 in different sections of the beacon's broadcast range may be treated differently. For example, different content may be delivered to client devices 102 within the logical radius 271 as compared to client devices 102 outside the logical radius 271 but within the physical radius 272. In some implementations, the logical radius 271 may be set via the PSS 120. Although the beacon 240 is represented as broadcasting a wireless signal in an omnidirectional manner, one of average skill in the art will recognize that the wireless signal may be tuned such that the wireless signal is not omnidirectional.

FIG. 2B illustrates client devices at three distances from a beacon 240. As illustrated, client device 102(1) is within the inner proximity zone 270. Client devices 102(2) are beyond the logical radius 271 but within the physical radius 272, and therefore within a second proximity zone 280. Client device 102(3) is outside the physical radius 272, and therefore not within one of the proximity zones. In some implementations, the PSS 120 may not deliver content to a client device 102 unless the device is within a logical radius 271. In some implementations, the PSS 120 may determine that a client device 102 is leaving the proximity of the beacon 240 when the client device 102 progresses from the inner proximity zone 270 to an outer zone 280. In some implementations, the PSS 120 may deliver different supplemental content to the client device 102 responsive to if the client device 102 is entering or leaving the inner proximity zone 270.

As described above, in some implementations, the beacon 240 does not communicate directly with the PSS 120. The beacon may communicate with the PSS 120 via at least one client device 102. In some implementations, the beacons 240 and a client device 102 may communicate with one another using a first wireless standard and then the client device 102 and the PSS 120 may communicate with a second communication standard. For example, the beacon 240 may transmit a packet containing data, which is received by the client device 102(1), using the low power Bluetooth standard. The client device 102(1) may then forward the data packet to the PSS 120 using a second communication standard. For example, the client device 102(1) may use its cellular connection or a Wi-Fi connection to forward the data packet to the PSS 120. In some implementations, the device 102 retransmits the data packet to the PSS 120 without accessing, reading, and/or modifying the data packet. In some implementations, the device 102 may append a device identifier, such as a MAC address to the data packet.

The data packet can include information related to the beacon identification number or other data pertaining to the beacon 240. For example, the beacon 240 may relay information about its current power levels or conditions to the PSS 120 via the data packets. In some implementations, the beacon 240 transmits the data packet to a plurality of client devices 102 for forwarding to the PSS 120.

In some implementations, the PSS 120 may transmit data back to the beacon 240 through the client device 102. For example, the PSS 120 may select a client device 102 within the physical radius 272 (or logical radius 271) of the beacon 240. The PSS 120 may then send a data packet to the client device 102 using the second transmission protocol. The client device 102 may then forward the data packet to the beacon 240 using first data transmission standard. The PSS 120 may transmit the data packet to a plurality of client devices 102 within the physical radius 272. The redundancy of the data transmission to the beacon 240 may ensure the data still arrives to the beacon 240 even if the first client device 102 leaves the physical radius 272 before the data is fully transferred to the beacon 240. For example, if client device 102(1) and client device 102(2) both receive the data packet from the PSS 120, if client device 102(2) leaves the physical radius 272 before the data packet can be forwarded to the beacon 240, client device 102(1) can still forward the data packet to the beacon 240. In some implementations, the data that the PSS 120 transmits to a beacon 240 can include configuration files or firmware updates.

Figure 3A:
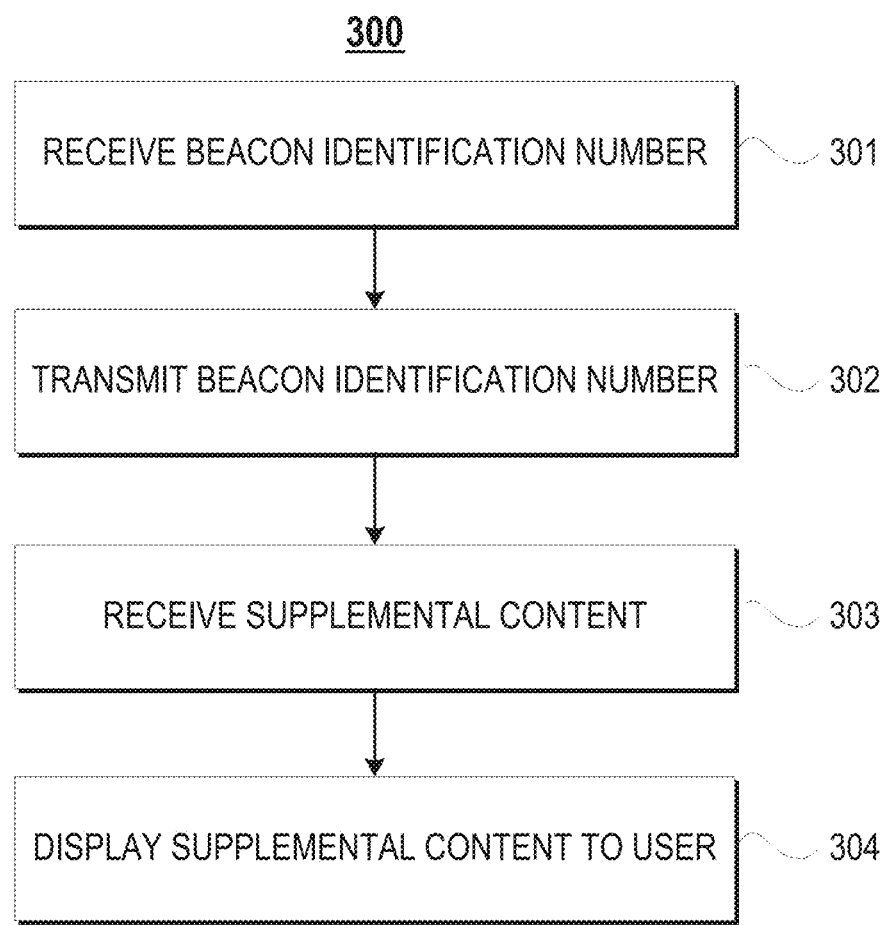
FIG. 3A is a flow chart depicting a method for determining the location of a client in a system similar to the system of FIG. 2A and providing the client with supplemental content, according to one implementation of the disclosure.

FIG. 3A is a flow chart of an example method 300 for determining the location of a client device 102 and providing to the client device 102 with supplement content. The method 300 includes receiving, by the client, a beacon identification number (step 301). The client then transmits the beacon identification number (step 302) to the PSS 120. Responsive to transmitting the beacon identification number, the client receives supplemental content (step 303) from the PSS 120. Responsive to receiving the supplemental content, the supplemental content is displayed on the client (step 304).

As set forth above, at step 301, the client device 102 receives a beacon identification number. In some implementations, the beacon identification number is received by the wireless module 223 of the client device 102. In other implementations, the client 102 may receive the beacon identification number by taking a picture of a QR code placed on or the beacon 240 or through some other non-wireless transmission means. For example, the user may manually enter the beacon identification number into a computer programming running on the client device 102. As discussed in relation to FIG. 2A, the beacon identification number may be accompanied by a data packet that may include beacon statistics or other data.

At step 302, the client device 102 transmits the beacon identification number to the PSS 120. In some implementations, the client device 102 is Internet enabled and transmits the beacon identification number to the PSS 120. The client device 102 may add a client and/or user identification to the beacon identification number when forwarding data to the PSS 120 from the beacon 240. Transmitting the beacon identification number may also include transmitting additional client device 102 or user 230 information to the PSS 120. For example, when a beacon identification number is transmitted, the client may also transmit shopping preferences the user recently entered into a computer program executing on the client device 102. In other implementations, the beacon 240 is Internet enabled, and transmits client identification to the PSS 120 directly responsive to detecting a client device 102 in the proximity zone.

At step 303, in some implementations, the client device 102 receives supplemental content. The supplemental content may be delivered to the client device 102 from the PSS 120. As discussed above, the supplemental content may be a coupon, offer, or other information. For example, the supplemental content may be a coupon for the supplemental content 251 near the beacon 240, an offer for a competitor of the content provider 250 currently providing the content which the client device 102 is near, or the supplemental content may be information indicating to the user additional supplemental content 251 that may complement the currently viewed supplemental content 251.

At step 304, the supplemental content is displayed to the user. In some implementations, the supplemental content is displayed to the user 230 via a computer program executing on the client device 102. The user 230 may only receive the supplemental content if the user 230 is actively using the computer program. In other implementations, the supplemental content may be pushed to the client device 102 and displayed to the user regardless if the user 230 is actively using the computer program. In yet other implementations, the user may only receive the supplemental content if the user is using the computer program and specifically requests the supplemental content to be delivered. For example, a user 230 may be viewing a sweater located near a beacon 240. The user 230 may wish to see if the store is selling any pants that would match the sweater. The user 230 may then activate the computer programming running on the client device 102 and request the PSS 120 to provide the user 230 with a plurality of matching pants in the current and/or competing stores. In some implementations, the plurality of matching pants, or other supplemental content, is ranked based on the user's preferences stored in the user preference database 267.

Figure 3B:
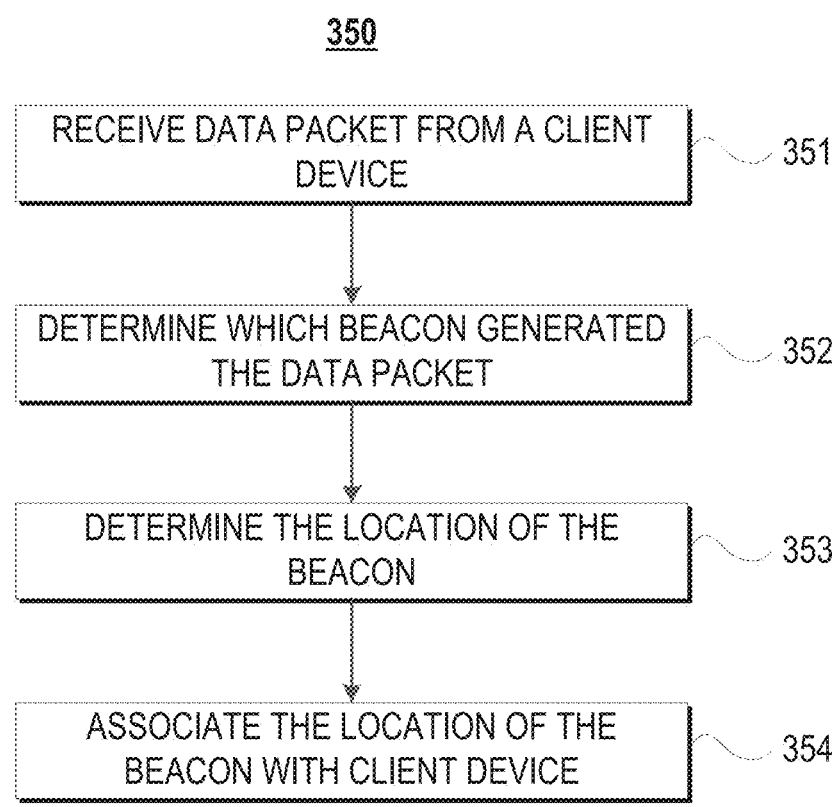
FIG. 3B is an example chart flow of a method for determining the location of a client device, according to one implementation of the disclosure.

FIG. 3B is a flow chart of a method 350 for determining the location of a client device. The PSS 120 receives a data packet (step 351). The PSS 120 determines which beacon 240 generated the data packet (step 352). The PSS 120 then determines the location of the of the beacon 240 that generated the data packet (step 352). The PSS 120 then associates the location of the beacon 240 that generated the data packet with the client device 102.

As set forth above, the method 350 begins when the PSS 120 receives a data packet. In some implementations, the data packet is generated by a beacon 240 that is one of a plurality of beacons 240. The data packet can be transmitted from the beacon 240 to the client device 102 using a first wireless standard, and then the client device 102 forwards the data packet to the PSS 120 using a second wireless standard. In some implementations, the client device 102 may append a client device identifier to the data packet when the client device 102 forwards the data packet to the PSS 120.

At step 352, the PSS 120 determines which one of the plurality of beacons 240 generated the data packet. In some implementations, the data packet received by the PSS 120 includes a beacon identifier. The PSS 120 can use the beacon identifier to determine which one of the beacons 240 generated the data packet. In some implementations, the client device 102 that forwards the data packet to the PSS 120 may be within the physical radius 272 of a plurality of beacons 240. In these implementations, the client device 102 may receive a data packet from each of the plurality of beacons 240. The client device 102 or PSS 120 may determine with which of the plurality of beacons 240 has the strongest wireless connection. The client device 102 may forward only the data packet from the beacon 240 with which it has the strongest data connection to the PSS 120. In some implementations, the client device 102 may rank the strength of the connections to each of the plurality of beacons 240 and then forward an indication of the ranking to the PSS 120. The PSS 120 may use the indication of the ranking to better determine the position of the client device 102.

At step 353, the PSS 120 determines the location of the beacon 240 that generated the data packet. As described above, the location of each of the beacons 240 can be saved into the beacon location database 265. The PSS 120 can access the beacon location database 265 and search the beacon location database 265 to retrieve the location of the beacon 240 that generated the data packet.

At step 354, the PSS 120 associates the location of the beacon 240 with the client device 102. For example, determining that the client device 102 forwarded a data packet from a beacon 240 that is located within the men's section of a store, the PSS 120 may determine the client device 102 is also within the men's section of the store. As described, above in relation to step 352, in some implementations, the client device 102 may receive and forward a plurality of data packets from a plurality of beacons 240. The PSS 120 may use the ranked list of connection strength to each of the beacons 240 to triangulate a more specific location of the client device 102. In some implementations, when only data packets form a single beacon 240 are forwarded to the PSS 120, the PSS 120 may determine how far the client device 102 is from the beacon 240 response to the signal strength of the connection the client device 102 establishes with the beacon 240. For example, the PSS 120 may determine if the beacons 240 is within a specific logical radius 271 of the beacon 240.

As described above, in some implementations, the communications between the beacon 240, client 102, and PSS 120 are encrypted. The signal broadcast by the beacon 240, for example, a Bluetooth low energy signal, can be detected by devices not part of the PN 200. For example, the signal may be detected by a laptop running packet sniffing software or the signal may be detected by third party applications executing on the client device 102. For example, a third party may attempt to maliciously determine the user's location by loading software onto the client device 102 and recording the beacon IDs detected as the client device 102 visits different locations using the PN 200. To protect the privacy of users and to ensure the authenticity of communications, the beacon 240, client 102, and PSS 120 may encrypt their communications such that even if a third party did detect the signal from a beacon 240 it would not be able to ascertain useable information from the signal.

Figure 3C:
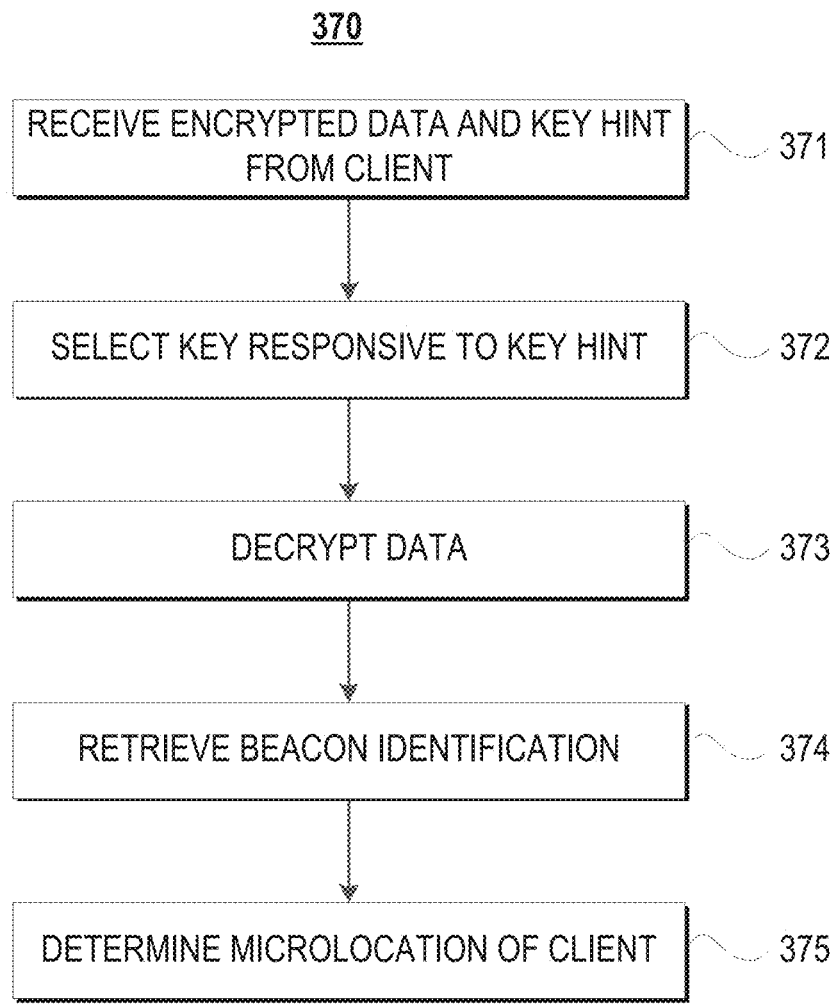
FIG. 3C is a flow chart of an example method 370 for encrypting data transmissions when determining the micro-location of a client device, according to one implementation of the disclosure.

FIG. 3C is a flow chart of an example method 370 for encrypting data transmissions when determining the microlocation of a client device. At step 371, the PSS 120 receives data from the client device 102. In some implementations, the data includes an encrypted portion and an unencrypted portion. As described below, in some implementations, the data originates from a beacon 240. The data is broadcast by the beacon 240 and received by the client device 102, which forwards the data to the PSS 120.

The above discussed beacon identifier is stored in the encrypted portion of the data packet. Other data that can be used to ensure the authenticity of the communication is also stored in the encrypted portion. For example, an indication of the time the data packet was transmitted, the up-time of the beacon 240, or similar data may be stored in the encrypted portion. In some implementations, the beacon identifier includes GPS coordinates or a text string that identifies the beacon 240 to the PSS 120. The encrypted portion of the data can also include information regarding the beacon 240, such as, but not limited to, battery level and firmware version. In some implementations, the beacon 240 repeatedly transmits the same encrypted portion for a predetermined amount of time. For example, the beacon 240 may encrypt and broadcast its current up time and beacon identification number for five minutes. After the five-minute period, the beacon 240 may generate a new encrypted portion that includes the beacon identification number and the present up time.

During manufacture, the beacon 240 is coded with a key, for example a 16 bit-AES key. When broadcasting data, the beacon 240 uses the key to encrypt data that it broadcasts. In some implementations, the beacon's key is updated randomly or periodically. For example, the beacon 240 may include a shared secret that is hashed with a challenge (e.g., the current time) to create a new key.

The unencrypted portion of the data may include a key hint and a local-ID. As described in greater detail in relation to step 372, the PSS 120 may select a key to decrypt the encrypted portion of the data using the key hint. The local-ID may be used by the client device 102 to determine if it has recently received data from a specific beacon 240. As the actual identification of the beacon 240 is securely stored within the encrypted portion of the data, the client device can identify broadcasts from beacons 240 by the local-ID and does not have to decrypt the data. For example, a client device 102 may receive three data packets, the first with a local-ID of A, the second with a local ID of B, and a third with a local ID of A. Responsive to the local ID, the client device 102 can determine that the first and third data packets came from the same beacon 240. In some implementations, the client device 102 may disregard the third data packet since it already received a data packet from that beacon in the recent past. In some implementations, the local-ID is a 16-bit identifier. At random intervals, each beacon 240 updates its local ID.

At step 372, the PSS 120 selects a key to decrypt the encrypted portion of the data. In some implementations, when the PSS 120 receives encrypted data from a client 102, the PSS 120 does not know which beacon 240 in the PN 200 generated the data. As each beacon 240 in the PN 200 encrypts its data with a unique key, the PSS 120 must determine which key to use to decrypt the data. The PSS 120 stores each of the keys required to decrypt data sent from each of the beacons 240 PN 200. In some implementations, the key hint is part of a key-value pair, and once the key-hint is received by the PSS 120, the key-hint may be passed through a hash function to retrieve the decrypt key from a hash table. In some implementations, the key hint is not unique, such that the location of the beacons 240 cannot be mapped by a third party. In some implementations, a geo-hash, or another indication of the beacon's general location, is transmitted in the unencrypted portion. The PSS 120 may use the geo-hash in combination with the key hint to determine which key to use to decrypted the data. For example, a PSS 120 may receive a key hint of "DFCD 3454." The PSS 120 may then use the key hint to determine that beacon A has a key of "DFCD 3454 XBEA 788A 351A" and is located in California, beacon B has a key of "DFCD 3454 DPIO 89VA 478B" and is located in Massachusetts, and beacon C has a key of "DFCD 3454 78DA DPE7 3487" and is located in Georgia. The PSS 120 may then determine that the geo-hash is associated with Massachusetts and select the key of "DFCD 3454 DPIO 89VA 478B", associated with Beacon B, to decrypt the data. In some implementations, the PSS 120 may not require a geo-hash, and may iterative try each of the keys located with the key hint.

At step 373, the data is decrypted. Using the key selected in step 371, the PSS 120 decrypts the encrypted portion of the data. In some implementations, the PSS 120 also authenticates the sender (i.e., the client device or application) transmitting the data to the PSS 120. The PSS 120 may determine if the user of the client device 102 has agreed for their location to be determined and that the application that forwarded the data to the PSS is allowed to receive location data.

At step 374, the beacon identification number is retrieved from the decrypted portion of the data, and at step 375 the PSS 120 determines the micro-location of the beacon associated with the beacon identification number. The method for determining the micro-location of the client device 102 is described above in relation to method 350.

D. Smart Store

Figure 4A:
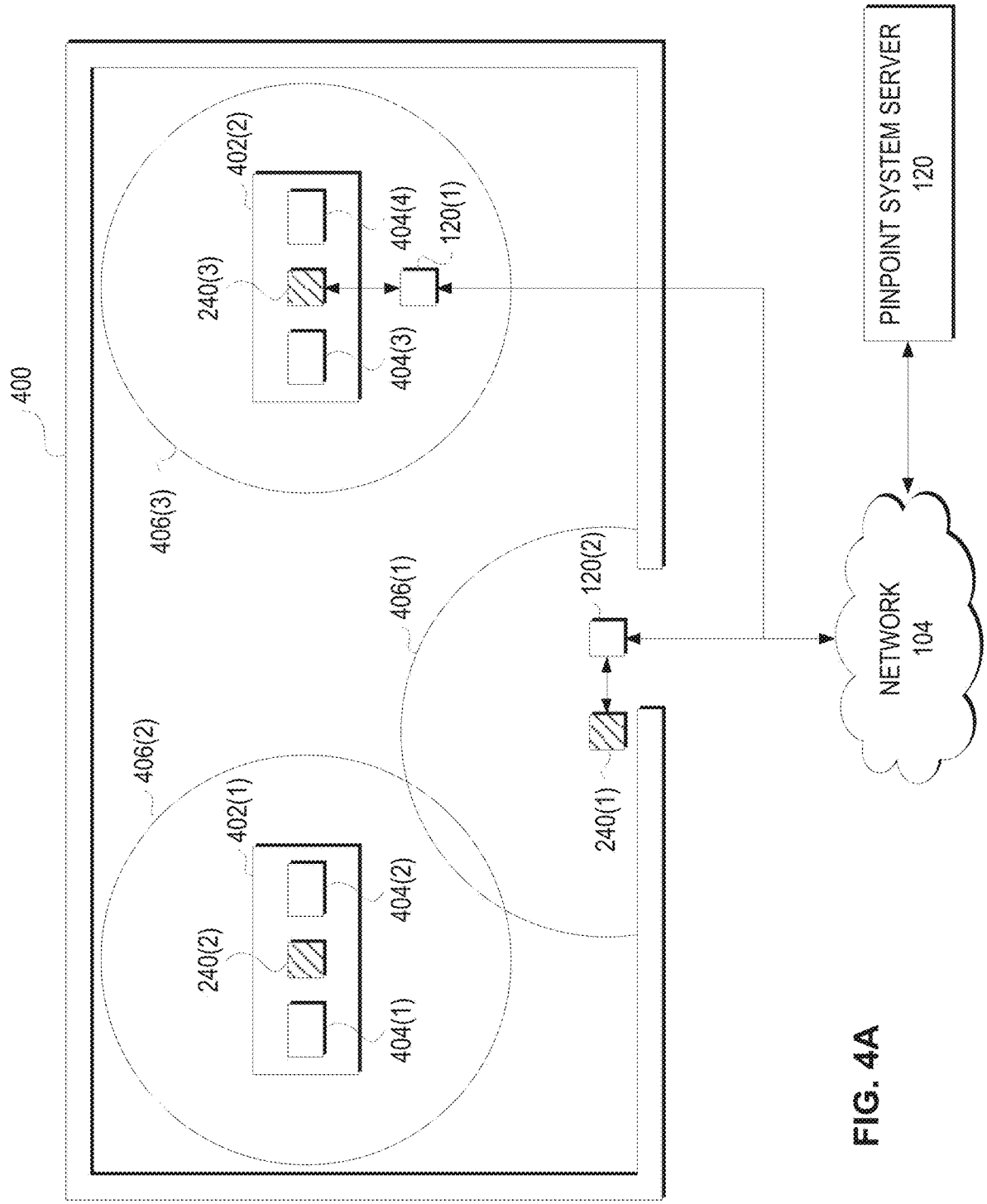
FIG. 4A is a schematic illustrating an example smart store using the system of FIG. 2A, according to one implementation of the disclosure.

FIG. 4A illustrates a schematic overview of a smart store using beacons 240. In some implementations, the beacons 240 are used by the PSS 120 to determine the relative location of client devices 102 within a store or other premise and deliver content to the client device 102 responsive to the client device's location. FIG. 4A illustrates a smart store 400. Three beacon 240(1)-240(3) (generally referred to as beacons 240) are place within the store 400. Beacon 240(1) is placed near the entrance to the store 400. Beacon 240(2) is placed near the display 402(1), which is displaying produces 404(1) and 404(2). Beacon 240(3) is placed near the display 402(2), which is displaying products 404(3) and 404(4). A client device 102(1) is within the physical radius 406(3) of beacon 240(3) and a client device 102(2) is within the physical radius 406(1) of beacon 240(1). As illustrated there is no client device 102 within the physical radius of beacon 240(2). The client devices 102(1) and 102(2) have established a wireless connection with beacons 240(1) and 240(3), respectively. The client devices 102(1) and 102(2) have also established a connection with the PSS 120 through the network 104. The PSS 120 includes the same components as the PSS 120 descried in relation to FIG. 2A.

In the example illustrated in FIG. 4A, the beacon 240(1) is placed near the entrance of the store 400 such that it can detect when a new client device 102 enters the store 400. As illustrated, the client device 102(2) has just entered the store 400 and is within the physical radius 406(1) of the beacon 240(1). While within the physical radius 406(1) of the beacon 240(1), the client device 102(2) may receive data packets with beacon identifiers from the beacon 240(1). The client device 102(2) may then forward data packets to the PSS 120 through the network 104. As described above, the PSS 120 may then lookup the location of the beacon 240 identified by the beacon identifier that was transmitted to the PSS 120 by the client device 102(2). For example, after receiving the data packet and beacon identifier from the client device 102(2), the PSS 120 may determine that the client device 102(2) is near beacon 240(1) and is therefore near the entrance of the store 400.

The client device 102(1) may transmit data packets with deacon identifiers associated with beacon 240(3), and the PSS 120 may determine that the user of the client device 102(1) is viewing products 404(3) and 404(4). As described above, the PSS 120 may transmit supplemental content related to the products 404(3) and 404(4) to the client device 102(1). In some implementations, the PSS 120 may send supplemental content generally related to the store 400 to client device 102(2) when the PSS 120 determines that the client device 102(2) entered the store. For example, the PSS 120 may transmit a coupon for 15% off any product 404 in the store 400 to client device 102(2). The supplemental content deliver to client device 102(1) may relate more specifically to the products 404(3) and 404(4). For example, the PSS 120 may deliver a coupon for 15% off of product 404(4) to the client device 102(1) or the PSS 120 may deliver additional information regarding product 404(4) to the client device 102(1).

In some implementations, supplemental content can be advertisements, coupons, additional information, or suggested products. The PSS 120 may determine what type of supplemental content to deliver to a client device 102 responsive to the user preferences of the user associated with the client device 102 or the preferences of the owners and managers of the store 400. For example, the store owners may wish to reward repeat customers. In this example, a coupon may be delivered to a client device 102 if the client device 102 is determined to be near the location of beacon 240(1) a predetermined number of times within a predetermined number of days. For example, the PSS 120 may deliver a 20% off coupon to a user if the user visits the store five times in one month. In some implementations, beacons 240 may be placed outside of a store or in a location within the store 400 such that the physical radius 406 of the beacon 240 may cover areas outside the store 400. For example, the owner of the store 400 may place a beacon 240 outside the store 400 such that the PSS 120 can determine when a registered client device 102 is walking by the store and deliver supplemental content to the client device 102.

Figure 4B:
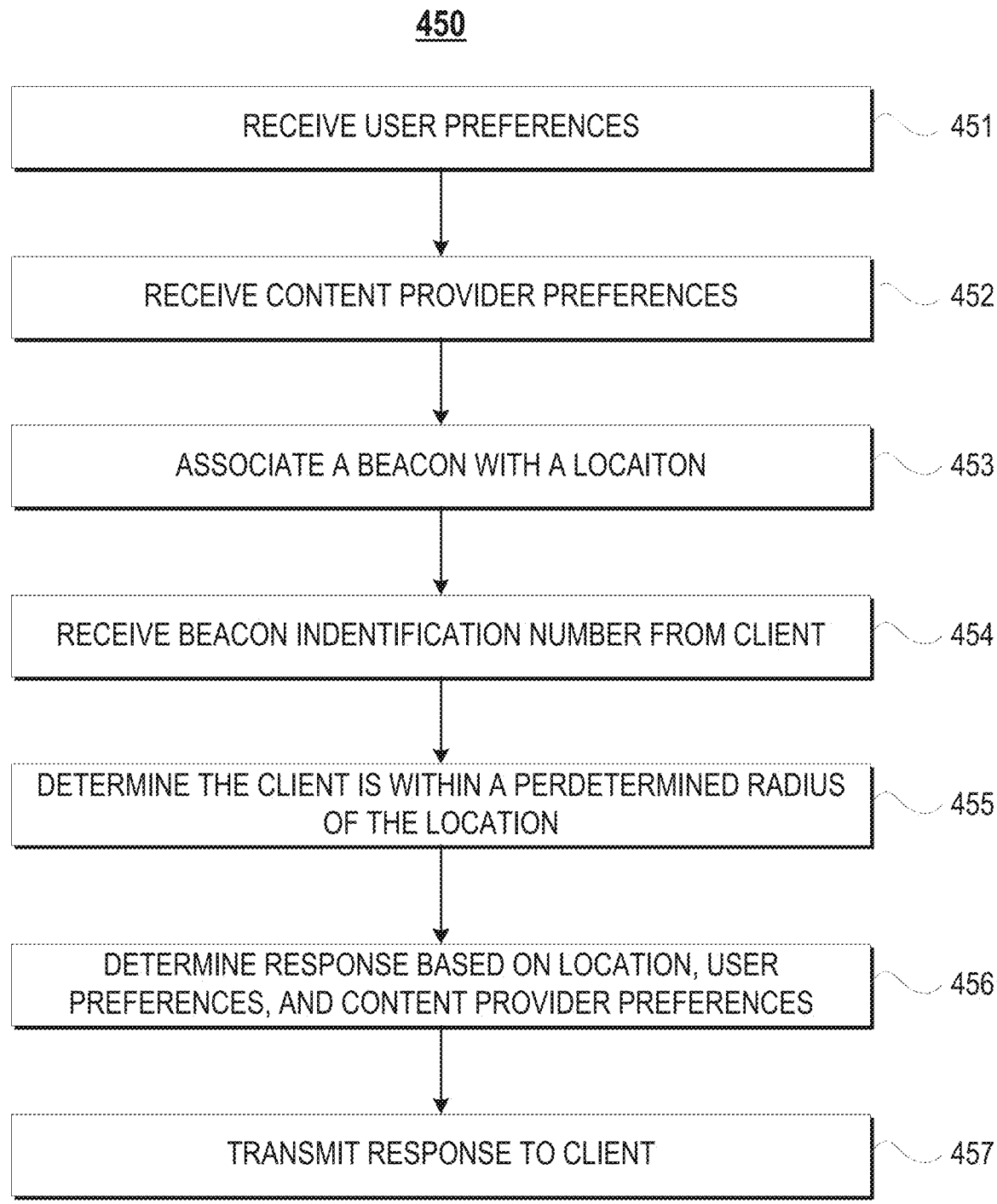
FIG. 4B is a flow chart illustrating an example method for determining the type of supplemental content to provide to the user in a system similar to the system of FIG. 2A, according to one implementation of the disclosure.

FIG. 4B is a flow chart of a method 450 for delivering supplemental content to a client device 102 in a smart store environment. The method 450 includes receiving user preferences (step 451) and receiving content provider preferences (step 452). The method 450 further includes associating a beacon with a location (step 453). The method 450 can also include receiving a beacon identification number from a client device (step 454). Responsive to receiving the beacon identification number, it is determined that the client device is within a predetermined radius of the location (step 455). The type of supplemental content or response that should be provided to the client is then determined (step 456). Responsive to the response determination, the supplemental content is delivered to the client device (step 457).

As set forth above, the method includes receiving user preferences (step 451) and content provider preferences (step 452). In some implementations, the preferences of the user 230 and/or content provider 250 may be updated, added, or removed at any time. For example, the user may see an item for sale online and save it to their account to update the user's preferences. The content provider's preferences may include, but are not limited to, notifications regarding discounts on content, global use coupons, a list of competitors and/or collaborators, a list of preferred users, content inventory, or any combination thereof. The list of collaborators may be business associations that sell complementary items. For example, near Valentine's Day a local florist may enter into collaboration with a local confectioner, such that if a user 230 purchases content at one of the stores, the user 230 will automatically receive a coupon at the other store. Similarly, the content provider 250 may wish to keep a list of customers that, on average, spend a set dollar amount with the content provider each month, quarter or year. In turn, the content provider may have a preference to automatically provide those customers with discounts, coupons, benefits, or other supplemental content.

At step 453, a location is associated with the beacon. The location of the beacon is stored in the beacon location database 265. As described above, responsive to receiving a beacon identification number, the PSS 120 looks up the beacon location with the beacon identification number in the beacon location database 265. The PSS 120 then associates the location of the beacon with the location of the client device 102. In some implementations, before the PSS 120 can associate the location of the beacon 240 with the client device 102, the PSS 120 needs to be provided the location of the beacon 240.

At step 454, the PSS 120 receives the beacon identification number from a client device 102. As discussed above in relation to method 350, in some implementations, the beacon identification number is accompanied by a user identification number.

At step 455, responsive to receiving the beacon identification number, the PSS 120 determines the location of the client device 102 (step 454). In some implementations, the PSS 120 compares the received beacon indemnification number with a table of beacon identification numbers stored in the beacon location database 265. The beacon location database 265 may then provide the PSS 120 with the location of the beacon 240. In some implementations, the location includes a physical location of the content provider 250 and/or the location of the beacon 240 within the content provider 250. Responsive to determining the location and/or location of the beacon 240, the PSS 120 may cross reference the determined location of the beacon 240 with the current location of the client device 102 to authenticate the received beacon identification number. In some implementations, the client device 102 may deliver to the PSS 120 the strength of its connection with the beacon 240 such that the PSS 120 can determine if the client device 102 is within a logical radius of the beacons. In some implementations, the PSS 120 may wait for the client device 102 to be within the logical radius of the beacon 240 before transmitting supplemental content to the client device 102.

At step 465, the PSS 120 determines a response based on location, user preferences, and content provider preferences. In some implementations, the calculated response is a determination of the type of supplemental content to be sent to the client device 102. In some implementations, the response based on the location of the beacon 240, the user's preferences, the content provider's preferences, or any combination thereof. In some implementations, the user 230 may specify the type of response the user 230 would like to receive. For example, the user 230 may request a necklace to complement the currently viewed dress based on the preferences the user has uploaded to the PSS 120. As another example, the user may request a coupon for the currently view content or a list of similar items the user is currently viewing.

At step 457, responsive to determining the response, the PSS 120 transmits the response to the client device 102. As discussed in reference to method 300, in some implementations, the response is transmitted to the client only when requested by the user 230. In other implementations, the response may be automatically calculated and delivered to the client device 102 without intervention by the user.

The skilled artisan will understand that, although the method steps above are shown in a particular order, they can be done in any order, or certain steps may be skipped entirely.

E. Exemplary Implementations of the System

Having described the components of the system, an example of a user 230 interacting with the system 200 may provide further details and context for understanding the system and methods disclosed herein. While the below example particularly show and describe specific implementations, it should be understood by those skilled in the art that various changes in form and detail may be made therein without departing from the spirit and scope of the system and methods described in this disclosure.

As a basis for the example, the PSS 120 hosts a website that the user 230 may access via a client device 102, such a web enabled smart phone or home computer. Furthering the example, the content providers 250 may be a clothing merchant that sells clothing through its retail outlets or stores. Within those outlets the clothing merchant places beacons 240 throughout the store. The merchant may then list the merchandise available at the store with the PSS 120. Additionally, the PSS may gather images of merchandise from non-content providers, such from the website of fashion magazines.

In this example, a user may view clothing, accessories and other merchandise on the website hosted by the PSS 120. As the user views the items on the website, the user may mark items they like or dislike. The system may then use the characteristics of these items to update the user's shopping and merchandise preferences. The website saves the user's preferences and "liked" items so the user may view details about them at a later time or share the details with friends via the website. For example, a group of friends may send each other images of dresses they like for an event, or a user may view the items save by a fashion forward movie star or other fashion opinion leader.

These details may also be saved, synced, and/or accessed by the user's smart phone. In this example, the user's smart phone may include a computer program that syncs with the PSS 120. Additionally, the smart phone may be Bluetooth enabled such that it can detect the presence of a beacon.

Now referring back to the clothing store of content provider. The merchant can place a number of beacons around the store, for example, at the entrance to the store and near a table of dresses. In a manner completely transparent to the user, when the user enters a beacon-enabled, clothing store the user's phone may recognize the beacon. The beacon may send the phone an identifier, which the phone retransmits to the PSS 120. The PSS 120 resolves the identifier and determines in which store the beacon is located and the beacon's location within the store. Accessing the user's preferences, the PSS 120 may determine specific items the user may like.

As this process is transparent to the user, the user's experience of walking into a beacon-enabled store is as follows. Within a few moments of walking into the store, the user's phone alerts the user that the store has a dress similar to the dress the user recently indicated liking on the website hosted by the PSS 120. Additionally, the user may receive information about the dress such as availability, location with the store, and price. The user may also receive a coupon for 10% off from the merchant as a thank you for having visited the store multiple times within the last week.

Next, the user may walk to table displaying the dress. The table contains a beacon. As the user nears the table the user's phone detects the beacon and, as described above, relays the beacon's identification to the PSS 120. Knowing the location of the beacon, the PSS 120 can estimate that the user is viewing the dress.

Not seeing the dress in the user's size, the user may request assistance from a store employee via the program running on the phone. Additionally, if the user accesses the program while in the store the program may automatically display information about the merchandise at the nearest beacon. In this example, rather than asking for assistance from an employee, the user may access the program on the user's phone, which automatically reveals information about the dress the user is viewing. This information may reveal to the user the store currently has three of the dresses in the user's size in the store's back storage area.

The system, having noticed the user has been near the beacon corresponding to the dress for some time without moving on, may predict the user has mixed feelings about purchasing the dress. After the user has been in close proximity to the dress for a few minutes, the PSS 120 may automatically deliver to the user's phone a coupon for the dress that is valid for only the next 10 minutes.

F. Exemplary Implementations of a User Interface

As discussed above, the PSS 120 includes an interface module 263. In some implementations, the interface module 263 generates a user interface and a content provider interface. The interfaces may be a website executing on the PSS 120 and/or another central web server. In some implementations, the client device 102 executes a computer program that interfaces with the PSS 120. In other implementations, the client device 102 includes a web browser that views the website pages provided by the PSS 120 and/or other central web server. The exemplary implementations below represent a possible user interfaces that may be viewed as a webpage and/or as a graphical user interface of a computer program interacting with the PSS 120.

Figure 5B:
FIG. 5A-5F is an exemplary implementation of a user interface for interfacing with the System of FIG. 2A, according to one implementation of the disclosure.
Figure 5A:

FIG. 5A is a first page of an exemplary implementation of a user interface. The user interface displays a plurality of content items 501 that are available from one or more content providers 250. In some implementations, the displayed content items 501 can be filtered. For example, the user 230 may request that only men's fashions be displayed or only supplemental content 251 from a particular content provider 250 be displayed. The user interface also includes a number of buttons 502(1)-502(n). The exemplary implementation of FIG. 5 includes 5 buttons. The buttons may be "soft buttons" that update according to the current page of the user interface that is currently displayed. In other implementations, the buttons 502 are constant throughout the plurality of pages of the user interface. In some implementations, the user may select displayed content. Selecting the displayed content add and/or updates the user's preferences.

Similarly, in FIG. 5B the exemplary user interface is displaying a plurality of content providers 250. In some implementations, the plurality of content providers 250 is all content providers 250 that are in the PN 200. In other implementations, the displayed content providers 250 are a sub-population of the total number of content providers 250. For example, the user 230 may wish to only display content providers 250 that have been selected by the user 230 and/or only content providers 250 that are within a given distance of the current location of the user 230. In some implementations, the user may select content providers to add to the user's preferences.

Figure 5D:
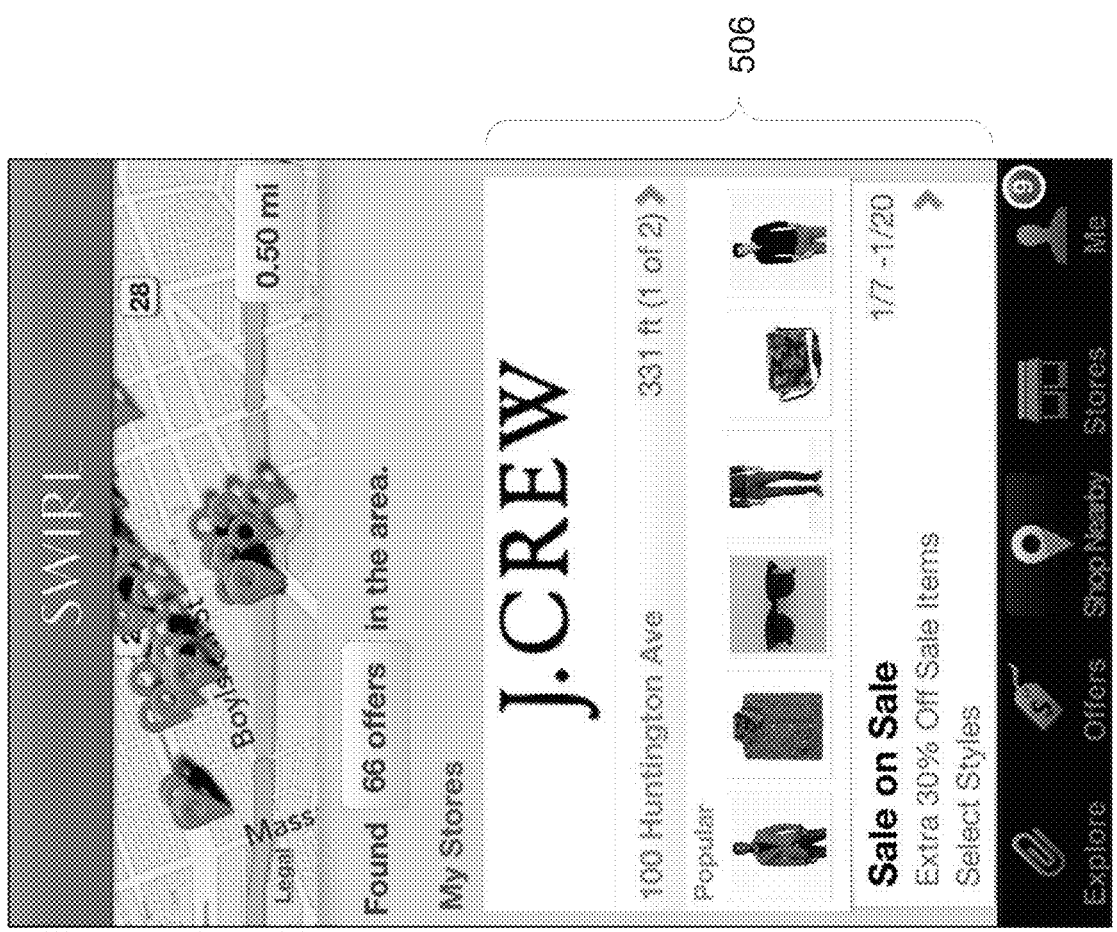
Figure 5C:
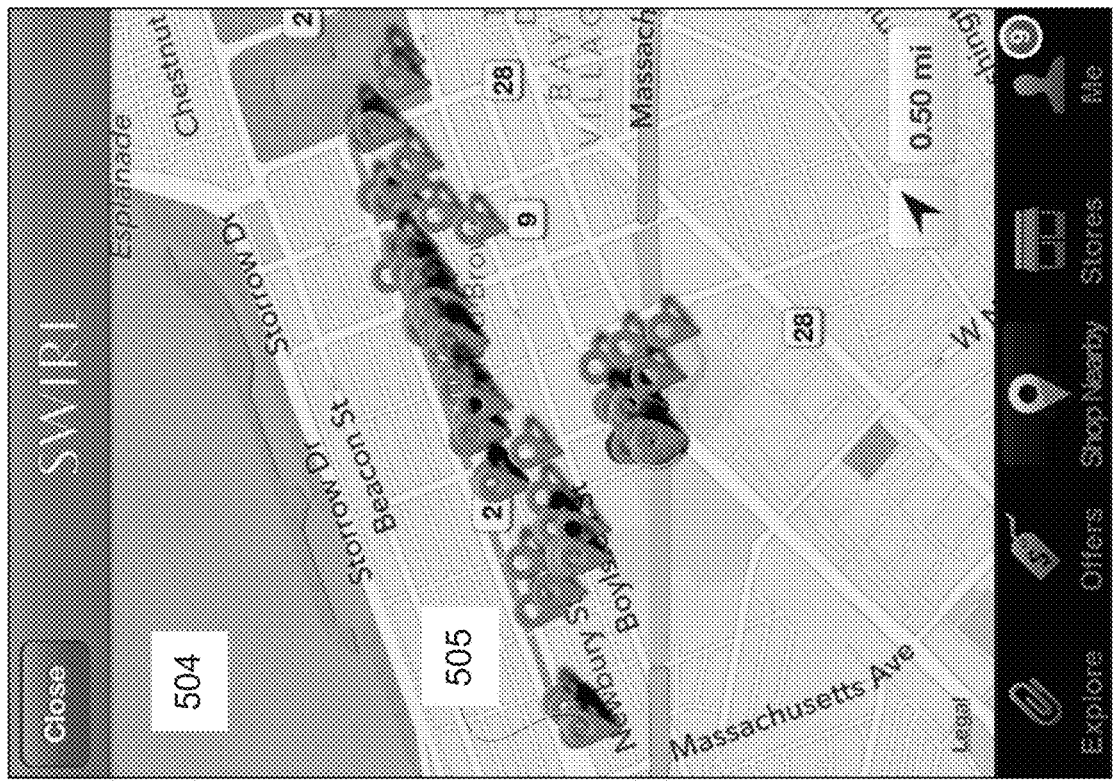

FIG. 5C is an exemplary implementation of the user interface displaying content providers 250 within a given location of the user 230. In some implementations, the nearby content providers 250 are displayed on a map 504. The content providers 250 may be marked on the map 504 with an indicator 505. The user 230 may set the scale of the map 504, and the number of displayed content providers 250 may update as the user 230 pans and zooms the view of the map 504.

In some implementations, the choice of content provider 250 to display on the map 504 is responsive to the user preference and/or content provider preferences stored in the PSS 120. For example, the user interface may only display content providers 250 that the PSS 120 has determined the user has a high probability of having an interest. In other implementations, the selection of the content providers 250 to display may be based on the preferences of the content providers 250. For example, the content providers may wish to have the PSS 120 provide, via the user interface, coupons to a specific demographic of user within a 2-mile radius of the content provider.

FIG. 5D is an exemplary implementation of the user interface displaying additional information regarding a content provider 250. In some implementations, responsive to selecting an indicator 505 on the map 504, additional information is provided to the user regarding the selected content provider 250. Additional information about the content provider 250 may be displayed in a window 506 that is overlaid on the map 504. The window 506 may display, but is not limited to displaying, the content provider's name, location, contact information, availability of content, and available supplemental content.

Figure 5E:
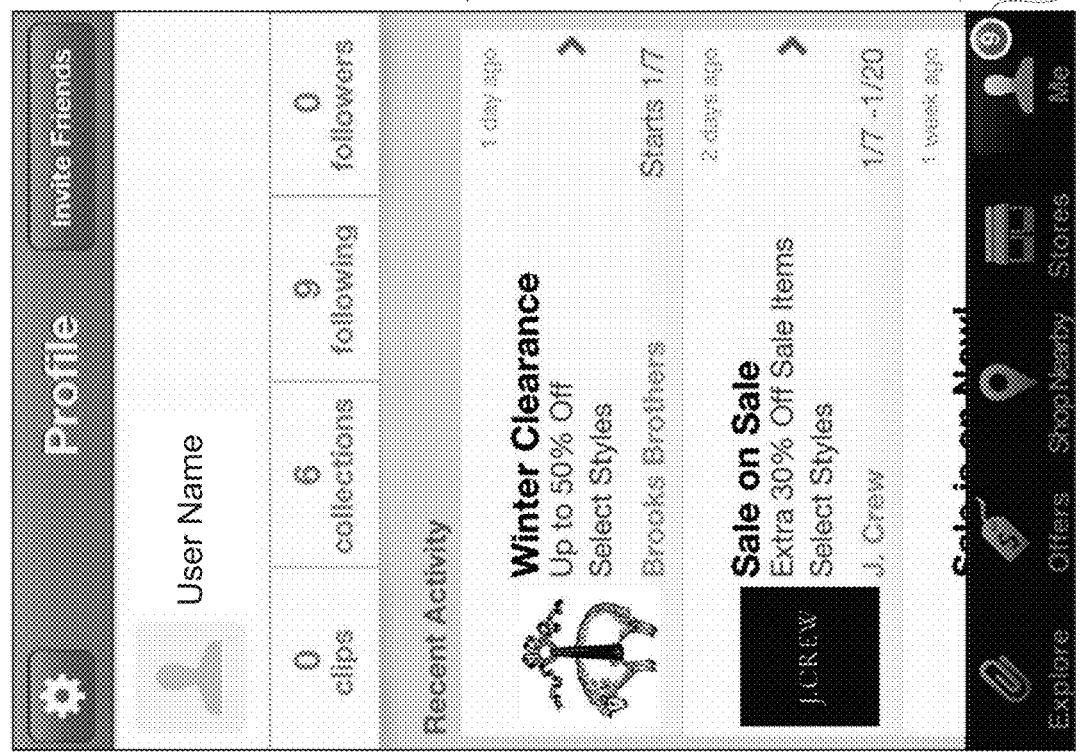
Figure 5F:
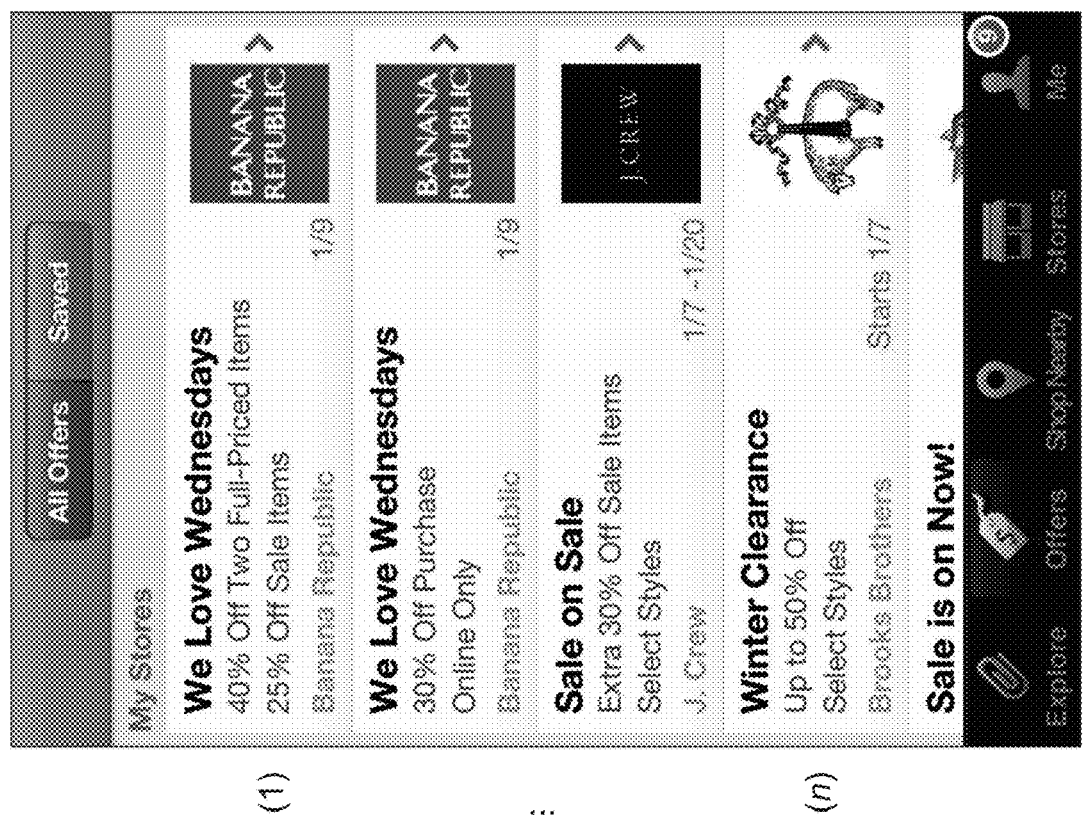

FIG. 5E is an exemplary implementation of the user interface for displaying supplemental content to a user 230. FIG. 5D lists a plurality of supplemental content 507 currently available to the user 230. In some implementations, the user 230 may save specific supplemental content for later use. As described above, in some implementations, the displayed supplemental content 507 is global supplemental content. Global supplemental content may be supplemental content that is available to all users of the PN 100. In other implementations, the displayed supplemental content includes supplement content 507 that is specifically selected for and/or by the user 230.

FIG. 5E is an exemplary implementation of the user interface for displaying the user's profile. In some implementations, the profile page may act as the hub of the user interface. For example, the user may add, remove, or change preferences. In some implementations, the user 230 may change system preferences on the profile page. In some implementations, system preferences may change the way the user 230 interacts with the user interface or how content providers 250 are allowed to interact with the user 230. In some implementations, the profile page includes a window 508 that displays current or recent activity. The number of new items may also be presented to the user as a notification icon 509 that is always viewable to the user 230 when the user 230 is using the user interface.

G. Exemplary Implementations of a Backend System

As described above, the PSS 120 includes an interface module 263. In addition to the user interface descried above, the PSS 120 may also provide a content provider interface and system management interface. The content provider interface may provide content providers 250 with an interface for performing actions such as updating supplemental content (e.g., coupons) and changing beacon parameters (e.g., logical radii settings). The system management interface may allow the manager of the PSS 120 to perform functions such as, but not limited to, adding new content provider accounts and associating beacons 240 with specific content providers 250.

Management of Content Providers

The interface module 263 may provide the manager of the PSS 120 with a system management interface (also referred to as the console) for managing various aspects of the PSS 120. These aspects may include adding and removing content providers 250 from the PSS 120 and associating beacons 240 with specific content providers 250. As described above, the console or other interface may be provided in the form of a webpage, web application, and/or computer program. The interface may be accessed and/or executed by various types of computing devices, such as desktop computers, laptops, smart phones and/or tablet computers.

In some implementations, the PSS manager may use the console to add content providers 250 to the PSS 120. For example, the PSS 120 may be managed by a company that sells and/or licenses accounts to content providers 250. The manager of the PSS 120 may create a PSS account for the content provider 250 responsive to selling and/or licensing a PSS account to the content provider 250. The content provider 250 may provide information to the PSS manger. The PSS manger may then use the information to setup a PSS account for the content provider 250. The information may include an account name, account manager information, number of properties (e.g., stores) in which the content provider 250 may be using the beacons 240, the number of beacons 240 the content provider 250 is requesting (or purchasing), number of user logins to be associated with the PSS account, and any special instructions for the PSS manager. The PSS manager may future associate licensing restrictions with the content provider's 250 PSS account. The licensing restrictions may include the length of the license and the features of the PSS 120 the content provider 250 is licensed to use. Optional features to license may include content management and publishing, offers management, in-store beacon management, and analytics capabilities.

Responsive to creating the content provider's 250 PSS account, the PSS manager may associate an account administrator to the PSS account. The account administrator may be an employee of the content provider 250 responsible for managing the PSS account. Managing a PSS account may include adding and removing authorized account users and managing the content provider's 250 PSS preferences.

As described above, the content provider 250 may be a store. In some embodiments, the content provider 250 may own or manage a plurality of properties. For example, the content provider 250 may be a chain, which operates one or more stores in one or more cities. In some embodiments, the account administrator may group its plurality of properties responsive to set criteria. For example, the plurality of stores may be grouped responsive to a geographic location. In some embodiments, the account administrator may group its plurality of properties based on a scheme that mirrors the content provider's 250 business structure. For example, the content provider 250 may divide its stores into sales regions. When grouping the plurality of properties associated with the PSS account, the account administrator may group the plurality of properties such that the groups align with the sales region.

In some implementations, one type of authorized user may be a group administrator. The group administrator may be responsible for one or more groups associated with the content provider's 250 PSS account. Continuing the above example, the system user responsible for a group may be a regional manager for a sales region. Another type of authorized user may be the role authorized user. The group administrators may create role authorized users and assign predetermined responsibilities to the role authorized users. Example responsibilities (or roles) may include content creator, offers manager, data analyst manager, and beacon manager. In some implementations, the content creator may create, manage, and publish content provider assets and product merchandising. The offers manager may create and manage the personalized supplemental content provided to users 230. The data analysis manager may generate and view reports created by the PSS 120 and the analysis module 264. The beacon manager may activate and deactivate beacons 240 and set beacon parameters such as location and the above described logical radius 271. In some implementations, authorized users may be created which are not assigned specific roles. These authorized users may log into a content provider's 250 PSS account to view information, but may not be authorized to perform tasks associated with the above described roles.

One or more of the authorized user types may be authorized to perform various administrative functions. For example, an administrative function may include sending messages to the authorized users associated with the content provider's 250 PSS account. In some implementations, the messages may be sent to a specific type of authorized user. For example, the messages may be sent to only the beacon managers. Administrative functionality may also include resetting and/or retrieving passwords, performing system audits, and creating user directories.

Figure 6:
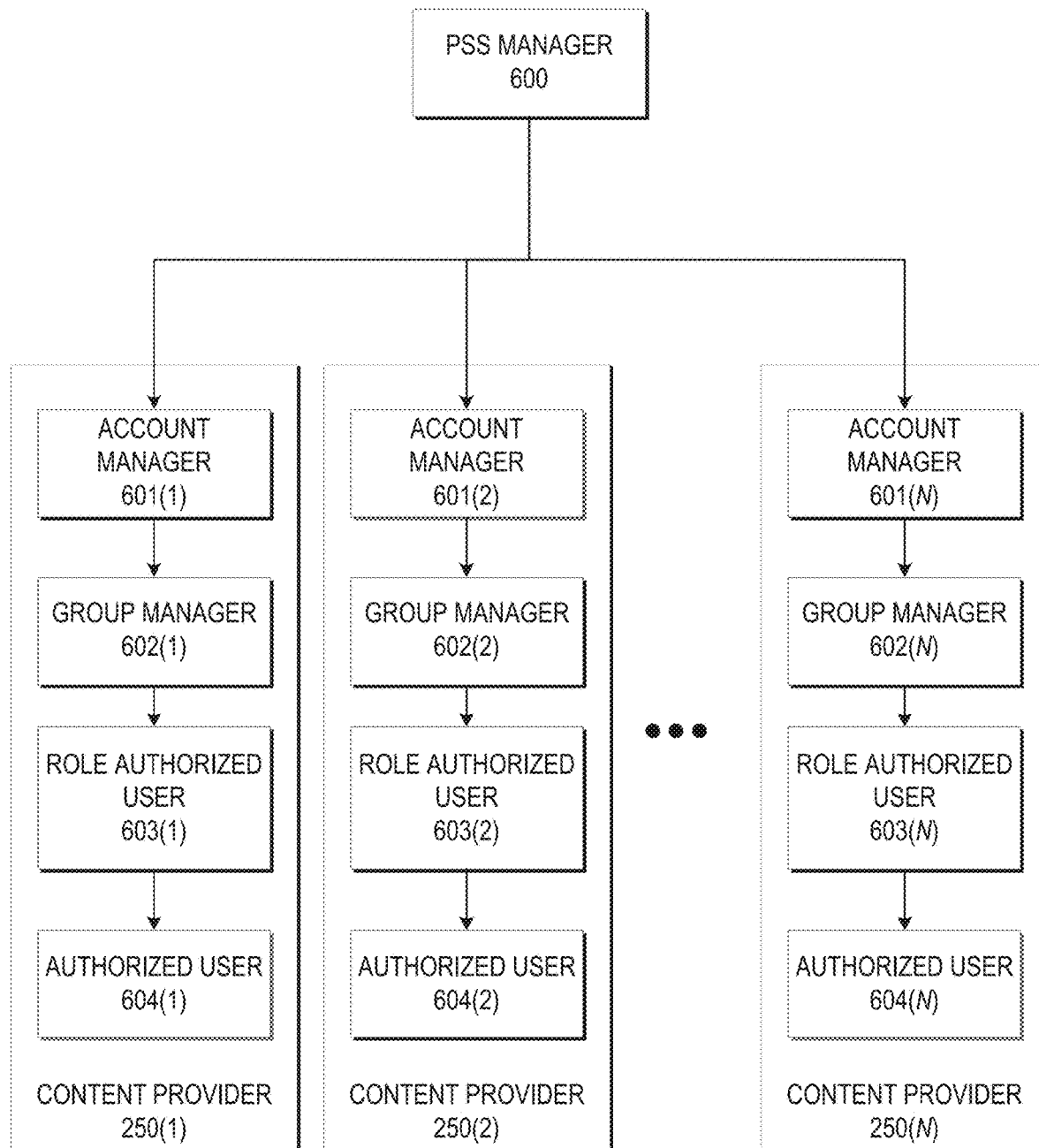
FIG. 6 is a flow chart of the hierarchical relationship between the authorized user types of the system of FIG. 2A, according to one implementation of the disclosure.

FIG. 6 is a flow chart of the hierarchical relationship between the authorized user types described above. As an overview, the PSS manager 600 is the highest level authorized user. The PSS manager 600 may manage the PSS 120. The PSS manager 600 may sell the services of the PSS 120 to n content providers 250. For each content provider 250, the PSS manager 600 may create an account manager 601. The account manager 601 may then create one or more group managers 602. Each group manager 602 may then create one or more role authorized users 603. The role authorized users 603 may then create one or more authorized users 604. In some implementations, a user type may create and/or manage user types below it on the relationship tree.

Management of Beacons

In some embodiments, the PSS manager licenses and/or sells the beacons 240 to content providers 250. In some embodiments, specific functions of the beacons 240 may need to be managed by the content provider 250 and/or the PSS manager. For example, the PSS manager may activate and deactivate beacons 240 responsive to the start and end of a licensing agreement with a content provider 250. The content provider 250 may manage beacon parameters such as the logical radius 271. In some implementations, beacons 240 may be managed by one or more of the above described authorized user types.

In some implementations, the PSS manager may maintain a database of the beacons 240 within the PN 200. The database may include the beacon's 240 serial number, MAC address, manufacturing data, manufacturer, version number, firmware version number, shipment date, associated content provider 250 and case type. The PSS manager may populate the database prior to sending the beacons 240 to the content provider 250.

Responsive to receiving the beacons 240 from a PSS manager, the content provider 250 may log into the console and set various beacon parameters. In some embodiments, the parameters may include beacon placement, the size of the logical radius 271, and the active/inactive state. In some embodiments, via the console, the beacon manager may also view beacon status reports for the beacons 240 under its management. The information may include the version number of the beacon 240, battery level, activation state, and up time.

Management of Supplemental Content

An authorized user may manage the content provider's 250 supplemental content and the content's distribution through the console. The content provider 250 may create and manage conditions that govern the distribution of supplemental content. The conditions may include store segments, audience segments, event triggers, and user parameters. As described below, the conditions may be created and applied to one or more supplemental content items. By reusing conditions and rules, the authorized users may reduce the time required to create supplemental content.

One exemplary embodiment of a condition is a store segment condition. In some embodiments, the above described groups may also be further divided into store segments to provide greater control in where supplemental content is distributed. The store segments may incorporate one or more parameters. For example, a content provider's 250 stores may be segments based on the store's performance and/or location. In some implementations, a store may belong to more than one segment. For example, a content provider's 250 store in New York City may belong to a New England segment, a New York state segment, a New York City segment, and a high performance segment.

An audience segment condition may be another exemplary embodiment of a condition. The audience segment may allow supplemental content to be provided to only specific users 230. Audience segments may include one or more parameters such as, but not limited to, the number of visits within a given time range, the age of the user 230, and the gender of the user 230. For example, a user 230 may be included in a first audience segment if the user 230 visits the content provider 250 more than three times in the last month, is between the ages of 18 and 34, and is female.

The delivery of supplemental content may be triggered responsive to an event condition. These event conditions may be referred to as offer trigger events. A number of parameters may be associated with the offer trigger. The parameters may include location, beacon reference, delay time, dwell time, and default status. For example, an offer trigger that occurs when a user 230 enters a content provider's 250 store may include the parameters: title=Walk in Instant; Beacons=All; Delay time=0 sec; default=yes.

Having created the conditions that may control the distribution of the supplemental content, the authorized users may create the supplemental content. The supplemental content may be placed in an offer queue that dispenses the supplemental content. In some implementations, multiple offer queues may be created. In some implementations, multiple offer queues may be created; however, only one may be active at a given time. For example, an offer manager may create offer queues for each season and then activate the seasonal offer queue during the correct season. The supplemental content may include one or more parameters. The parameters may include supplemental content value (e.g., 30% off or $10 off a purchase of $50), start date, end date, start time, end time, barcode image, supplemental content code, expiration time, exclusions, frequency cap, sharing option, and template. The template may layout and design (i.e., the visual presentation) of the supplemental content. In some implementations, the PSS 120 may verify one or more the supplemental content parameters before distributing the supplemental content. For example, the frequency cap of one supplemental content item may be set to 1,000. In this example, if the supplemental content has already been distributed 1,000 times, the PSS 120 may look for another supplemental content item in the offer queue to distribute to the user 230. Responsive to creating the supplemental content, the supplemental content may be associated with an audience segment condition, store segment condition, and/or trigger event condition.

In some implementations, the PSS 120 may determine that a user 230 meets the conditions to receive more than one supplemental content item. In some embodiments, a priority level condition may be assigned to each supplemental content item. The priority level may be used to determine which supplemental content item the user 230 should receive. For example, the offer manager may create supplemental content for loyal customers and give it a higher priority than supplemental content for the general public. Accordingly, in this example, the loyal customer may receive the supplemental content intended for loyal customers over the supplemental content intended for the general public.

In some embodiment, the PSS 120 may include a mechanism for approving supplemental content. In some implementations, offers reducing the price of supplemental content 251 by a percentage or amount over a predetermined limit require approval before the PSS 120 distributes the supplemental content to users 230. The PSS 120 may seek approval for supplemental content my sending a message (e.g., an email message) to the account manager or other authorized user authorized to approval supplemental content.

Figure 7:
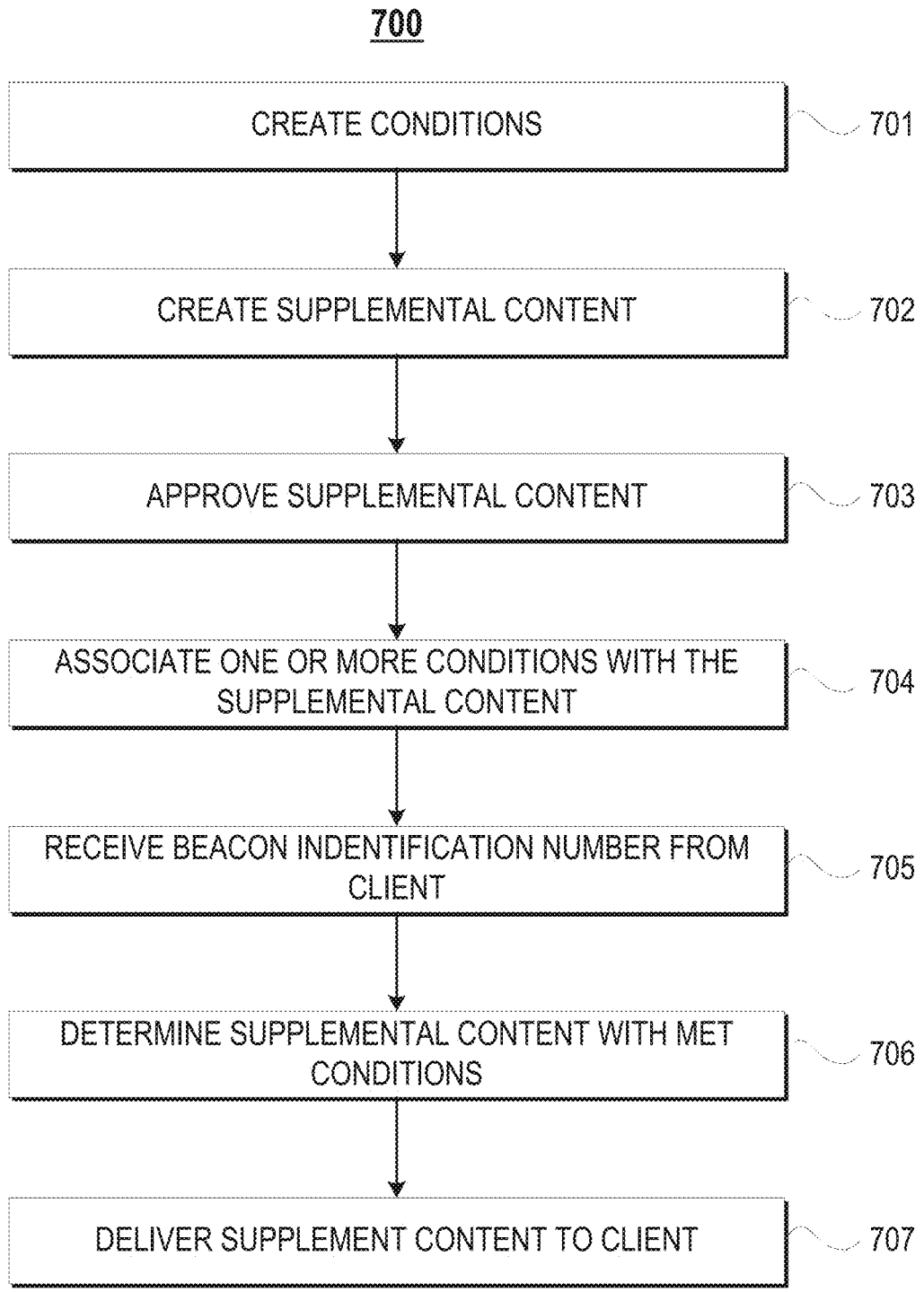
FIG. 7 is a flow chart of an example method for creating, managing, and delivering supplemental content with the system of FIG. 2A, according to one implementation of the disclosure.

FIG. 7 is a flow chart of a method 700 for creating, managing, and delivering supplemental content. At step 701, the method 700 includes creating one or more conditions. As described above, the conditions may include audience segment conditions, store segment conditions, and event trigger conditions. In some implementations, the PSS 120 stores the conditions such that they may be used with multiple supplemental content items. At step 702, the supplemental content is created. Creating supplemental content may include associating predetermined parameters with an offer.

At step 703, the supplemental content is approved. In some implementations, the supplemental content may not require approval, and in other implementations, the supplemental content may require approval if the supplemental content includes an offer over a predetermined dollar value.

At step 704, one or more conditions are associated with the supplemental content. As described above, the conditions may include one or more parameters. The PSS 120 may use the parameters within the conditions to determine what supplemental content to deliver to a user's 230 client device 102.

At step 705, the PSS 120 receives a beacon identification number from a client device 102. In some implementations, step 705 may mirror step 453 of method 450 described above. As described above, when a client device 102 is within a predetermined range of a beacon 240, the client device 102 may detect the beacon's 204 beacon identification number. The client device 102 may then transmit the beacon identification number and client device identification number to the PSS 120. Responsive to the beacon identification number and client device identification number, the PSS 120 may retrieve supplemental content that may be appropriate to deliver to the client device 102.

At step 706, the PSS 120 determines which of the supplemental content items retrieved in step 705 should be delivered to the client device 102. The determination may be responsive to the conditions associated with each of the supplemental content items. For example, in step 705 the PSS 120 may retrieve a first supplemental content item with the condition it is to be delivered to female user and a second supplemental content item with the condition it is to be delivered to a male user. The PSS 120 may review these conditions and determine that as the client device 102 is associated with a male user, the second condition should be delivered. At step 707, the supplemental content is delivered to the client device 102.

The skilled artisan will understand that, although the method steps above are shown in a particular order, they can be done in any order, or certain steps may be skipped entirely.

H. Ad Auction

As described above, in some implementations, a beacon 240 can be placed in a store. In some implementations, the store may sell a plurality of products from a plurality of venders (or content providers). For example, a home improvement store may sell ten different types of lawn mowers produced by three different venders. As described above, the PSS 120 may send supplemental content to a client device 102 when the client device 102 is within a predetermined range of a beacon 240. In implementations, when the beacon is placed near the products of a plurality of venders, the PSS 120 may hold a content auction to determine what supplemental content is delivered to the client device 102.

Figure 8:
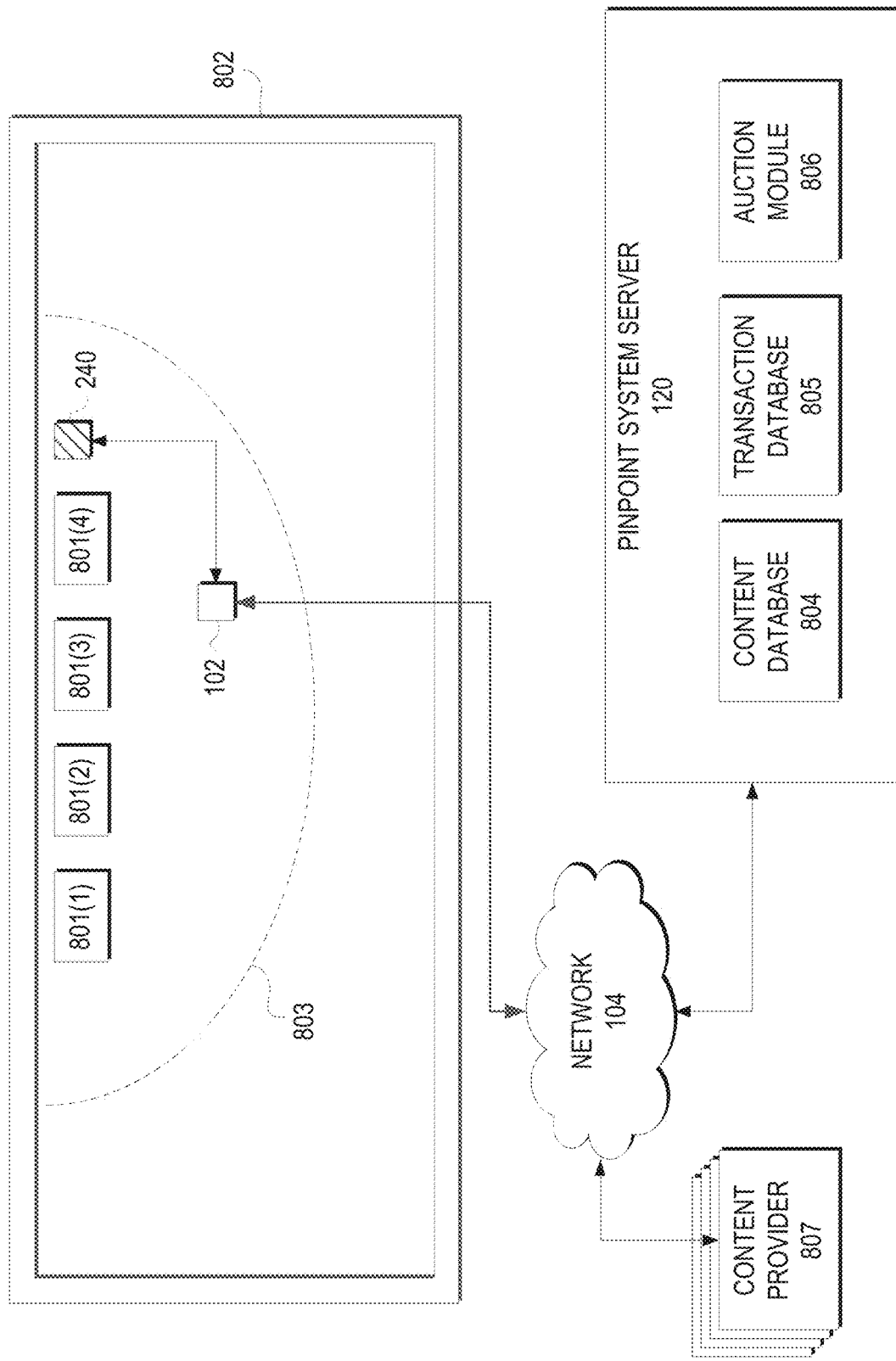
FIG. 8 is a schematic illustrating an example environment for conducting an ad auction using the System of FIG. 2A, according to one implementation of the disclosure.

FIG. 8 illustrates an example environment 800 for a content auction. As illustrated, products 801(1)-801(4) (collectively referred to as products 801) are for sale in store 802. A beacon 240 is placed near the products 801. The beacon 240 can communicate with a client device 102 within the beacon's physical radius 803. As described above, the client device 102 is in communication with the PSS 120 through the network 104. The PSS 120 of FIG. 8 is illustrated including a content database 804, a transaction database 805, and an auction module 806. Any component described in relation to a PSS 120 can be included in any other PSS 120 described herein. The environment 800 also includes a plurality of content providers 807 that generate supplemental content to be delivered to the client device 102. In some implementations, the content provider 807 are the venders of, or otherwise associated with, the products 801.

In FIG. 2A, the PSS 120 of FIG. 8 can also include a content database 804. The content database 804 can be database where the PSS 120 stores the supplemental content generated by the content providers 807. The content stored in the content database 804 can be stored in the content database 804 in association with a bid price and at least one beacon 240 or beacon location. For example, a content provider 807 may be willing to pay $3.00 for one of its supplemental content items to be delivered to client device 102 when the client device 102 is near the content provider's product 801.

The PSS 120 may store the results of past auctions in the transaction database 805. In some implementations, the content providers 807 may set a cap on the amount of money they wish to spend on auctions within a predetermined amount of time. The PSS 120 may store this information in the transaction database 805 and determine if the content provider 807 has enough money left in their allowance to place a bid in an active auction. For example, a content provider 807 may wish to spend no more than $1,000 on auctions per month. In this example, if the content provider 807 has already spent $998.00 on auctions in the month, the transaction database 805 may prohibit a $3.00 bid from being placed for the content provider's account. The transaction database 805 may also be used to general reports for billing purposes at the predetermined intervals. For example, the owner of the PSS 120 may create invoices for each of the content providers 807 using an interface to the transaction database 805.

The auction module 806 may conduct the auction to determine what supplement content is to be delivered to the client device 102. For example, responsive to the PSS 120 determining the client device 102 is within the physical radius 803 of the beacon 240, the PSS 120 may transmit supplemental content to the client device 102. The PSS 120 can access to the content database 804 to determine what content is associated with the beacon 240. In some implementations, the auction module 806 may access the transaction database 805 to determine if the content associated with the beacon 240 is eligible for an auction. Content may be ineligible for an auction if, for example, the content provider 807 wishes to spend a predetermined amount on auctions per month and that amount has been met for the month. The content provider's content may not be eligible for auctions until the content provider's budget renews at the beginning of the next month.

Responsive to determining what content is associated with the beacon 240, the auction module 806 conducts the ad auction. In some implementations, the auction module 806 iteratively increase the price for sending the supplemental content item to the client device 102 until a winner of the auction is determined. For example, if the auction module 806 determines that content item A, B, C, and D are associated with products 801(1), 801(2), 801(3), and 801(4), respectively, it may enter the content items A, B, C, and D into the ad auction. In this example, if content item A has a maximum bid price of $3.00, content item B a maximum bid price of $5.00, content item C a maximum bid price of $2.00, and content item maximum D a bid price of $3.00. The auction module 806 may increase the bid price of the auction until a winner is determined. The increase in bid price may be a fixed or variable amount. Furthering the above example, assume the increase price is $0.10. In this example, content item C would drop out once the bid price reaches 2.00 and content items A and D would drop out when the bid priced reaches 3.00. Content item B would win the auction at a price of 3.10. In some implementations, auction module 806 calculates the winning price as the second maximum highest bid price, which is to be paid by the content provider associated with the highest bid price. In this example, the second highest bid price is $3.00, which would be charged for displaying content item B. In some implementations, if the highest bid price is associated with more than one content item (for example, if the above example action also included content item E with a maximum bid price of $5.00), the winner of the auction may be determined by randomly selecting one of the content items that has the highest maximum bid price. In some implementations, with multiple highest maximum bids, each of the content items with the highest maximum bid may be queued for subsequent delivery to client devices 102. For example, content item D may be delivered to the first client device 102 and content item E may be queued for display to the next client device 102 that enters the physical radius 803. Once the queue is empty ad auctions may resume to determine which content items are delivered to client device 102 entering the physical radius 803.

Figure 9:
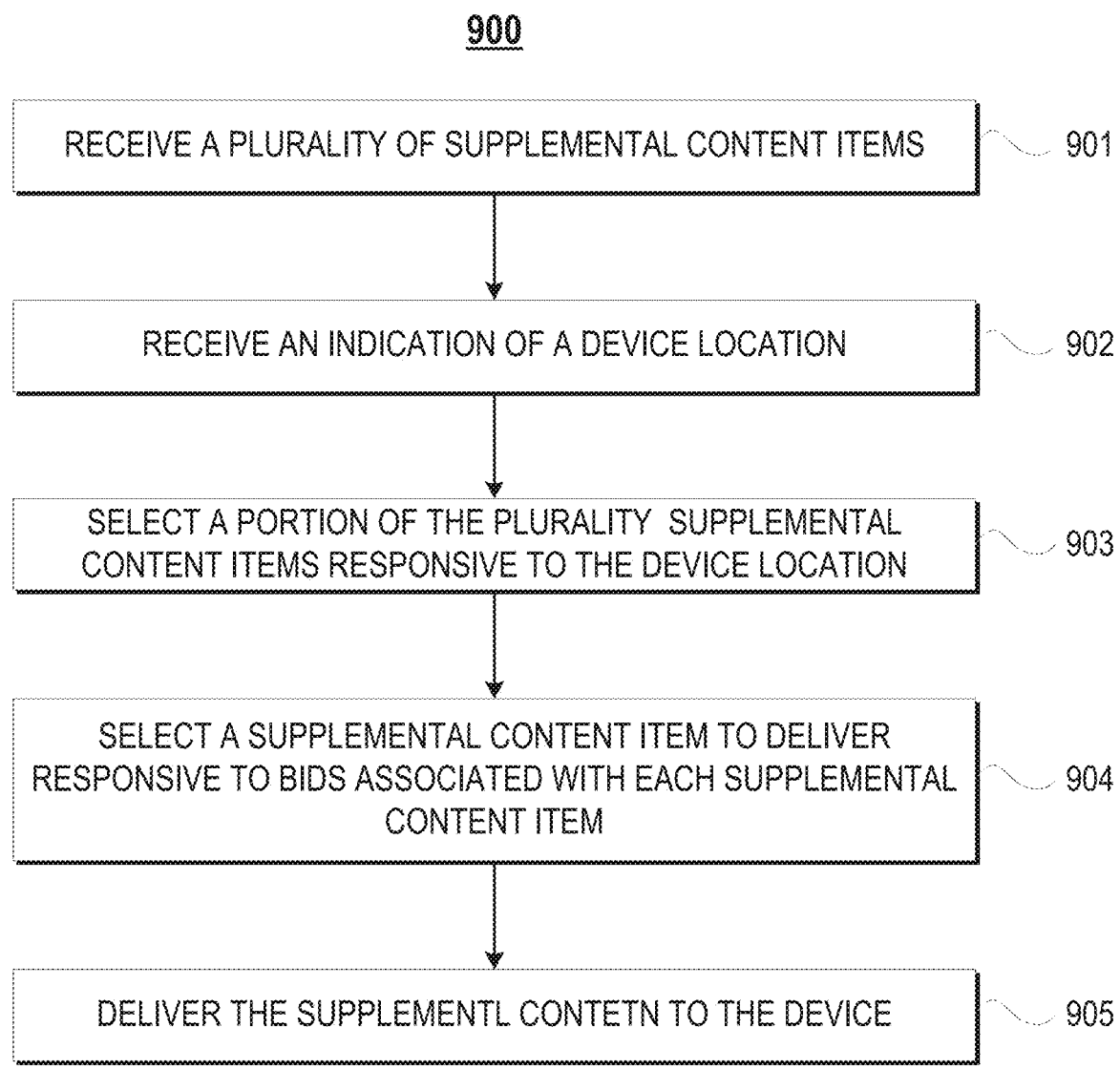
FIG. 9 is a flow chart illustrating a method for conducting an ad auction using the System of FIG. 2A, according to one implementation of the disclosure.

FIG. 9 is a flow chart of a method 900 for conducting an ad auction. At step 901, the PSS 120 receives a plurality of supplemental content items. The plurality of supplemental content items can be received from one or more content providers 807. In some implementations, a maximum bid price and a specific beacon 240 are associated with each of the supplemental content items. In some implementations, the supplemental content items can be associated with a plurality of beacons 240. For example, a content provider 807 may sell grills through a national retailer. In this example, the content provider may associate their supplemental content items with each of the beacons located near the grilling section of each of the national retailer's stores. As described above, the maximum bid price is the maximum price the content provider 807 is willing to pay for the supplemental content item to be delivered to the client device 102.

At step 902, the PSS 120 receives an indication of a client device 102 location. As described above in relation to FIG. 8, the PSS 120 may determine the location of a client device 102 by receiving a beacon identification from the client device 102 once the beacon 240 has crossed the physical radius 803. The PSS 120 may then determine the location of the beacon 240 that generated the beacon identification number and then associate the location of the beacon 240 with the client device 102.

At step 903, the PSS 120 selects a portion of the plurality of supplemental content items responsive to the location of the client device 102. For example, the auction module 806, may search the content database 804 for content items that are associated with the location indicated in step 902. The PSS 120 may then enter the selected content items into an ad auction to determine which content item is to be delivered to the client device 102.

At step 904, the PSS 120 selects a supplemental content item responsive to the bids associated with the each of the plurality of supplemental content items selected in step 903. As described above, in some implementations, the supplemental content item is selected through an ad auction. In some implementations, responsive to multiple content items having the same maximum bid price, the ad auction can have a plurality of winners. In these instances, the content item to be delivered can be randomly selected from the plurality of winners or the winning content items may be queued for display to subsequent client devices as they enter the physical radius 803 of the beacon 240. Once a content item is selected for display to the client device 102, the price of the winning bid is charged to the account of the content provider associated with the winning content item.

At step 905, the selected supplemental content item is delivered to the client device. The content item may be delivered to the client device via Wi-Fi or a cellular connection of the client device. In some implementations, the content item is only delivered to the client device is actively running an application associated with the PSS 120. In other implementations, the content item may be delivered to the client device 102 as a push notification, and the software application associated with the PSS 120 does not need to be open or active. In some implementations, if the client device 102 remains within the physical radius of the beacon 240 for a predetermined amount of time, the PSS 120 may conduct a second ad auction to deliver a second supplemental content item.

I. Distributed Updates

Figure 10:
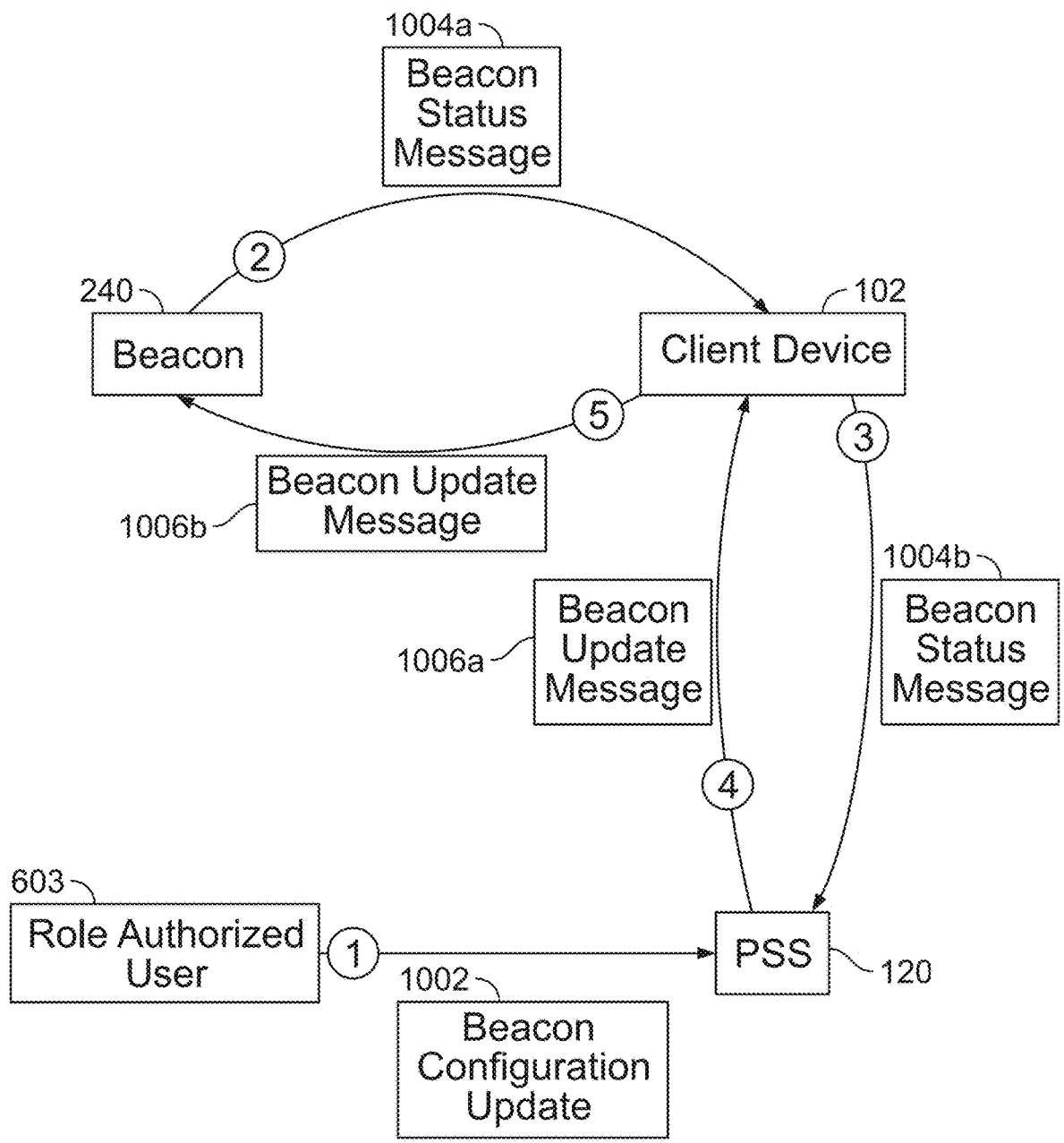
FIG. 10 shows a block diagram illustrating exemplary data flows between various entities that may be used to provide updates to beacons, according to some embodiments.
Figure 11:
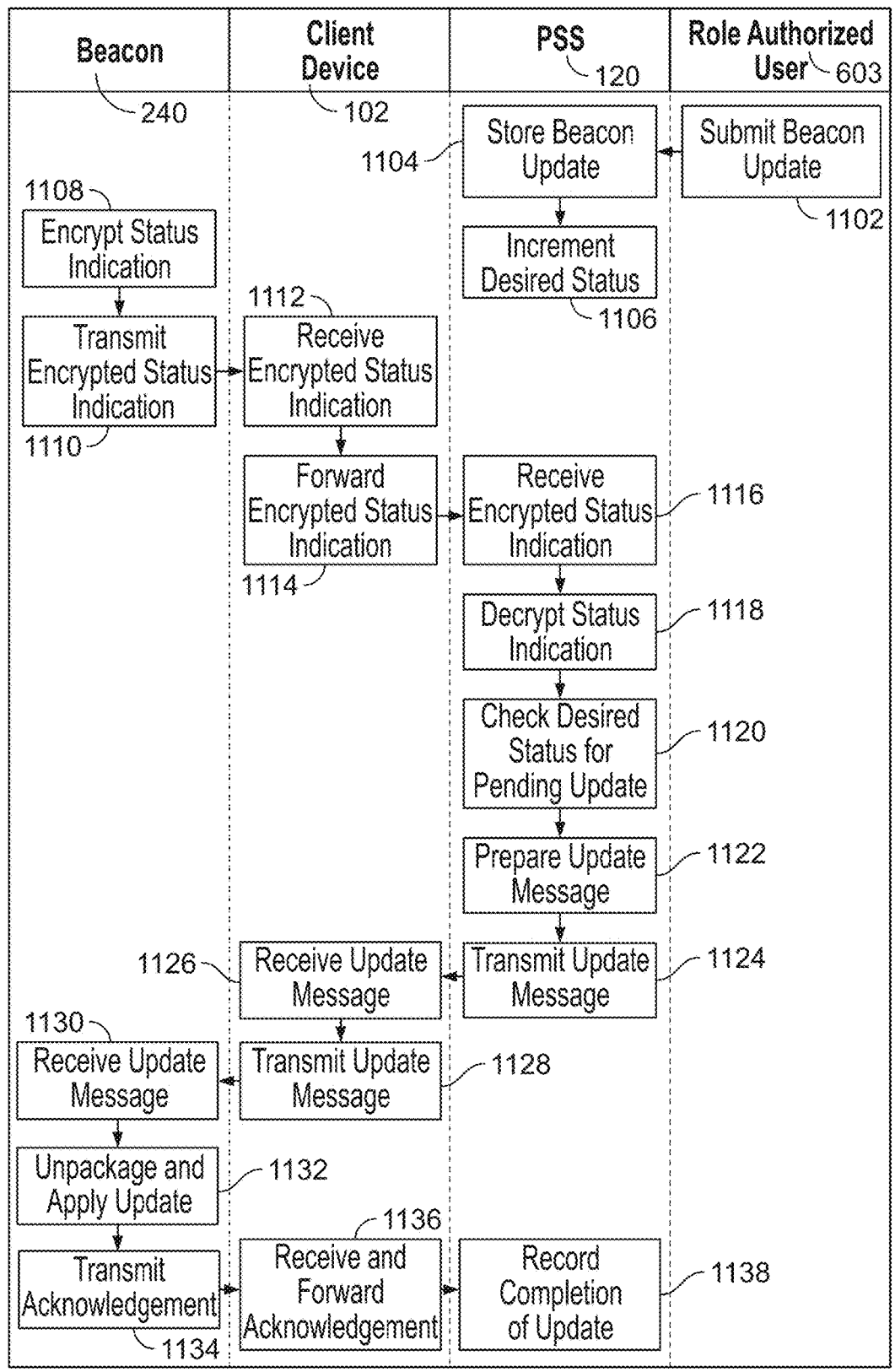
FIG. 11 shows a logic flow diagram illustrating exemplary aspects of distributing an update to a beacon, according to some embodiments.

In some embodiments, a great number of un-networked beacons can be managed and/or receive firmware upgrade from a central server via an intermediary client device. In this way, the beacons can be designed without Internet capabilities to save production cost. For example, large organizations may have thousands of locations with each location containing hundreds of beacons, each of which broadcasts a signal to support micro location detection. In this case, managing the status of the beacons and performing firmware upgrade can be challenging. The systems and methods of the present disclosure, for example as shown in FIGS. 10 and 11, enable the management of a fleet of unconnected beacons using a network of unsecured (e.g. without any specific or dedicated authentication or other security features), networked client devices that periodically check on the health and upgrade status of each beacon. For example, firmware upgrade for beacons can be downloaded at a client device via the Internet, which may in turn transmit the upgrade data to the beacon via a local connection (e.g., Bluetooth).

In some examples, the client device acts as an intermediary device to convey an encrypted message including firmware upgrade data from a central server to the beacon. For example, when a large number of client devices may be used as potential intermediary devices for firmware upgrade for beacons, registering each and every client device with the server may be inefficient and impractical. When there is no required trust relationship between the client device and beacon or even the client device and server, the update messages could be distributed over an insecure network. In this way, the client device may not need to be registered with the central server, which may allow a large variety of client devices to serve the role of providing firmware upgrade for beacons without any pre-registration or pre-authorization with the central server.

In some embodiments, the client device may instantiate a provided client component, such as configuration utility applications (e.g., a mobile app installed on the device, etc.), created to manage these large beacon deployments or consumer applications that perform beacon maintenance as a background process on the device. This approach may allow a group of employees or consumers to securely perform crowd-sourced configuration of beacons without any authentication or even knowledge of the updates and without any direct connection between the beacons and the server.

In further embodiments, the systems and methods disclosed herein may be applied to any non-networked or distributed devices capable of communication over a local area wireless communication protocol, such as sensors, smart devices, single board computers, devices considered part of the internet-of-things, or any other embedded computing or BLE device.

FIG. 10 shows a block diagram illustrating data flows between various entities that may be used to provide updates to beacons, according to some embodiments. As shown in FIG. 10, messages are passed between a beacon 240 (e.g. see FIGS. 2A and 2B), a client device 102 (e.g. see FIG. 2B), a Pinpoint System Server (PSS) 120 (e.g. see FIG. 2A), and a role authorized user 603 (e.g. see FIG. 6). In some implementations, the role authorized user 603 is a beacon manger or any person or group who are authorized to provide updates to the beacon 240. In another implementation, the role authorized user 603 can include or be affiliated with any of an upgrade server, storage server, cloud server, and/or the like. Updates are included in a beacon configuration update message 1002, and can be used to change any of the parameters that are configurable by the beacon. For example, the configurable parameters altered by an update may include, but are not limited to, the status of logical radii, daisy chaining of beacons, the physical broadcast radius, power-saving parameters, system update information, and/or the like. The beacon configuration update message 1002 may also contain updates to the firmware running on beacon 240. In some implementations, firmware updates can be provided by the role authorized user 603.

Beacon configuration update message 1002 may be communicated to PSS 120 constantly, intermittently or periodically through a network message or any suitable interface, such as a keyboard and mouse. In an alternative implementation, the beacon configuration update 1002 may be triggered when the PSS 120 sends an update request to the role authorized user 603. Updates pending for each beacon are stored in association with each beacon's record in the beacon location database 265 within the PSS 120. Updates may be stored entirely within the database record or may be referenced by a pointer and stored in a suitable file system. The PSS 120 will also keep a record of a desired status indication, such as a version number that should be contained within beacon status message 1004b or a record of which updates have been acknowledged as successfully applied and which updates are unacknowledged. In some implementations, contents of the beacon update message 1006a may be atomically packaged into one or more data units at the PSS 120, which may divide and/or combine the updates in any suitable manner so that they may be applied in individual, atomic data units, segments, batches or messages. Updates submitted by role authorized user 603 may be divided into multiple updates that fit in individual data packets that are sized according to the parameters of the local and wide area network communication protocols. In some implementations, the PSS 120 includes an indication an update message 1006a is part of a series of messages that cover a single update (e.g. a firmware file divided into multiple packets). The transmission of updates is described in greater detail with respect to FIGS. 11 and 12. The beacon update message 1006a may be atomically transmitted to the client device when the network connection is available. For example, the client device may halt the downloading of the update message 1006a from PSS 120 when a network problem occurs, but may be able to resume downloading once the network connection is recovered without re-downloading the entire update message 1006a. The beacon update messages 1006a and 1006b may be referred to herein as an encrypted update data message since they includes the data required to update a beacon and are encrypted according to the methods disclosed herein. The PSS 120 may assign an update id number to each atomic update that is received by the client device 102. The beacon location database 265 (e.g. see FIG. 2A) can list the update id numbers of each pending update, which may be independently and individually removed from the list, for example as they are applied and acknowledged. In some implementations, a version number will serialize the pending updates and the beacon status message 1004b will indicate the update id number of the most recent update to be received contiguously with earlier updates.

Beacon 240 may periodically, constantly or intermittently broadcast a wireless message, which may be encrypted, that includes beacon status data, such as a beacon id or configuration version number, and is used to enable micro-location. This encrypted packet including beacon status data may be referred to herein as an encrypted status data packet. The beacon status data may be referred to herein as a status indication and includes but is not limited to version number, an identification of the most recent update to be applied contiguously with previous updates, or any other suitable indication of the updates applied by the beacon 240. For illustrative purpose only, FIG. 10 shows that the beacon status message 1004a is broadcast from beacon 240 after the beacon configuration update 1002. The beacon configuration update 1002 received by PSS 120, and the beacon 240 broadcasting the beacon status message 1004a may occur simultaneously, in parallel, or in any possible order. In some implementations, beacon status message 1004a includes a status indication contained within the broadcasts. In some implementations, beacon status message 1004a is a separate broadcast. In some implementations, beacon status message 1004a is unencrypted (e.g. the contents of the message can be understood by devices operating on the same communication medium). Beacon status message 1004a is transmitted wirelessly over a local wireless communication protocol, such as Bluetooth, to client device 102, which receives the beacon status message using a client component and forwards the data from beacon status message 1004a over a suitably wide area network, such as the Internet or the local wireless communication protocol where suitable, to the PSS 120. The PSS 120 decrypts the beacon status message 1004b to extract an indication of the status (e.g. current firmware or OS version) of the beacon 240, which is used to determine if there are pending updates. In the event that there are updates pending, the PSS 120 packages the update into an encrypted beacon update message 1006a, which is transmitted to client device 102 over the wide area network. Once a client device 102 arrives within a detectable range of the beacon 240 (e.g., within a Bluetooth communication range, etc.), and receives the beacon status message 1004a, the client device 102 may detect the beacon, e.g., as discussed in relation to FIG. 2B. In some implementations, the client device 102 may then determine whether an update for the beacon is available, and then forward the data to the beacon 240 over the local wireless communication protocol as beacon status message 1006b.

In some implementations, the beacon 240 is configured to expand its broadcast radius during a predetermined time referred to herein as an administrative window. The expanded broadcast range may allow for a single client device 102 to communicate with multiple beacons from a single location that might otherwise be outside of the range of the beacons. For example, FIG. 2B shows a client device 102(3) between the physical radii of two beacons 240. During the administrative window, the beacons 240 may expand their physical radii so that client device 102(3) may update both beacons 240 without moving. For example, each beacon 240 may track an administrative window, which may be configured to have the same or different parameters (e.g., a start time, a duration, an end time, etc.) for all beacons, using a local clock or timer. At the start time of an administrative window, the beacon 240 may increase the power level of its local area wireless signal to a configurable level, which in turn expands the physical broadcast radius of the beacon 240 for the duration of the administrative window. In some locations, this will allow for a stationary device, such as a Bluetooth enabled point-of-sale device, to ensure that beacons are updated. In some implementations, the administrative window will allow for an administrator with a mobile client device 102 to do minimal travel. In some implementations, an administrative client device 102 may guide an administrator to beacons, for example by using micro-location or providing a map indicating beacon statuses, that require pending updates, as indicated by records of updates that can be transmitted to the administrative client device 102 from the PSS 120. The administrative client device 102 can also display an indication of which beacon 240 is being updated and the progress of the update, e.g. the progress of transmitting beacon update message 1006b or a series of beacon update messages. In some implementations, the PSS 120 transmits a prompt to role authorized user 603 requesting an update. For example, the prompt may be transmitted prior to the administrative window or in response to a beacon status message 1004b.

FIG. 11 shows a logic flow diagram illustrating distributing an update to a beacon. At 1102, role authorized user 603 submits a beacon update, which may specify a change to be made to any of the configurable settings of a beacon, include new software or firmware to be stored on the beacon, or any other suitable data that needs to be transmitted to the beacon by an authorized user, such as a retailer, a beacon manager, a manufacturer, or a software provider. At 1104, the submitted beacon update is stored by the PSS 120, or any suitable storage system, and associated with the beacon that requires the update, e.g. by storing information related to the update in the beacon location database 265 or another suitable database, key value store, or storage means. In some implementations, updates that apply to multiple beacons may be de-duplicated in storage, for example by storing a pointer to a single firmware update file instead of storing a copy of the firmware for each beacon. At 1106, the PSS 120 will update its records to indicate that there is an update pending for a beacon 240. The PSS 120 may store a desired status or version number for beacon 240, a list of updates that are pending, or any suitable indication that a stored update has not yet been applied by the beacon 240.

At 1108, the beacon 240, which in this example has not yet received the update submitted at 1102, encrypts an indication of its status. The beacon status indication may be a version number, an identification of the most recent update to be applied contiguously with previous updates, or any other suitable indication of the updates applied by the beacon. In some implementations, the beacon status indication is omitted, and the tracking of which updates are pending or applied is done solely by the PSS 120. In some implementations, the status indication is contained in an unencrypted portion of a broadcast sent from the beacon.

At 1110, the beacon 240 encrypts the indication of its status and broadcasts beacon status message 1004a (as shown in FIG. 10), as described above, over a local wireless communication protocol, such as Bluetooth. The beacon status message 1004a may be included in the encrypted messages used for providing micro-location services. At 1112, the beacon status message 1004a is received by a client device 102 within the broadcast range of the local wireless communication protocol. The beacon status message 1004a can be kept confidential from the client device to avoid information leak for security concerns. For example, the beacon 240 may encrypt the beacon status message 1004a (at 1108) using an encryption key that is unknown to the client device. In this way, the client device may be prevented from reading the encrypted contents of the beacon status message 1004a as the data in the encrypted portion of the beacon status message 1004a will be obscured (e.g. by a cryptographic hash function). In this way, the client device acts as a conduit to transfer the beacon status message 1004a to the PSS without any need to decrypt/process the received status message, and thus does not need to install or be configured with any additional software components. Consequently, the client device 102 may not need to be secured or to be trusted to participate, and may act as an intermediary device between the PSS and the beacon by relaying encrypted data but without decrypting any of the encrypted data. In some implementations, a trusted and securely authenticated client device 102 may be used. In some implementations, the client device 102 may decrypt an encrypted beacon status message 1004a in order to determine whether the status indication of the beacon 240 was previously transmitted to the PSS 120 within a threshold amount of time. In step 1114, the client device 102 retransmits beacon status message 1004a as beacon status message 1004b over a sufficiently wide area network, such as a wired or wireless internet connection, to the PSS 120, which receives the data at 116.

At 1118, the PSS 120 decrypts the beacon status message 1004b. As described above, decryption is done with a shared secret key (e.g. a key that is known to both the beacon 240 and PSS 120) that is associated with the beacon 240 and possibly an indication of the location of beacon 240. In some implementations, the beacon 240 and the PSS 120 use their own pairs of public and private encryption keys, for example each beacon could be programmed with a public key for the PSS 120 and use the beacon id as a public key. At 1120, the PSS 120 extracts the beacon status indication from the decrypted beacon status message 1004b and compares the beacon status indication against the desired beacon status or checks for indications of pending updates to determine if the beacon 240 is in need of an update. At 1122, the update is packaged into one or more beacon update messages 1006a, which may be generated differently for small configuration changes and larger firmware updates. The process of packaging and transmitting updates is described in greater detail in relation to FIG. 12.

At 1124, the PSS 120 transmits beacon update message 1006a to client device 102. In some implementations, PSS 120 stores, for example in beacon location database 265, the network addresses of the client devices that have recently forwarded a message from the beacon 240. The PSS 120 may send beacon update message 1006a to a different client that is likely to be within range of a beacon. For example, the beacon status message 1004b can indicate that the forwarding client device 102 received the message because it was leaving the range of beacon 240 and is therefore unlikely to be suitable for forwarding the update. In some implementations, when there are multiple beacon status messages 1006a for a single update, the PSS 120 may forward the messages through multiple client devices, and the beacon 240 may combine packets from the clients such as in a torrent or peer to peer download model. In some implementations, PSS 120 forwards beacon update message 1006a to a known access point, e.g. a point of sale device enabled to access the local area communication protocol. Such known access point may be used to relay the updates to beacons when the client device is beyond the communication range of the beacon. For example, an access point may have a large broadcast range, such as 10 meters, 20 meters, or 30 meters or more. Any client device within the communication range of the access point may transmit the beacon updates to the access point first, and then the updates can be sent to the beacon from the access point. The client device receives beacon update message 1006a over the wider area network and forwards the message to the beacon 240 as beacon update message 1006b over the local area communication protocol in step 1128.

At 1130, the beacon 240 receives beacon update message 1006b, which is unpackaged and applied at 1132. The beacon 240 decrypts the beacon update message 1006b, and extracts information related to the update, e.g. a nonce, that can be used to determine both that the update is valid (e.g. that the update was issued by the PSS and is intended for the beacon 240) and whether it has been applied previously, for example if the update was sent to two different clients by the PSS perhaps due to a lost acknowledgement. The beacon 240 may also check that it has received all of the messages that comprise a complete update before applying the update. In some implementations, the beacon 240 will cache updates that it receives and commit the updates to memory in the order created by the PSS numbering. Unpacking and applying updates is discussed in more detail in relation to FIG. 13. Once an update has been applied by the beacon 240, at 1134, the beacon 240 will transmit an acknowledgement of the update to client device 102, which, at 1136, receives and forwards the acknowledgement to PSS 120. At 1138, PSS 120 records that the update was completed and is no longer pending. In some implementations the update is considered complete when it is stored in its entirety in memory in the beacon. In some implementations, the update is considered complete when the acknowledgement of the update is received by the PSS 120.

Figure 12:
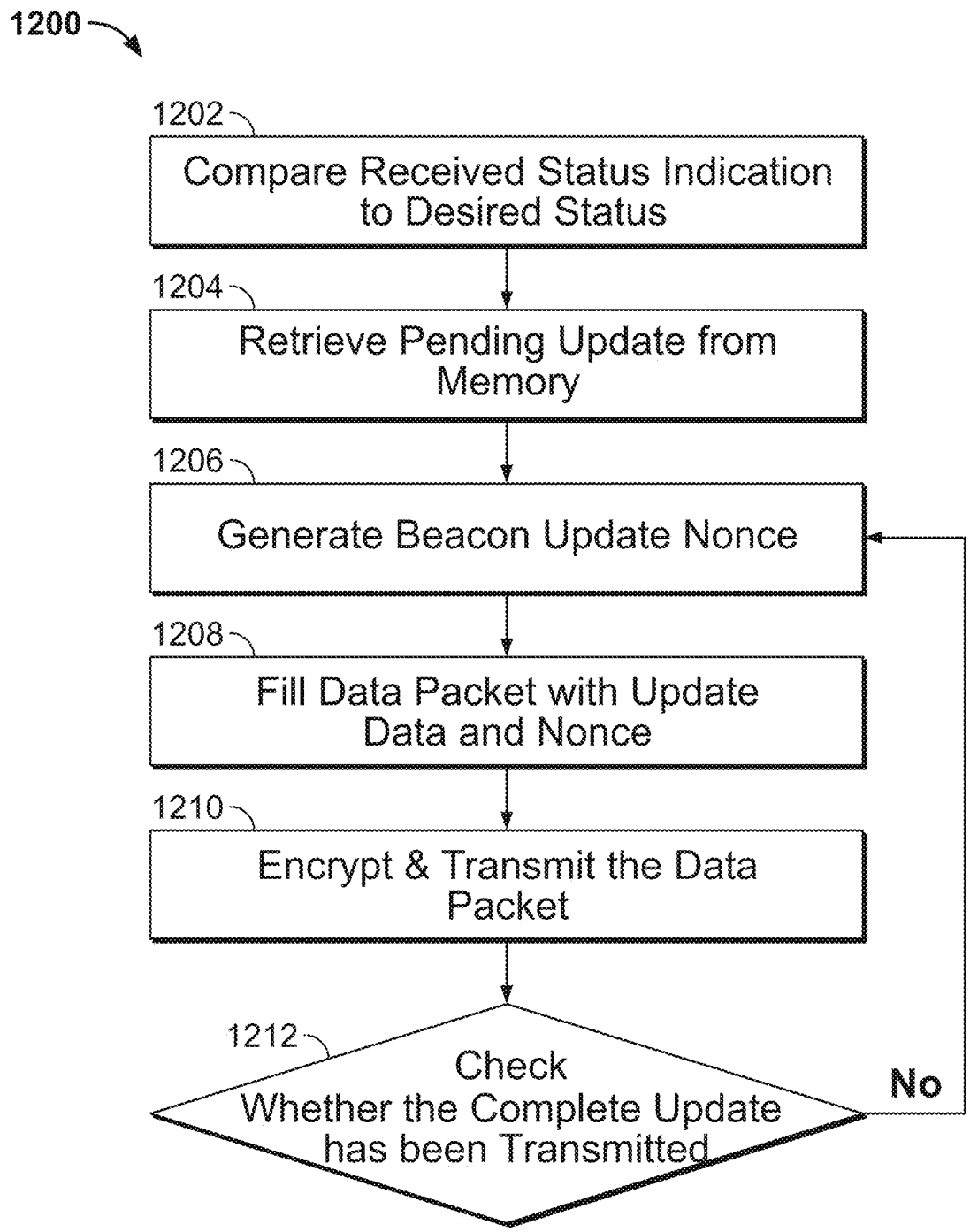
FIG. 12 shows a flow chart illustrating an exemplary process of transmitting beacon updates, according to some embodiments.

FIG. 12 shows a flow chart illustrating an exemplary process of transmitting beacon updates, according to some embodiments. In one embodiment, the process 1200 involves the PSS 120 comparing a status indication received from a beacon 240 to a desired status indication (1202), retrieving any pending updates for the beacon 240 from memory, and iteratively generating beacon update messages, such as 1006a. The iterative update message generation involves generating a nonce for the beacon update message 1006a (1206), filling a data packet with the nonce and update data (1208), encrypting and transmitting the beacon update message 1006a (1210), and iterating if the complete has not yet been sent (1212).

At 1202, PSS 120 compares a status indication received from a beacon 240, such as at 1118 in FIG. 11, to a desired status such as a latest firmware and/or configuration update status the PSS 120 obtained from the role authorized user 603 (e.g., see FIG. 6) and retrieved from a database. If the PSS 120 record for desired status, such as may be stored in beacon location database 265, does not match the status indication, the PSS 120 may determine that there is an update pending that has not been applied by the beacon 240. In some implementations, the PSS 120 will record which updates have been acknowledged by the beacon 240 and will discard status indications that do not indicate the most recent version. For example, the beacon 240 may apply and acknowledge two updates, and the PSS 120 may discard any stale messages including a status indication reflecting only the first update to be applied.

At 1204, the PSS 120 retrieves a previously stored update from memory. As described above, the update may be stored in the beacon location database 265 or any suitable file system. In some implementations, updates may be submitted to PSS 120 simultaneously by role authorized user 603 in beacon configuration update 1002. The PSS 120 may divide simultaneously received updates into individual updates that may be atomically applied. For example, role authorized user 603 may use a web interface, such as a website that is configured to assist with beacon management, to submit configuration updates to beacon 240 that update the physical radius, change the power saving settings, and include the beacon 240 in a daisy chain. The PSS 120 may divide and/or combine the updates in any suitable manner so that they may be applied in individual, atomic messages. In some implementations, the PSS 120 will check for conflicting updates and order or delete pending updates to avoid transmissions or reordering client updates in a way that introduces erroneous behavior. For example, if role authorized user 603 submits two updates to the physical radius of beacon 240, the PSS 120 may not send the earlier submitted update because its effect would be nullified by the later submitted update. In some implementations, the PSS 120 will prompt role authorized user 603 if they would like to rescind a submitted update. In some implementations, the role authorized user can directly cancel pending updates with the PSS 120.

At 1206, the PSS 120 generates a nonce, which can include any information used to uniquely identify a packet or update. The nonce may be a unique packet or update id, an expected beacon status, e.g. battery level or uptime, a repeat of the information used for anti-spoofing, or any suitable information that will prevent updates in duplicated packets from being applied more than once. In some implementations, when an update does not fit in a single local or wide area network packet, the PSS 120 will generate an update id nonce for the update and a packet id nonce for each packet. At 1208, the PSS 120 generates a data packet that includes the nonce and a suitable amount of update data. For example, the PSS 120 may fit the entire update into a single packet or constrain the size of the update to the maximum or minimum size of data packets in either network standard. In some implementations, the PSS 120 will allow the beacon 240 to ensure the integrity of the packet data by including a checksum or some other suitable means.

At 1210, the PSS encrypts the data packet and transmits the data packet to a client device 102. The encryption is performed as described above. In some implementations, the PSS 120 and beacon 240 share an encryption key, which may update routinely. In some implementations, the PSS 120 and beacon 240 have individual pairs of public and private keys that are used to encrypt update packets, such as beacon update message 1006a in FIG. 10. In some implementations, the update will be encrypted by the PSS 120 prior to being split into data packets and decrypted by the beacon 240 once all of the update packets have been received. This may allow for the PSS 120 to prepare updates, e.g. when the local network packet size is unknown, such that the updates can be repackaged or resized for the local network by the client device 102.

The PSS 120 transmits the encrypted update packet to a client device 102, such as the device that forwarded beacon status message 1004b in FIG. 10. In some implementations, PSS 120 stores, for example in the beacon location database 265, the network addresses of the client devices that have recently forwarded a message from the beacon 240. The PSS 120 may use timestamps, a queue, or any other suitable means to determine which client devices 102 forwarded beacon messages most recently. The PSS 120 may send beacon update message 1006a to a different client that is likely to be within range of a beacon. For example, the beacon status message 1004b can indicate that the forwarding client device 102 received the message because it was leaving the range of beacon 240 and is therefore unlikely to be suitable for forwarding the update. In some implementations, when there are multiple beacon status messages 1006a for a single update, the PSS 120 may forward the messages through multiple client devices, and the beacon 240 may combine packets from the clients such as in a torrent or peer to peer download model. The PSS 120 may also use a single client device 102 with unreliable network connectivity. Since updates are accounted for at a per message level, the client device 102 can lose and regain connectivity with the either of the local or wide area networks in the middle of transmitting an update without needing to re-download the entire update. In some implementations, PSS 120 forwards beacon update message 1006a to a known access point, e.g. a point of sale (POS) device (e.g. a register) enabled to access the local area communication protocol. A known access point may have a large broadcast range that may be used to reliably send updates to beacons in an area relatively large compared to the physical radius of beacon 240. In some implementations, the beacon 240 may be configured to expand its physical radius in response to receiving a broadcast from the known access point. At 1212, the PSS 120 determines whether the entire update has been transmitted, e.g. if fewer than the required number of packets were sent, and returns to 1206 to continue transmitting the remaining update data.

Figure 13:
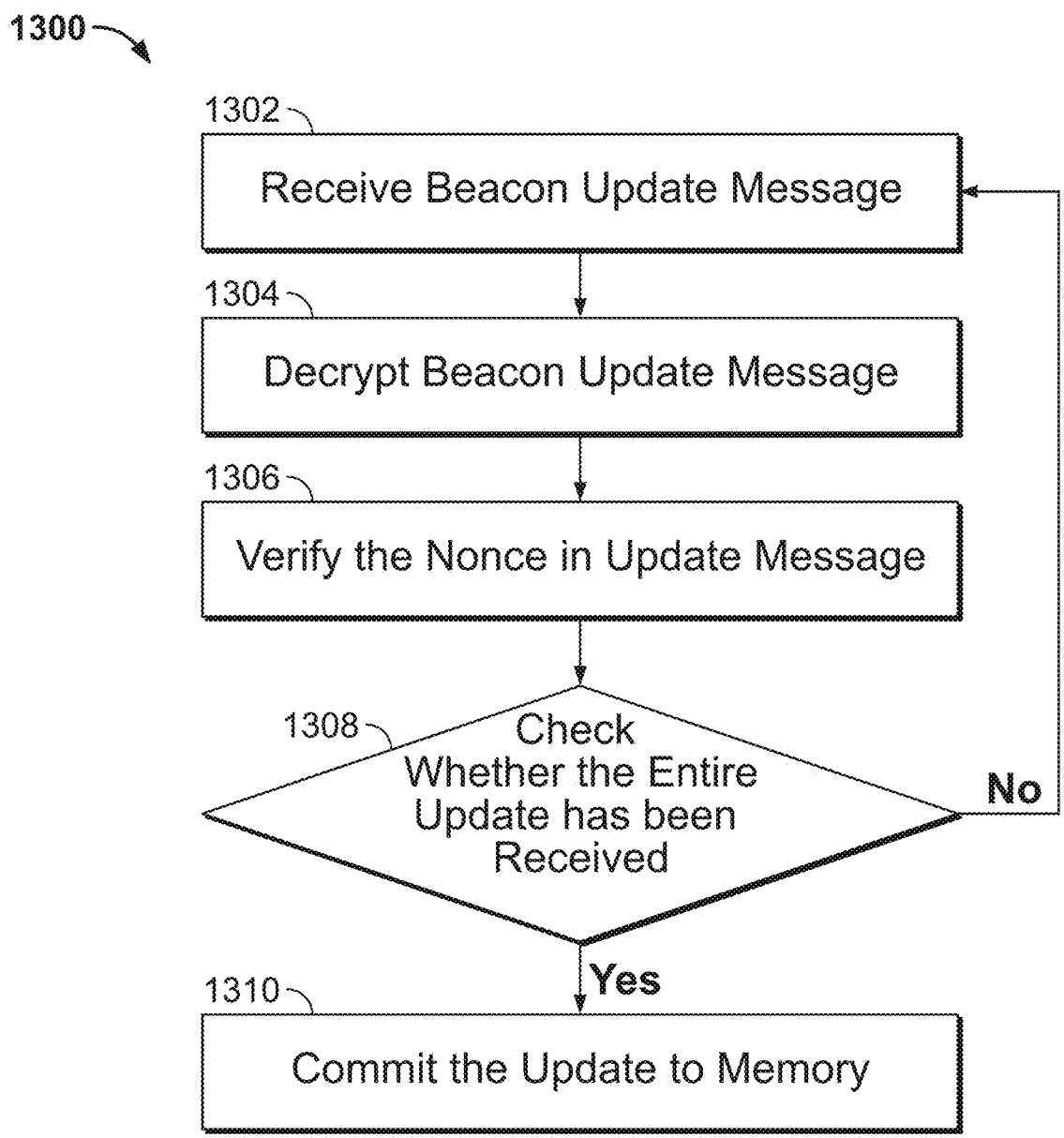
FIG. 13 shows a flow chart illustrating an exemplary process of receiving and unpacking an update at a beacon, according to some embodiments.

FIG. 13 shows a flow chart illustrating an exemplary process of receiving and unpacking an update at a beacon, according to some embodiments. In general, the process 1300 involves a beacon 240 receiving one or more beacon update messages 1006b from one or more client devices 102 (as in FIG. 10), decrypting and verifying the beacon update messages 1006b, and committing the update to memory once all update data has been received. As shown, the process 1300 includes receiving a beacon update message (1302) and decrypting the received beacon update message (1304). Once the update message is decrypted, the beacon 240 verifies that the message is an authentic update from the PSS 120 that needs to be applied (1306). The beacon 240 also checks whether it has received all of the messages in the update (1308), and, if yes, commits the decrypted update data to memory to apply the update (1310).

At 1302, the beacon 240 receives a beacon update messages 1006b from one or more client devices 102 (as in FIG. 10). The beacon update message 1006b is received over the local area communication protocol, e.g. Bluetooth, and can be used to change any of the parameters that are configurable by the beacon. For example, the configuration parameters may include, but are not limited to the status of logical radii, the physical broadcast radius, power-saving parameters, system update information, and/or the like. The beacon update message 1006b may also contain all or part of an update to the firmware running on beacon 240. At 1304, the beacon 240 decrypts beacon update message 1006b. The decryption may be performed using a secret key that is shared with the PSS 120, a private key held on the beacon, or any other suitable decryption means.

At 1306, the beacon 240 checks the nonce in the update message 1006b in order to validate the update message, which includes determining whether the update is new, intended for the beacon 240, and otherwise suitable for being applied to memory. In some implementations, the update message nonce is a unique sequence number given to each update message. The beacon 240 uses the nonce to determine whether the update message 1006b has been previously received by comparing the nonce to previously received nonces, for example if the network errors lead to re-transmissions or if a nefarious device is replaying an update message. Previously received update messages 1006b may be discarded if the update payload was previously applied, and, in some implementations, the beacon 240 acknowledges duplicated updates to counter the effect of lost acknowledgements. In some implementations, the beacon 240 applies updates in the order they were received by the PSS 120, e.g. as indicated by increasing sequence number or nonce. Update messages that are not contiguous with previously applied updates may be cached in memory by the beacon 240 and applied when any cached update is determined to be the next update in the sequence. In some implementations, the beacon update message 1006b includes a checksum, which may be in the encrypted portion of the message that can be used to detect or correct errors in the unencrypted update data. This prevents network errors or tampering client devices from corrupting the configuration of beacon 240 by corrupting the encrypted update message 1006b. The checksum may be a hash function output, parity data, an error correcting code, or any suitable means.

At 1308, the beacon 240 checks whether the entire update has been received. In some implementations, the beacon 240 looks for a terminating character that indicates the end of an update. In some implementations, the PSS 120 includes an indication of the size of the update, the number of packets used to transmit the updates, or any other suitable metadata that can be used by the beacon 240 to determine the necessary details of an update. If the update has not been received in its entirety, the beacon 240 stores the received update data in a cache or buffer in persistent or volatile local memory and waits for the missing update messages containing the remaining update data. In some implementations, updates involving multiple messages are cached, and not applied, until the entire update is received to avoid the possibility of corrupting memory or configuration settings with a partial update. At 1310, once the beacon 240 determines that the entire updates has been received and verified, the update is performed by committing the update data to memory such that the changes specified in update are made effective.

In some implementations, the beacon 240 is in communication with other beacons over the local area communication protocol. The beacons may be configured to collect routing information and otherwise act in order to form a mesh network that allows for communication between groups of beacons that can be reached over the local area communication protocol. The beacons may use distance-vector routing, link state routing, or any suitable routing protocol. The beacon 240 may also record the senders of broadcasts that the beacon 240 observes over the local communication protocol and transmit a list of the observed beacons to the PSS 120, which can use the information to construct a network topology that indicates the ranges of neighboring nodes. The PSS may also automatically construct such a network topology by using records, e.g. entries in the beacon location database 265, of beacon location, beacon id, and beacon physical radii to determine which beacons are likely to be within range of one another. Once a suitable network topology, which may be limited to a beacon 240 being aware of its neighboring beacons, is determined, the beacon 240 can be used to forward updates to other beacons. The PSS 120 may include in beacon update message 1006*b* an indication of which beacons should receive the update, instructions for forwarding the message, which may be encrypted as in an onion routing protocol, or any information suitable for distributing updates through the mesh network.

Various aspects of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. The communication network can include, for example, any one or more of a personal area network (PAN), a local area network (LAN), a campus area network (CAN), a metropolitan area network (MAN), a wide area network (WAN), a broadband network (BBN), the Internet, and the like. Further, the communication networks can include, but are not limited to, for example, any one or more of the following network topologies, including a bus network, a star network, a ring network, a mesh network, a star-bus network, tree or hierarchical network, or the like. The communications modules can be, for example, modems or Ethernet cards.

While this specification contains many specifics, these should not be construed as limitations on the scope of what may be claimed, but rather as descriptions of particular implementations of the subject matter. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

While operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products.

While various embodiments of the present disclosure have been shown and described herein, it will be apparent to those skilled in the art that such embodiments are provided by way of example only. Numerous variations, changes, and substitutions will now occur to those skilled in the art without departing from the disclosure. It should be understood that various alternatives to the embodiments of the disclosure described herein may be employed in practicing the disclosure. Generally, the computerized systems described herein may comprise one or more local or distributed engines, which include a processing device or devices, such as a computer, microprocessor, logic device or other device or processor that is configured with hardware, firmware, and software to carry out one or more of the computerized methods described herein.

The subject matter of this specification has been described in terms of particular aspects, but other aspects can be implemented and are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous. Other variations are within the scope of the following claims.

What is claimed is:

1. A method for secure distributed update of beacon devices, the method comprising:
providing, via a first network, a client component configured for installation on an operating system platform of a client device, wherein the installation of the client component is configured to enable the client device to process a status data packet, the status data packet received at the client device via a beacon wireless communication network separate from the first network, and the status data packet including a status indication from a beacon when the client device is proximate to the beacon;

obtaining, from the installed client component of the client device via the first network, the status data packet;

determining that an update is available for the beacon, based at least in part on the status indication included in the status data packet; and providing, to the installed client component of the client device via the first network, an encrypted update data message relating to the update, for subsequent transmission by the client device to the beacon via the beacon wireless communication network, wherein data from the encrypted update data message at the beacon causes the update of the beacon, and wherein the encrypted update data message includes information for use by the beacon to validate that the update is to be applied to the beacon.

2. The method of claim 1, wherein operations of the method are performed by a server, and wherein operations for the providing and the obtaining are performed without a trust relationship between the server and the client device.

3. The method of claim 2, wherein encryption of the encrypted update data message is performed using a shared secret key that is known to the beacon and the server.

4. The method of claim 1, wherein the client component is further configured to cause transmitting, by the client device, of the encrypted update data message to the beacon via the beacon wireless communication network.

5. The method of claim 4, wherein operations performed by the beacon, in response to receipt of the encrypted update data message via the client component, include:
decrypting the encrypted update data message to extract the update;
validating the encrypted update data message; and
performing the update by the beacon.

6. The method of claim 2, wherein the information in the encrypted update data message includes message validation information for use by the beacon to verify validity of the encrypted update data message as issued by the server and intended for the beacon.

7. The method of claim 6, wherein operations performed by the beacon to verify validity of the encrypted update data message include:
validating the encrypted update data message, wherein the message validation information includes a nonce in the encrypted update data message;
extracting the nonce; and
comparing the nonce to previously received nonces.

8. The method of claim 1, wherein determining that an update is available for the beacon based at least in part on the status indication further comprises:
retrieving, from a database, a reference status; and
comparing the status indication to the reference status.

9. The method of claim 1, wherein the client component is configured to cause the client device to transmit, to the beacon via the beacon wireless communication network, the encrypted update data message without decrypting the encrypted update data message.

10. A method for secure distributed update of beacon devices, performed by a client computing device, the method comprising:
receiving, at the client computing device from a beacon via a beacon wireless network connection, a status data packet including a beacon status indication, wherein the beacon wireless network connection occurs with the client computing device using a first wireless communication protocol;

transmitting, from the client computing device to a server via a wide-area network connection, the status data packet, the status data packet to be used by the server to determine whether an update is available for the beacon based at least in part on the beacon status indication, wherein the wide-area network connection occurs with the client computing device using a second wireless communication protocol;

receiving, at the client computing device from the server via the wide-area network connection, an encrypted update data message relating to the update, the encrypted update data message configured to cause installation at the beacon and cause the update of the beacon, wherein the encrypted update data message includes information provided by the server to be used by the beacon to validate that the update is to be applied to the beacon; and transmitting, from the client computing device to the beacon via the beacon wireless network connection, the encrypted update data message.

11. The method of claim 10, further comprising:
searching a local database for previously downloaded update data.

12. The method of claim 10, wherein the encrypted update data message is transmitted from the client computing device to the beacon without being decrypted at the client computing device.

13. A computing system for secure distributed update of a beacon, the computing system comprising:
at least one memory configured to store:
a client component, the client component configured for installation on an operating system platform of a client device; and
an encrypted update data message indicating an update for installation at a beacon, wherein the encrypted update data message includes for use by the beacon to validate that the update is to be applied to the beacon;
at least one communication interface coupled to the memory, the communication interface configured to:
transmit, via a first network, the client component for installation on an operating system platform of the client device, wherein the client component, when executed by the client device, is configured to cause the client device to receive, via a beacon wireless communication network connection and wireless communication protocol that is separate from the first network, a status data packet including a status indication from a beacon when the client device is proximate to the beacon,
receive, from the client device, via the first network, the status data packet, and
transmit, to the client device, via the first network, the encrypted update data message relating to the update for transmission to the beacon by the client device via the beacon wireless communication network connection to provide the update of the beacon; and
at least one processor coupled to the memory, the processor configured to:
in response to receipt of the status data packet via the first network, determine that the update is available for the beacon based at least in part on the status indication; and generate the encrypted update data message, wherein the encrypted update data message includes information provided by the computing system to be used by the beacon to validate that the update is to be applied to the beacon.

14. The computing system of claim 13, wherein the information in the encrypted update data message includes message validation information for use by the beacon to verify validity of the encrypted update data message as issued by the computing system and intended for the beacon.

15. The computing system of claim 14, wherein the message validation information includes a nonce in the encrypted update data message, wherein the nonce is to be extracted from the encrypted update data message and compared to previously-received one or more nonces by the beacon.

16. The computing system of claim 13, further configured to determine that an update is available for the beacon by:
retrieving, from a database, a reference status; and
comparing the status indication to the reference status.

17. At least one non-transitory storage medium comprising processor-executable instructions for secure distributed update of beacon devices, the processor-executable instructions, when executed by processor circuitry of a client computing device, cause the client computing device to:
receive, at the client computing device from a beacon, via a local wireless network, connection therebetween, a status data packet including a beacon status indication, wherein the local wireless network connection occurs with the client computing device using a first wireless communication protocol;
transmit the status data packet from the client computing device to a server, via a wide-area network connection, the status data packet to be used by the server to determine whether an update is available for the beacon based at least in part on the beacon status indication, wherein the wide-area network connection occurs with the client computing device using a second wireless communication protocol;
receive, at the client computing device from e server, via the wide-area network connection, an encrypted update data message relating to the update for installation at the beacon to provide the update of the beacon, wherein the encrypted update data message includes information provided by the server to be used by the beacon to validate that, the update is to be applied to the beacon; and
transmit, from the client computing device to the beacon, via the local wireless network connection, the encrypted update data message.

18. The storage medium of claim 17, wherein the information in the encrypted update data message includes message validation information for use by the beacon to verify validity of the encrypted update data message as issued by the server and intended for the beacon.

19. The storage medium of claim 17, wherein the instructions, when executed by the client computing device, cause the client computing device to further search a local database for previously downloaded update data.

20. The storage medium of claim 17, wherein the instructions, when executed by the client computing device, cause the client computing device to transmit the encrypted update data message from the client computing device to the beacon without decrypting the encrypted update data message.

* * * * *